(12) United States Patent
Kirisawa

(10) Patent No.: US 8,031,237 B2
(45) Date of Patent: Oct. 4, 2011

(54) EXPOSURE CONTROL METHOD, EXPOSURE CONTROL APPARATUS AND IMAGE PICKUP APPARATUS

(75) Inventor: Tsukasa Kirisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 521 days.

(21) Appl. No.: 11/466,981

(22) Filed: Aug. 24, 2006

(65) Prior Publication Data

US 2007/0046789 A1   Mar. 1, 2007

(30) Foreign Application Priority Data

Aug. 26, 2005   (JP) ................ P2005-246746

(51) Int. Cl.
*H04N 9/73* (2006.01)
(52) U.S. Cl. .................................................. 348/228.1
(58) Field of Classification Search ..... 348/226.1–228.1
See application file for complete search history.

(56) References Cited

U.S. PATENT DOCUMENTS

| | | | |
|---|---|---|---|
| 7,164,439 B2* | 1/2007 | Yoshida et al. | 348/226.1 |
| 2003/0223010 A1* | 12/2003 | Kaplinsky et al. | 348/362 |
| 2005/0046704 A1* | 3/2005 | Kinoshita | 348/226.1 |
| 2005/0093996 A1* | 5/2005 | Kinoshita | 348/226.1 |
| 2006/0055823 A1 | 3/2006 | Kinoshita et al. | |

FOREIGN PATENT DOCUMENTS

| | | |
|---|---|---|
| EP | 1496690 A2 | 1/2005 |
| EP | 1513339 A2 | 3/2005 |
| EP | 1566962 A1 | 8/2005 |
| JP | 06-014257 | 1/1994 |
| JP | 11-164192 | 6/1999 |
| JP | 2000-23040 | 1/2000 |
| JP | 2000-165752 | 6/2000 |
| JP | 2000-350102 | 12/2000 |
| JP | 2001-16508 | 1/2001 |
| JP | 2003-198932 | 7/2003 |
| JP | 2004-222228 | 8/2004 |
| JP | 2005-033616 | 2/2005 |
| JP | 2005-086423 | 3/2005 |

OTHER PUBLICATIONS

European Search Report issued Nov. 15, 2004, for corresponding EP Appln. No. 062544120.0.

* cited by examiner

*Primary Examiner* — Timothy J Henn
(74) *Attorney, Agent, or Firm* — K&L Gates LLP

(57) ABSTRACT

A technique of acquiring a width obtaining an appropriate exposure with minimum restrictions, while accurately correcting flickering is provided. An exposure control method includes integrating a video signal obtained by shooting a subject by means of a CMOS imaging element as input video signal over not less than a horizontal period, normalizing the integral value or the difference value of the integral value between neighboring fields or frames, extracting the integral value or the difference value after the normalization as flicker spectrum, determining, based on the extracted flicker spectrum, the presence or absence of a flicker component contained in the video signal obtained by the imaging element and controlling the exposure value, using a program diagram for preferentially employing the shutter speed less liable to produce flickering when it is determined that the video signal contains a flicker component.

12 Claims, 37 Drawing Sheets

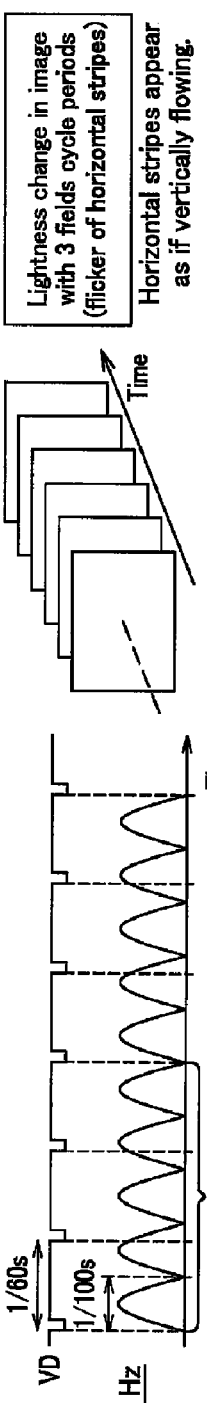
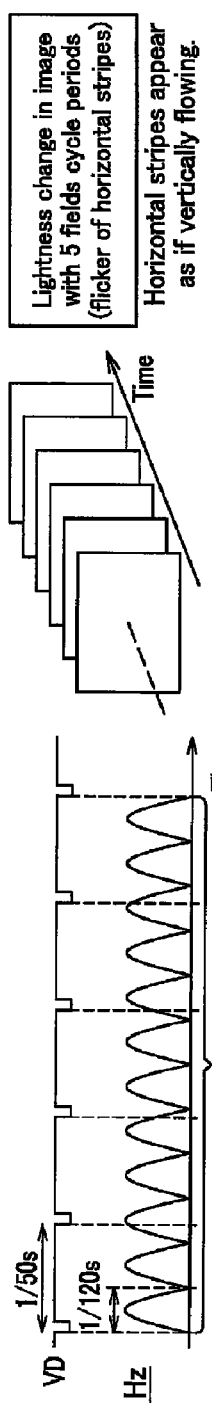
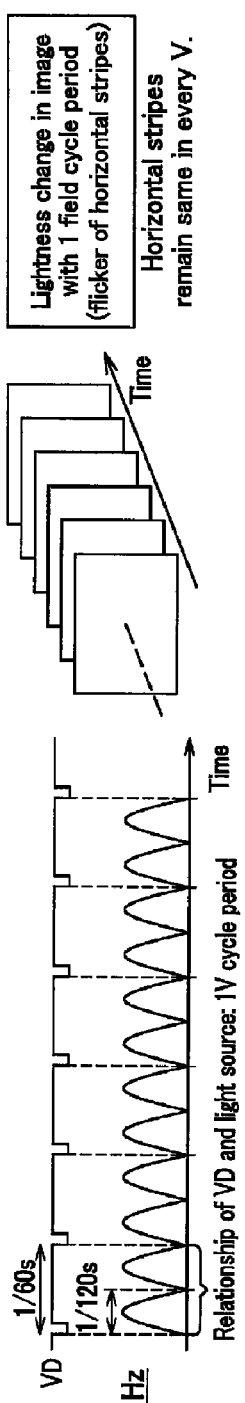
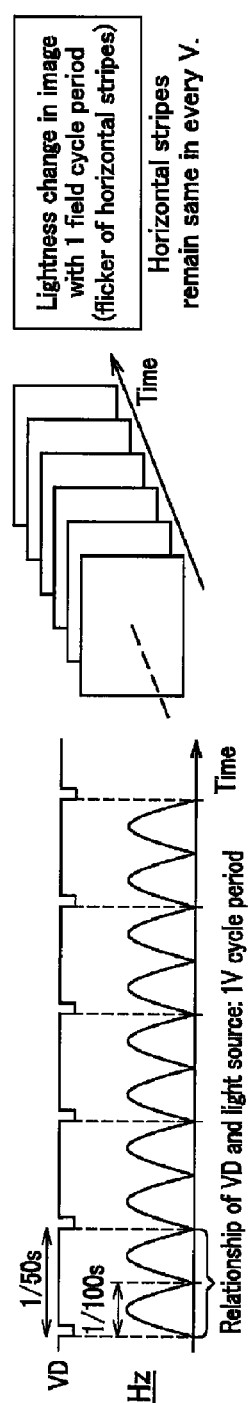
FIG.5A [NTSC] Geographical area of 50 Hz
FIG.5B [PAL] Geographical area of 60 Hz
FIG.5C [NTSC] Geographical area of 60 Hz
FIG.5D [PAL] Geographical area of 50 Hz

| | Geographical area | Ordinary shutter | High speed shutter | Algorithm that utilizes cyclicity | Flicker-free shutter |
|---|---|---|---|---|---|
| NTSC | 50Hz | In-image flicker with 3V cycle periods | In-image flicker with 3V cycle periods | ○ | 1/100s |
| | 60Hz | No flicker | In-image flicker with 1V cycle period | × | 1/60s, 1/120s |
| PAL | 50Hz | No flicker | In-image flicker with 1V cycle period | × | 1/50s, 1/100s |
| | 60Hz | In-image flicker with 5V cycle periods | In-image flicker with 5V cycle periods | ○ | 1/60s, 1/120s |
| DSC 30FPS | 50Hz | In-image flicker with 3V cycle periods | In-image flicker with 3V cycle periods | ○ | 1/33.3s, 1/50s, 1/100s |
| | 60Hz | No flicker | In-image flicker with 1V cycle period | × | 1/30s, 1/60s, 1/120s |

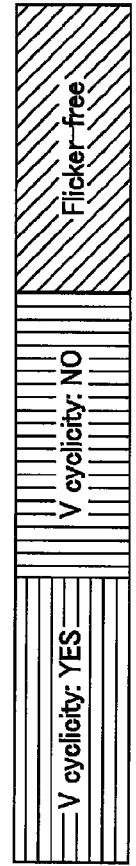

FIG.6

| State | Example of judging criteria | | Control mode |
|---|---|---|---|
| Stable state under lighting of fluorescent lamp (stable flicker) | • Over plurality of fields in past<br>$\gamma_m$<br>$\Phi_{mn}$<br>AE control information<br>AWB control information | : Substantially same value<br>: Substantially same value in every predetermined periods<br>: Image lightness fluctuating in every predetermined cycles<br>: Judged to be practically under lighting of fluorescent lamp | Mode A |
| Stable state under lighting of non-fluorescent lamp (flicker-free) | • Over plurality of fields in past<br>$\gamma_m$<br>$\Phi_{mn}$<br>AE control information<br>AWB control information | : Randomly fluctuating near zero (only noise component)<br>: Randomly fluctuating<br>: Image lightness showing no cyclicity<br>: Judged to be practically under lighting of non-fluorescent lamp | Mode B |

FIG.22

$$\text{In}'(x, y) = [1 + \Gamma n(y)] * \text{In}(x, y) \qquad \cdots (1)$$

Where $$\Gamma n(y) = \sum_{m=1}^{\infty} \gamma m * \cos[m * (2\pi/\lambda o) * y + \Phi mn]$$

$$= \sum_{m=1}^{\infty} \gamma m * \cos[m * \omega o * y + \Phi mn] \qquad \cdots (2)$$

$$\Delta \Phi mn = (-2\pi/3) * m \qquad \cdots (3)$$

$$Fn(y) = \sum_x \text{In}'(x, y) = \sum_x \{[1 + \Gamma n(y)] * \text{In}(x, y)\}$$

$$= \sum_x \text{In}(x, y) + \Gamma n(y) \sum_x \text{In}(x, y)$$

$$= \alpha n(y) + \alpha n(y) * \Gamma n(y) \qquad \cdots (4)$$

Where $$\alpha n(y) = \sum_x \text{In}(x, y) \qquad \cdots (5)$$

FIG.23

$$AVE[Fn(y)] = (1/3)\sum_{k=0}^{2} Fn\_k(y)$$

$$= (1/3)\left\{\sum_{k=0}^{2} \alpha n\_k(y) \div \alpha n\_k(y) * \Gamma n\_k(y)\right\}$$

$$= (1/3)\sum_{k=0}^{2} \alpha n\_k(y) + (1/3)\sum_{k=0}^{2} \alpha n\_k(y) * \Gamma n\_k(y)$$

$$= \alpha n(y) + (1/3) * \alpha n(y)\sum_{k=0}^{2} \Gamma n\_k(y)$$

$$= \alpha n(y) \qquad \cdots (6)$$

Where $$\alpha n(y) \tilde{=} \alpha n\_1(y) \tilde{=} \alpha n\_2(y) \qquad \cdots (7)$$

$$Fn(y) - Fn\_1(y)$$

$$= \{\alpha n(y) + \alpha n(y) * \Gamma n(y)\} - \{\alpha n\_1(y) + \alpha n\_1(y) * \Gamma n\_1(y)\}$$

$$= \alpha n(y) * \{\Gamma n(y) - \Gamma n\_1(y)\}$$

$$= \alpha n(y)\sum_{m=1}^{\infty} \gamma m * \{\cos(m * \omega o * y + \Phi mn)$$

$$- \cos(m * \omega o * y + \Phi mn\_1)\}$$

$$\cdots (8)$$

FIG.24

$$gn(y) = \{Fn(y) - Fn\_(y)\}/AVE[Fn(y)]$$

$$-\sum_{m=1}^{\infty} \gamma m * \{\cos(m * \omega o * y + \Phi mn)$$

$$-\cos(m * \omega o * y + \Phi mn\_1)\}$$

$$= \sum_{m=1}^{\infty} (-2)\gamma m * \{\sin[m * \omega o * y + (\Phi mn + \Phi mn\_1)/2]$$

$$* \sin[(\Phi mn - \Phi mn\_1)/2]\}$$

$$\cdots (9)$$

$$gn(y) = \sum_{m=1}^{\infty} (-2)\gamma m * \sin(m * \omega o * y + \Phi mn + m * \pi/3)$$

$$* \sin(-m * \pi/3)$$

$$= \sum_{m=1}^{\infty} 2 * \gamma m * \cos(m * \omega o * y + \Phi mn + m * \pi/3 - \pi/2)$$

$$* \sin(m * \pi/3)$$

$$= \sum_{m=1}^{\infty} 2 * \gamma m * \sin(m * \pi/3)$$

$$* \cos(m * \omega o * y + \Phi mn + m * \pi/3 - \pi/2)$$

$$= \sum_{m=1}^{\infty} |Am| * \cos(m * \omega o * y + \theta m) \quad \cdots (10)$$

Where $$|Am| = 2 * \gamma m * \sin(m * \pi/3) \quad \cdots (11a)$$

$$\theta m = \Phi mn + m * \pi/3 - \pi/2 \quad \cdots (11b)$$

FIG.25

$$\gamma m = |Am|/[2 * \sin(m * \pi/3)] \qquad \cdots(12a)$$

$$\Phi mn = \theta m - m * \pi/3 + \pi/2 \qquad \cdots(12b)$$

$$DFT[gn(y)] = Gn(m) = \sum_{i=0}^{L-1} gn(i) * W^{m*i} \qquad \cdots(13)$$

Where $$W = \exp[-j * 2\pi/L] \qquad \cdots(14)$$

$$|Am| = 2 * |Gn(m)|/L \qquad \cdots(15a)$$

$$\theta m = \tan^{-1}\{Im[Gn(m)]/Re[Gn(m)]\} \qquad \cdots(15b)$$

Where

Im[Gn(m)]: Imaginary part

Re[Gn(m)]: Real part $$\gamma m = Gn(m)/[L * \sin(m * \pi/3)] \qquad \cdots(16a)$$

$$\Phi mn = \tan^{-1}\{Im[Gn(m)]/Re[Gn(m)]\} - m * \pi/3 + \pi/2 \qquad \cdots(16b)$$

$$In(x, y) = In'(x, y)/[1 + \Gamma n(y)] \qquad \cdots(17)$$

FIG.26

$$gn(y) = Fn(y)/AVE[Fn(y)]$$
$$= 1 + \sum_{m=1}^{\infty} \gamma m * \cos(m * \omega o * y + \Phi mn) \quad \cdots (18)$$

$$gn(y) - 1 = \sum_{m=1}^{\infty} \gamma m * \cos(m * \omega o * y + \Phi mn)$$
$$= \sum_{m=1}^{\infty} |Am| * \cos(m * \omega o * y + \theta m) \quad \cdots (19)$$

$\gamma m = 2 * |Gn(m)|/L \quad \cdots (20a)$ $\Phi mn = \tan^{-1}\{Im[Gn(m)]/Re[Gn(m)]\} \quad \cdots (20b)$ Where Im[Gn(m)]: Imaginary part Re[Gn(m)]: Real part

FIG.27

EXPOSURE CONTROL METHOD, EXPOSURE CONTROL APPARATUS AND IMAGE PICKUP APPARATUS

CROSS REFERENCES TO RELATED APPLICATIONS

The present application claims priority to Japanese Patent Application JP 2005-246746 filed in the Japanese Patent Office on Aug. 26, 2005, the contents of which is being incorporated herein by reference.

BACKGROUND

The present application relates to an exposure control method and an exposure control apparatus to be used in an image pickup apparatus such as a video camera or a digital still camera including an XY address scanning type imaging element (imager, image sensor), which may typically be a CMOS (complementary metal oxide semiconductor) imaging element, under the lighting of a fluorescent lamp and also an image pickup apparatus.

When an image of a subject is picked up by means of a video camera in direct light from a fluorescent lamp energized by a commercial AC power supply, temporal fluctuations, or so-called flicker, occur in the lightness of the video signal output as a result of the image pickup operation due to the difference between the frequency of luminance change of the fluorescent lamp (change in the quantity of light), which corresponds to twice the frequency of the commercial AC power supply, and the vertical synchronizing frequency of the camera.

For example, when an image of a subject is picked up by a CCD camera of the NTSC system (with the vertical synchronizing frequency of 60 Hz) under the lighting of a non-inverter type fluorescent lamp in a geographical area where the frequency of the commercially supplied AC is 50 Hz, the exposure value of each pixel changes every field as shown in FIG. 1 of the accompanying drawings because of that a field period is 1/60 seconds while the period of luminance change of the fluorescent lamp is 1/100 seconds and hence the timing of exposure of each field is shifted relative to the luminance change of the fluorescent lamp.

Thus, referring to FIG. 1, when the exposure time is 1/60 seconds, periods a1, a2, a3 show different exposure values even if the exposure time is same. When the exposure time is shorter than 1/60 seconds (but not equal to 1/100 seconds for the reason as will be described hereinafter), periods b1, b2, b3 show different exposure values even if the exposure time is same.

The timing of exposure relative to the luminance change of the fluorescent lamp returns to the original one in every three fields and therefore the change of lightness due to the flicker is cyclic and repetitive with a period of three fields. In other words, the luminance ratio of each field (how flickering appears) changes with the exposure period but the period of flicker does not change.

However, the change of lightness in every three frames is repeated with progressive type cameras such as digital cameras when the vertical synchronizing frequency is 30 Hz.

Additionally, a number of different phosphors such as red, green and blue phosphors are normally used in a fluorescent lamp in order to emit white light. However, such different phosphors have respective afterglow characteristics and they emit attenuating light with their respective afterglow characteristics during the period from a stop of electric discharge to the next start of electric discharge that is found in a period of luminance change. Therefore, light that is white at the beginning attenuates, gradually changing the hue, in that period. Then, if the timing of exposure is shifted as described above, there arises not only a change of lightness but also a change of hue. Additionally, since fluorescent lamps have a specific spectral characteristic that a remarkable peak is found at a particular wavelength, the fluctuating components of a signal change from color to color.

Thus, a so-called color flicker phenomenon occurs due to such a hue change and the difference of the fluctuating components from color to color.

On the other hand, if the exposure time is defined to be integer times of the period of luminance change of the fluorescent lamp (1/100 seconds) as shown in the lowermost part of FIG. 1, no flicker occurs because a constant exposure value is realized regardless of the timing of exposure.

Actually, there has been proposed a system adapted to detect light being shed from a fluorescent lamp by means of a user's operation or a signal processing operation of the camera and, if light from a fluorescent lamp is detected, set the exposure time to integer times of 1/100 seconds. With such a system, it is possible to fully prevent flickering from taking place by means of a simple technique.

However, it is not possible to select a desired exposure time with such a system so that the degree of freedom of using an exposure adjusting unit of the camera is limited when trying to achieve an appropriate exposure.

Thus, there is a demand for techniques of reducing the flickering of light of a fluorescent lamp regardless of the selected shutter speed (exposure time).

When an image pickup apparatus is so designed that all the pixels are exposed to light at a same timing for an image as in the case of a CCD image pickup apparatus, such a technique can be realized relatively easily because the luminance change and the color change appear only among fields and not in each field.

Referring again to FIG. 1, the flicker changes cyclically and repetitively with a period of three fields if the exposure time is not integer times of 1/100 seconds so that it is possible to suppress the flicker to a level that practically does not give rise to any problem by predicting the current change in the luminance and the colors from the video signal of the field that precedes the current field by three fields and adjusting the gain of the video signal of each field according to the prediction in order to make the average value of the video signals of respective fields.

However, in the case of an XY address scanning type imaging element, which may typically be a CMOS imaging element, the timing of exposure of each pixel is sequentially shifted from that of the preceding pixel in the horizontal direction by a clock (pixel clock) period and hence the timings of exposure of all the pixels differ from each other. In other words, it is not possible to satisfactorily suppress the flicker by means of the above-described technique.

FIG. 2 schematically illustrates this problem. While the timings of exposure of all the pixels differ from each other in the horizontal direction as pointed out above, one horizontal period is sufficiently shorter than the period of luminance change of a fluorescent lamp. Therefore, it is assumed here that the timings of exposure of all the pixels on a horizontal line are same and FIG. 2 shows the timing of exposure of each of the lines arranged in the vertical direction. Such an assumption does not produce any problem in practical applications.

Referring to FIG. 2, in the case of an XY address scanning type imaging element such as a CMOS imaging element, the timing of exposure of each line differ from that of any other line (F1 in FIG. 2 indicates the difference) and hence the exposure value differ from line to line. Then, a luminance change and a color change due to the flicker take place not only among fields but also in each field so that the obtained image shows stripes (that run horizontally and repeat vertically).

FIG. 3 illustrates the flicker in an image when the subject is a uniform pattern. Since the cycle period (wavelength) of stripes is $1/100$ seconds, a striped pattern of 1.666 cycle periods is produced in the image. If the number of lines read out per field is M, the number of lines of the striped pattern read out per cycle period is $L=M*60/100$. Note that the asterisk (*) is used herein as symbol of multiplication.

As shown in FIG. 4, a striped pattern of five periods (for five times of the wavelength) appears in three consecutive fields (three images). If the fields are viewed successively, the stripes will appear as if they were flowing vertically.

While FIGS. 3 and 4 illustrate only a lightness change due to the flicker, the image quality will in reality be remarkably degraded because a color change additionally takes place. Particularly, the color flicker phenomenon becomes remarkable particularly as the shutter speed rises and the influence of the phenomenon appears in the image picked up by an XY address scanning type imaging element to further degrade the image quality.

If the exposure time can be set to integer times of the cycle period ($1/100$ seconds) of the luminance change of the fluorescent lamp for an XY address scanning type imaging element, the exposure value is held to a constant level so that no flickering of fluorescent lamp, including flickering in the image, takes place regardless of the timing of exposure.

However, if the electronic shutter speed is made variable for a CMOS imaging element, the image pickup apparatus including the CMOS imaging element will become structurally complex. Additionally, if it is not possible to set the exposure time equal to integer times of $1/100$ seconds for the purpose of preventing flicking from taking place in an image pickup apparatus having a high degree of freedom for operating an electronic shutter, the degree of freedom of operation of the exposure value adjusting unit for obtaining an appropriate exposure is inevitably reduced.

Thus, there have been proposed techniques of reducing the flickering of fluorescent lamp that is specific to XY address scanning type imaging elements such as CMOS imaging elements.

Patent Document 1 (Jpn. Pat. Appln. Laid-Open Publication No. 2000-350102) and Patent Document 2 (Jpn. Pat. Appln. Laid-Open Publication No. 2000-23040) describe methods of estimating the flicker component by metering the quantity of light of a fluorescent lamp by means of a light receiving element or a light metering element and controlling the gain of the video signal from an imaging element according to the result of the estimation.

Patent Document 3 (Jpn. Pat. Appln. Laid-Open Publication No. 2001-16508) described a method of picking up two images of different types by means of an imaging element under two different conditions, including a first conditions of a first electronic shutter value suitable for the current external lighting condition and a second condition of a second electronic shutter value having a predetermined relationship with the flickering cycle period of a fluorescent lamp, estimating the flicker component by comparing the signals of the two images and controlling the gain of the video signal from the imaging element according to the result of the estimation.

Patent Document 4 (Jpn. Pat. Appln. Laid-Open Publication No. 11-164192) describes a method of storing information on how the lightness changes under the lighting of a fluorescent lamp in a memory in advance as a correction coefficient, while detecting the phase of the flicker component from the video signal obtained from an imaging element by utilizing the difference of frequency between the video signal component and the flicker component, and correcting the video signal by means of the correction coefficient stored in the memory according to the result of the detection.

Patent Document 5 (Jpn. Pat. Appln. Laid-Open Publication No. 2000-165752) describes a method of computationally determining a correction coefficient from two video signals obtained by two exposures carried out with a time difference for inverting the phase of flickering exactly by 180° and correcting the video signal from an imaging element by means of the computationally determined correction coefficient.

However, the methods of estimating the flicker component by metering the quantity of light of a fluorescent lamp by means of a light receiving element or a light metering element as described in the Patent Documents 1 and 2 increase the size and the cost of the system of the image pickup apparatus because a light receiving element or a light metering element has to be added to the image pickup apparatus.

The method of picking up two images of different types under two different shutter conditions and estimating the flicker component as described in the Patent Document 3 is also accompanied by a drawback of making the system of the image pickup apparatus a complex one. Additionally, this method is accompanied by an additional drawback of not suitable for picking up moving images.

The method of using the prepared coefficient that is stored in a memory as correction signal as described in the Patent Document 4 is accompanied by a drawback that it is not possible to reliably detect and reduce the flicker component depending on the types of fluorescent lamp because it is not possible to prepare correction coefficients for all the types of fluorescent lamp. Additionally, with the method of the Patent Document 4 of extracting the flicker component from the video signal, utilizing the difference of frequency between the video signal component and the flicker component, it is difficult to detect the flicker component, discriminating it from the video signal component in the black background part and the low illuminance part of an image where the flicker component is very small, and the performance of detecting the flicker component is degraded remarkably when one or more than one moving objects exist in the image.

Finally, the method of picking up images of two different types at different timings to estimate the flicker component as described in the Patent Document 5 makes the system of the image pickup apparatus complex and is not suited for picking up moving images as in the case of the method of the Patent Document 3.

As described in Patent Document 6 (Jpn. Pat. Appln. Laid-Open Publication No. 2004-222228), the applicant of the present patent application proposed a method of highly accurately detecting the flicker of a fluorescent lamp that is observed specifically by XY address scanning type imaging elements such as CMOS imaging elements by means of a simple signal processing operation without using a light receiving element regardless of the subject, the video signal level and the type of fluorescent lamp to reliably and satisfactorily reduce the flicker.

With the flicker reducing method of the above cited document, the signal components other than the flicker component is removed with normalized integral value or normalized difference value so that, regardless of the subject, it is possible to obtain a signal with which the flicker component can be highly accurately estimated even in the black background part and the low illuminance part of an image where the flicker component is very small. Then, it is possible to highly accurately estimate the flicker component, regardless of the type and the waveform showing a luminance change of the fluorescent lamp, by extracting the spectrum up to an appropriate degree of the normalized integral value or normalized difference value. Thus, it is possible to reliably and satisfactorily reduce the flicker component from the input video signal by computationally operating the estimated flicker component and the input video signal.

Meanwhile, the flicker of a fluorescent lamp in the form of horizontal stripes that arises in XY address scanning type image pickup apparatus shows different characteristics depending on the relation between the frequency of the supplied power and the field or frame frequency of the broadcasting system. For example, it will be found by comparing the characteristics of the stripes that appear in the image that the stripes vary from image to image in terms of frequency, wavelength, waveform and amplitude. It will also be found by comparing a plurality of images among fields that the cyclicity of stripes also varies. FIGS. 5A through 5D illustrate how the cyclicity of stripes varies. When an image pickup operation is conducted by means of the NTSC system under the lighting of a fluorescent lamp in a geographical area where the frequency of the commercially supplied AC is 50 Hz, the flicker stripes show a cyclicity of three fields as shown in FIG. 5A because the imaging cycle period and the power supply cycle period regain the original phase relationship in every three field. Then, when the picked up image is viewed continuously, horizontal stripes appear as if they were flowing vertically. A similar phenomenon appears when an image pickup operation is conducted by means of the PAL system under the lighting of a fluorescent lamp in a geographical area where the frequency of the commercially supplied AC is 60 Hz. In this case, flicker stripes appear as if they were flowing vertically with a cyclicity of five fields as shown in FIG. 5B. The technique proposed in the Patent Document 6 (Jpn. Pat. Appln. Laid-Open Publication No. 2004-222228) separates the image component and the flicker component by utilizing the cyclicity of flicker stripes that appear among fields and extracts the flicker component from the frequency spectrum thereof to correct the gain by using the extracted flicker component. This technique is very effective for the problem of flickering of fluorescent lamp that shows such "inter-field cyclicity".

On the other hand, no flicker stripe appears when an image pickup operation is conducted by means of the NTSC system under the lighting of a fluorescent lamp in a geographical area where the frequency of the commercially supplied AC is 60 Hz or by means of the PAL system under the lighting of a fluorescent lamp in a geographical area where the frequency of the commercially supplied AC is 50 Hz. Horizontal stripes of flicker appear by the same token when the shutter is operated at high speed with either of the above listed combinations of the broadcasting system and the power supply frequency. However, with either of the above listed combinations, the relative relationship between the imaging cycle period and the power supply cycle period is conclusive within a single field as shown in FIGS. 5C and 5D so that, when the picked up image is viewed continuously, horizontal stripes do not appear as if they were flowing vertically. In other words, flicker stripes that arise with either of the above listed combinations differ remarkably from flicker strips that arise with the combinations described in the preceding paragraph because they constantly appear at the same positions. Thus, with the algorithm of the technique described in the Patent Document 6 (Jpn. Pat. Appln. Laid-Open Publication No. 2004-222228) that utilizes the "inter-field cyclicity", it is no longer possible to discriminate flickers from the subject with either of the combinations. Then, it is no longer possible to remove or alleviate flickers with that technique. Many flicker correcting techniques that have hitherto been proposed utilize the "inter-field cyclicity" but are accompanied by the same problem that their algorithms are reduced totally ineffective with those combinations.

This problem can be avoided by tactfully selecting the shutter speed. No flicker stripes appear when n/100 seconds (where n is a natural number) in the case of FIG. 5A or 5C or n/120 seconds in the case of FIG. 5B or 5D is selected for the shutter speed regardless of the timing of exposure. The relationships between the shutter speed and the frequency of the supplied power are summarily listed in FIG. 6.

However, the above-described arrangement reduces the degree of freedom of the exposure adjusting unit for realizing an appropriate exposure because the shutter speed is fixed to n/100 seconds or n/120 seconds. It will not be allowed to discard the freedom of exposure adjustment simply to avoid the flicker problem. There arises an additional problem that some unit is necessary to estimate the frequency of the supplied power. For example, the frequency of the supplied power may be determined from the relationship between the cycle period of flicker stripes and the frame rate. However, when the flicker stripes do not move, it is not possible to determine if the stripes appearing in the video signal are produced by flickering or belong to the subject. While this problem can be avoided by using an external sensor, the use of such a sensor is accompanied by a problem of cost and size. Additionally, since the "inter-field cyclicity" is determined according to information coming from the image pickup apparatus, a problem of post-detection can arise when information on the angle of view changes due to framing or some other reason. Then, the most reliable technique for avoiding flicker stripes may be that of fixing the shutter speed to n/100 seconds or n/120 seconds rather than the technique of the Patent Document 6 (Jpn. Pat. Appln. Laid-Open Publication No. 2004-222228).

SUMMARY

In view of the above-identified circumstances, it is desirable to provide a technique of acquiring a broad range of an appropriate exposure, while accurately correcting flickering, regardless of the combinations of the broadcasting systems (NTSC/PAL) and the geographical areas (the power supply frequency of 50 Hz/60 Hz), by adding appropriate restrictions to shuttering of the technique of the Patent Document 6 (Jpn. Pat. Appln. Laid-Open Publication No. 2004-222228).

Other purposes and specific advantages of the present invention will become more apparent from the description of preferred embodiments that is given hereinafter.

According to an embodiment, there is provided an exposure control method of an image pickup apparatus having an XY address scanning type imaging element, the method including the steps of: integrating a video signal obtained by shooting a subject by means of the imaging element as input video signal over not less than a horizontal period, normalizing an integral value obtained in the integrating step or the difference value between integral values of adjacent fields or frames, extracting flicker spectrum from the normalized integral value or the normalized difference value, and determining, based on the extracted flicker spectrum, the presence or absence of a flicker component contained in the video signal obtained by the imaging element; and controlling an exposure value, using a program diagram for preferentially employing a shutter speed less liable to produce flickering when it is determined that the video signal contains a flicker component.

According to an embodiment, there is also provided an exposure control apparatus of an image pickup apparatus having an XY address scanning type imaging element, the apparatus including: a flicker determining means for integrating a video signal obtained by shooting a subject by means of the imaging element as input video signal over not less than a horizontal period, normalizing an integral value obtained by integrating the video or the difference value between integral values of adjacent fields or frames, extracting flicker spectrum from the normalized integral value or the normalized difference value, and determining, based on the extracted flicker spectrum, the presence or absence of a flicker component contained in the video signal obtained by the imaging element; and an exposure value controlling means for controlling an exposure value, using a program diagram for preferentially employing a shutter speed less liable to produce flickering when it is determined by the flicker determining means that the video signal contains a flicker component.

According to an embodiment of the present invention, there is also provided an image pickup apparatus including: an XY address scanning type imaging element; a flicker determining means for integrating a video signal obtained by shooting a subject by means of the imaging element as input video signal over not less than a horizontal period, normalizing an integral value obtained by integrating the video or the difference value between integral values of adjacent fields or frames, extracting flicker spectrum from the normalized integral value or the normalized difference value, and determining, based on the extracted flicker spectrum, the presence or absence of a flicker component contained in the video signal obtained by the imaging element from the extracted flicker spectrum; and an exposure value controlling means for controlling an exposure value, using a program diagram for preferentially employing a shutter speed less liable to produce flickering when it is determined by the flicker determining means that the video signal contains a flicker component.

Thus, it is possible to control the exposure value in a state that hardly produce any flicker by integrating a video signal obtained by shooting a subject by means of an XY address scanning type imaging element as input video signal over not less than a horizontal period, normalizing an integral value obtained in the integrating step or the difference value between integral values of adjacent fields or frames, extracting flicker spectrum from the normalized integral value or the normalized difference value, determining, based on the extracted flicker spectrum, the presence or absence of a flicker component contained in the video signal obtained by the imaging element and controlling a exposure value, using a program diagram for preferentially employing a shutter speed less liable to produce flickering when it is determined that the video signal contains a flicker component.

Additional features and advantages are described herein, and will be apparent from, the following Detailed Description and the figures.

BRIEF DESCRIPTION OF THE FIGURES

FIG. 5 is a schematic illustration of the difference of "inter-field cyclicity" of the flicker of a fluorescent lamp among a plurality of images.

FIG. 6 is a schematic illustration of the relationship of "inter-field cyclicity" of the flicker of a fluorescent lamp among a plurality of images.

FIG. 22 is a chart to be used for explaining the above examples of FIGS. 20 and 21.

FIG. 23 is a table of formulas to be used for explaining the above examples.

FIG. 24 is another table of formulas to be used for explaining the above examples.

FIG. 25 is still another table of formulas to be used for explaining the above examples.

FIG. 26 is still another table of formulas to be used for explaining the above examples.

FIG. 27 is still another table of formulas to be used for explaining the above examples.

DETAILED DESCRIPTION

Now, an embodiment will be described in greater detail by referring to the accompanying drawings. It will be appreciated that the present invention is by no means limited to the embodiment that follow, which may be modified in various different ways without departing from the spirit and scope of the invention.

Figure 7:
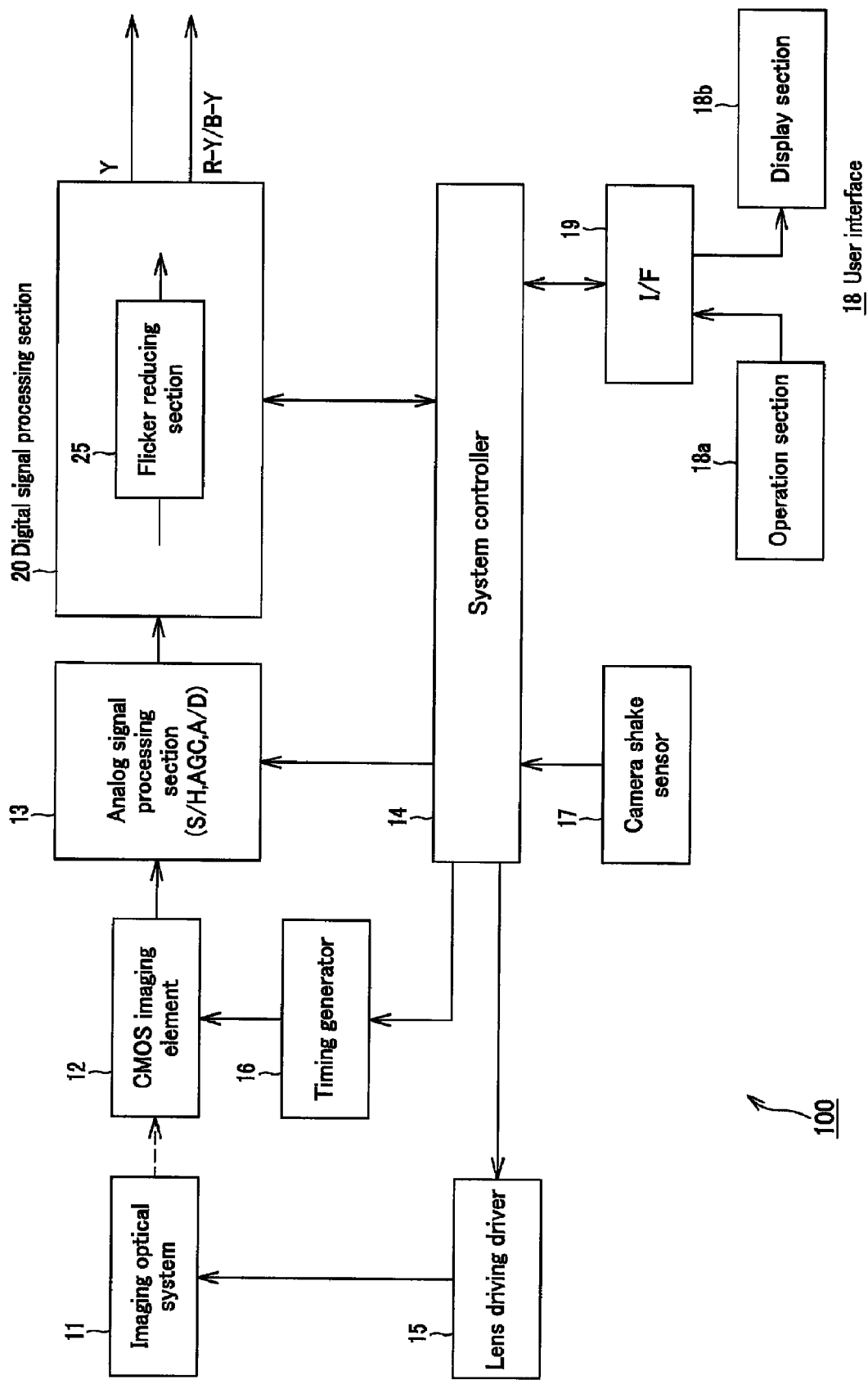
FIG. 7 is a schematic block diagram of an image pickup apparatus according to an embodiment of the present invention, showing the system configuration thereof.

FIG. 7 is a schematic block diagram of a video camera 100 realized by applying the embodiment of the present invention, illustrating the configuration thereof.

In other words, FIG. 7 is a schematic block diagram of an image pickup apparatus according to the embodiment of the present invention, showing the system configuration thereof, which is a video camera 100 using a CMOS imaging element 12 as XY address scanning type imaging element.

With the video camera 100, light from a subject enters the CMOS imaging element 12 by way of an imaging optical system 11 and is subjected to photoelectric conversion in the CMOS imaging element 12 so that analog video signals are obtained from the CMOS imaging element 12.

The CMOS imaging element 12 is formed by arranging a plurality of pixels including photodiodes (photogates), transfer gates (shutter transistors), switching transistors (address transistors), amplifier transistors and reset transistors (reset gates) two-dimensionally on a CMOS substrate along with a vertical scanning circuit, a horizontal scanning circuit and a video signal output circuit.

As will be described in greater detail hereinafter, the CMOS imaging element 12 may be of the primary color system or the complementary color system and the analog video signals obtained from the CMOS imaging element 12 may be primary color signals of RGB or color signals of the complementary color system.

The analog video signals from the CMOS imaging element 12 are subjected to a sample hold process for each color by analog signal processing section 13 that is realized as an IC (integrated circuit) and controlled for gain by AGC (automatic gain control) before being converted into digital signals by A/D conversion.

The digital video signals from the analog signal processing section 13 are processed by digital signal processing section 20 that is realized as an IC as will be described in greater detail hereinafter and the flicker component of each signal is reduced by flicker reducing section 25 in the digital signal processing section 20 before they are ultimately converted into luminance signals Y and color difference signals R-Y, B-Y and output from the digital signal processing section 20.

The system controller 14 is typically realized as a microcomputer so as to control the components of the camera.

More specifically, a lens drive control signal is supplied from the system controller 14 to lens driver 15 that is realized as IC and the lenses of the imaging optical system 11 are driven by the lens driver 15.

Similarly, a timing control signal is supplied from the system controller 14 to a timing generator 16 and various timing signals are supplied from the timing generator 16 to the CMOS imaging element 12 to drive the CMOS imaging element 12.

Additionally, detection signals of various signal components are taken into the system controller 14 from the digital signal processing section 20 so that color signals of different colors are controlled for gain by the analog signal processing section 13 according to the AGC signal from the system controller 14 as described above and the signal processing operation of the digital signal processing section 20 is also controlled by the system controller 14.

A camera shake sensor 17 is connected to the system controller 14 so that, when the subject is changed to a large extent by an action of the person shooting the subject, such a large change is detected by the system controller 14 according to the output for the camera shake sensor 17 so that the flicker reducing section 25 is controlled accordingly.

Additionally, the system controller 14 is connected to an operation section 18a and a display section 18b that operate as user interface 18 by way of an interface 19 that is typically realized as a microcomputer so that the setting operations and the selecting operations at the operation section 18a are detected by the system controller 14 and the setting status and the control status of the camera are displayed on the display section 18b by the system controller 14.

Thus, when the subject is changed to a large extent in a short period of time as the person shooting the subject operates the camera for zooming or the like, such a large change is detected by the system controller 14 and the flicker reducing section 25 is controlled accordingly as will be described in greater detail hereinafter.

As will be described in greater detail hereinafter, when no flicker reducing process is necessary, the situation that a flicker reducing process is not necessary is detected by the system controller 14 and the flicker reducing section 25 is controlled accordingly as will be described in greater detail hereinafter.

Figure 8:
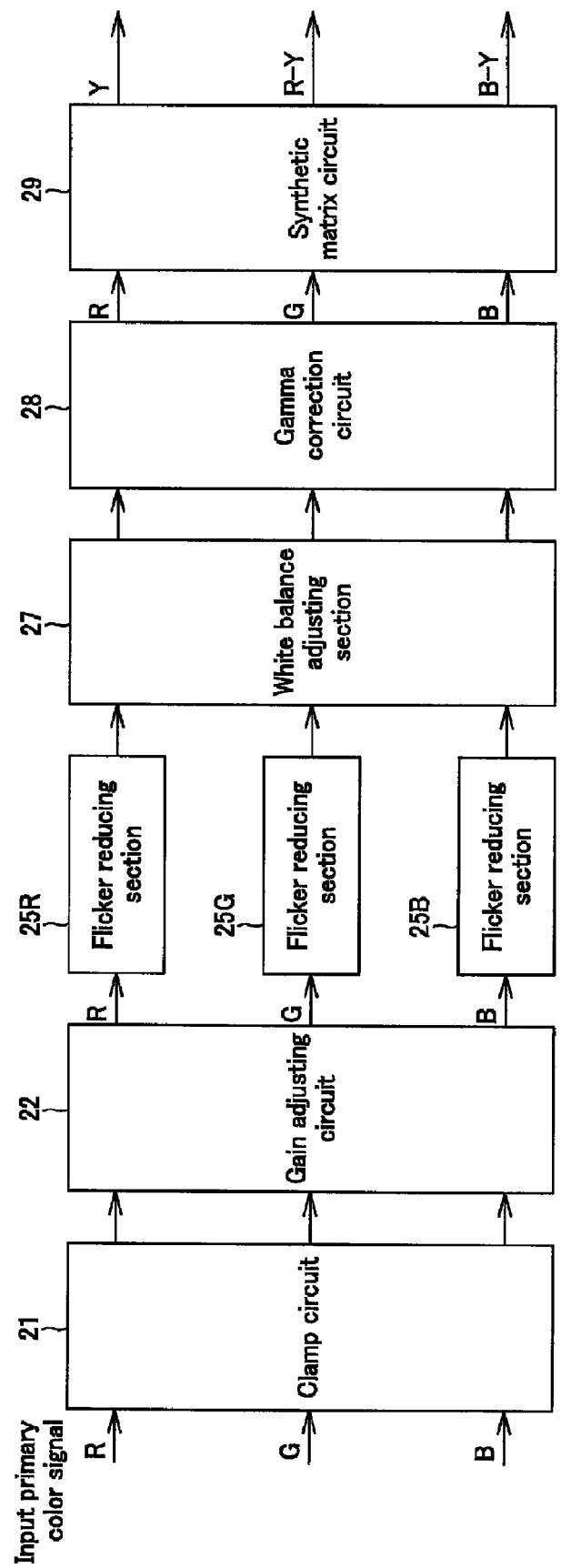
FIG. 8 is a schematic block diagram of an exemplary digital signal processing section of a primary color system.

FIG. 8 is a schematic block diagram of an exemplary digital signal processing section 20 of a primary color system.

The primary color system includes a resolving optical system by means of which the imaging optical system 11 of FIG. 7 divides light from the subject into color lights of RGB and separates them. It may be a three-plate system having CMOS imaging elements of RGB, which are referred to collectively as CMOS imaging element 12, or a single-plate system having a CMOS imaging element where color filters of RGB are arranged on respective horizontal pixels of the light receiving surface sequentially and repeatedly, which is also referred to as CMOS imaging element 12. Then, primary color signals for RGB are read out in parallel from the CMOS imaging element 12.

In the case of the digital signal processing section 20 of FIG. 8, the black level of the input RGB primary color signals is clamped to a predetermined level by a clamp circuit 21 and, after the clamping process, the RGB primary color signals are adjusted for gain according to the exposure value by a gain adjusting circuit 22. Then, after the gain adjusting process, the flicker components of the RGB primary color signals are reduced by the flicker reducing sections 25R, 25G, 25B by means of a method according to the embodiment of the present invention.

Additionally, in the digital signal processing section 20 of FIG. 8, after the flicker reducing process, the white balance of the RGB primary color signals is adjusted by a white balance adjusting circuit 27 and, after the white balance adjusting process, the tone of the RGB primary color signals is converted by the gamma correction circuit 28. Then, after the gamma correction process, a luminance signal Y and color difference signals R-Y, B-Y to be output are produced from the RGB primary color signals by a synthetic matrix circuit 29.

With the primary color system, since a luminance signal Y is generated after the completion of all the processes for processing RGB primary color signals as illustrated in FIG. 8, it is possible to reduce the flicker component of the primary color components and the luminance component by reducing the flicker component in the RGB primary color signals in the processes for processing the RGB primary color signals as shown in FIG. 8.

While the flicker reducing sections 25R, 25G, 25B are preferably arranged in a manner as illustrated in FIG. 8, the arrangement of the flicker reducing sections is not necessarily limited to the illustrated one.

Figure 9:
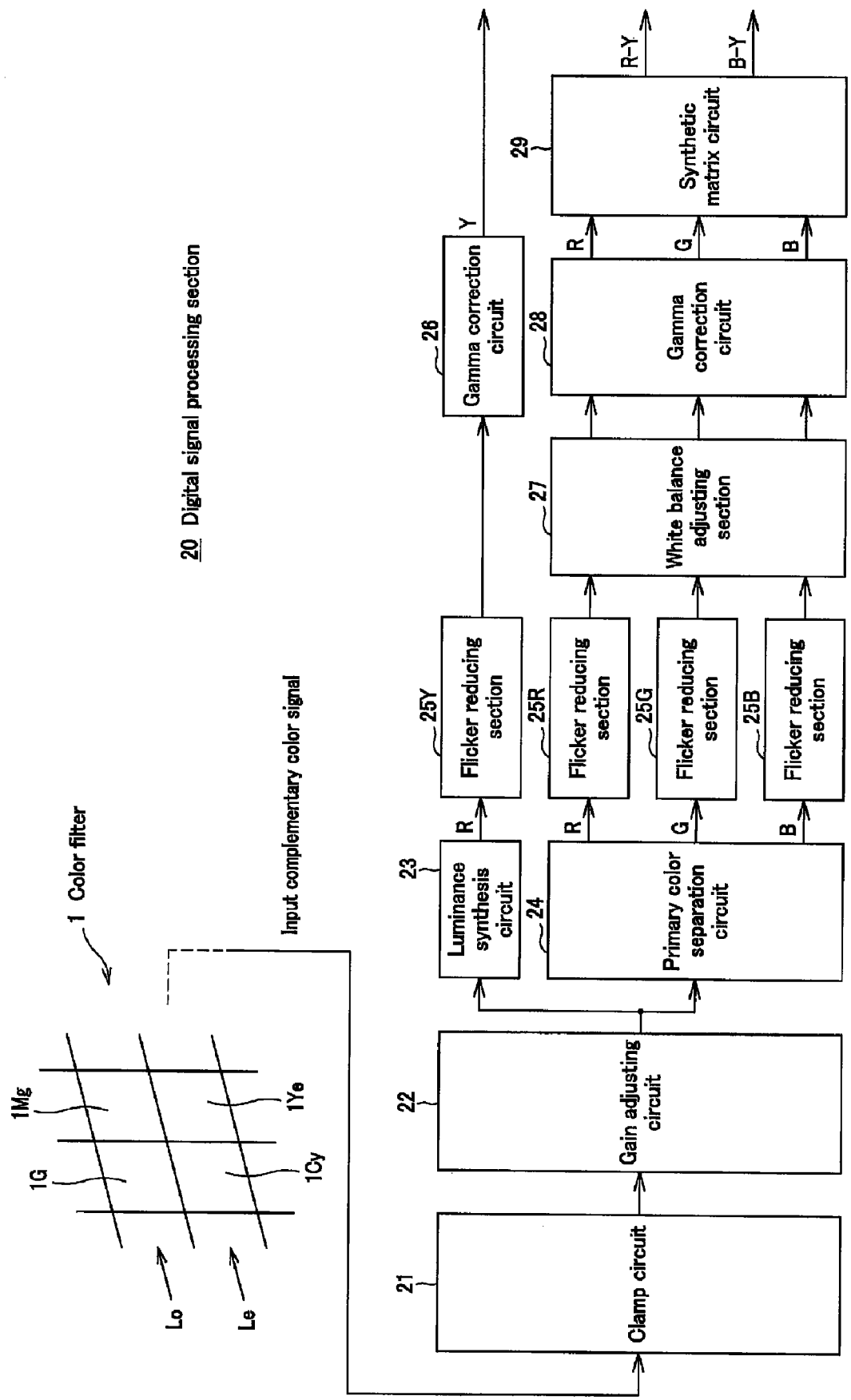
FIG. 9 is a schematic block diagram of an exemplary digital signal processing section of a complementary color system.

FIG. 9 is a schematic block diagram of an exemplary digital signal processing section 20 of a complementary color system.

The complementary color system is a single-plate system having a CMOS imaging element where monochromatic filters of the complementary color system are arranged on the light receiving surface, which is also referred to as CMOS imaging element 12 of FIG. 7. As shown in FIG. 9 as a color filter 1, a green color filter section 1G and a magenta color filter sections 1Mg are sequentially and repeatedly arranged on each pixel on every other horizontal line Lo of the light receiving surface, while a cyan color filter section 1Cy and a yellow color filter section 1Ye are sequentially and repeatedly arranged on each pixel on every other horizontal line Le of in the light receiving surface.

Then, the video signals of two adjacently located horizontal lines are synthetically combined and read out from the CMOS imaging element 12 of FIG. 7. Therefore, a synthetic signal of a green color signal and a cyan color signal and a synthetic signal of a magenta color signal and a yellow color signal are alternately obtained for every pixel clock by the arrangement of FIG. 9.

In the case of the digital signal processing section 20 of FIG. 9, the black level of the complementary color signals is clamped to a predetermined level by the clamp circuit 21 and, after the clamping process, the complementary color signals are adjusted for gain according to the exposure value by the gain adjusting circuit 22. Then, after the gain adjusting process, a luminance signal Y is produced form the complementary color signals by a luminance synthesis circuit 23 and an RGB primary color signals are produced from the complementary color signals by the primary color separation circuit 24.

In the case of the digital signal processing section 20 of FIG. 9, the flicker component in the luminance signal Y from the luminance synthesis circuit 23 is reduced by means of a method according to the embodiment of the present invention, while the flicker components in the RGB primary color signals from the primary color separation circuit 24 are reduced by the flicker reducing sections 25R, 25G, 25B by means of a method according to the embodiment of the present invention.

Additionally, in the digital signal processing section 20 of FIG. 9, after the flicker reducing process, the tone of the luminance signal is adjusted by the gamma correction circuit 26 to obtain a luminance signal Y to be output, and after the flicker reducing process, the white balance of the RGB primary color signals is adjusted by the white balance adjusting circuit 27. Then, after the white balance adjusting process, the tone of the RGB primary color signal is converted by the gamma correction circuit 28 and, after the gamma correction process, color difference signals R-Y, B-Y to be output are produced from the RGB primary color signals by a synthetic matrix circuit 29.

With the complementary color system, the luminance signal and the RGB primary color signals are produced at a relatively upstream position in the digital signal processing section 20 as shown in FIG. 9. This is because a luminance signal can be produced easily from synthetic signals by means of a simple addition process and the S/N of the luminance signal is degraded if RGB primary color signals are produced from synthetic signals by means of a subtraction process and then a luminance signal is produced form the RGB primary color signals.

However, when different processing systems are used for luminance signals and color signals, it is not sufficient to reduce the flicker component of the luminance component simply by reducing the flicker component of each color component. In other words, it is possible to satisfactorily reduce the flicker component of each color component and the flicker component of the luminance component only by reducing the flicker component of the luminance component separately and independently as shown in FIG. 9.

While the flicker reducing sections 25Y and 25R, 25G, 25B are preferably arranged in a manner as illustrated in FIG. 9, the arrangement of the flicker reducing sections is not necessarily limited to the illustrated one.

Each of the flicker reducing sections 25R, 25G, 25B of FIG. 8 and the flicker reducing sections 25Y, 25R, 25G, 25B of FIG. 9 have a configuration as described below. In the following description, any of the flicker reducing sections 25Y, 25R, 25G, 25B is generically referred to as flicker reducing section 25 without discrimination.

In the following description, an input video signal is any of the RGB primary color signals and the luminance signal input to a flicker reducing section 25 before being subjected to a flicker reducing process and an output video signal is any of the RGB primary color signals and the luminance signal output from a flicker reducing section 25 after being subjected to a flicker reducing process.

Figure 1:
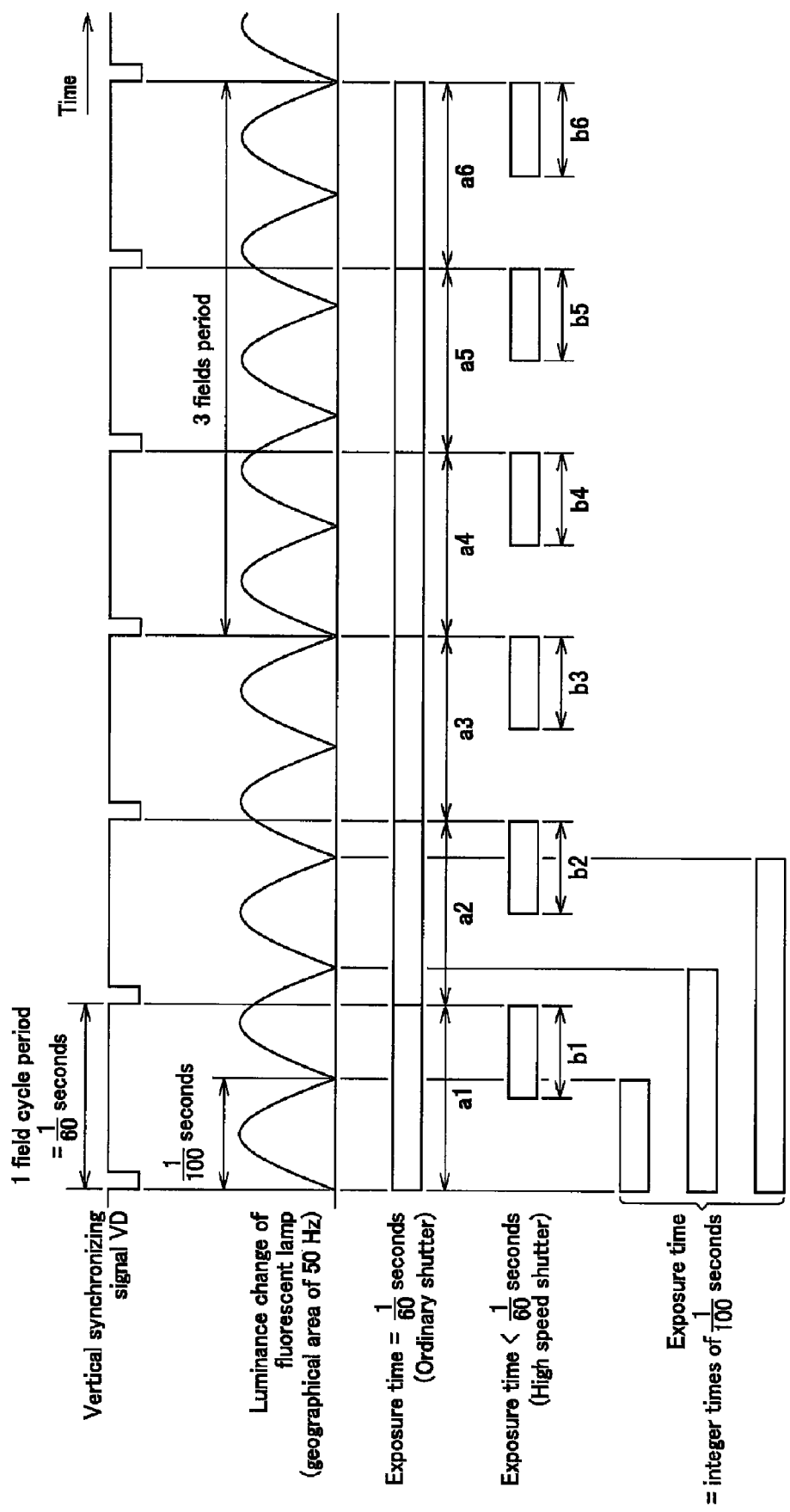
FIG. 1 is a schematic illustration of the flicker of a fluorescent lamp that can appear when a CCD imaging element is used to pick up an image.
Figure 2:
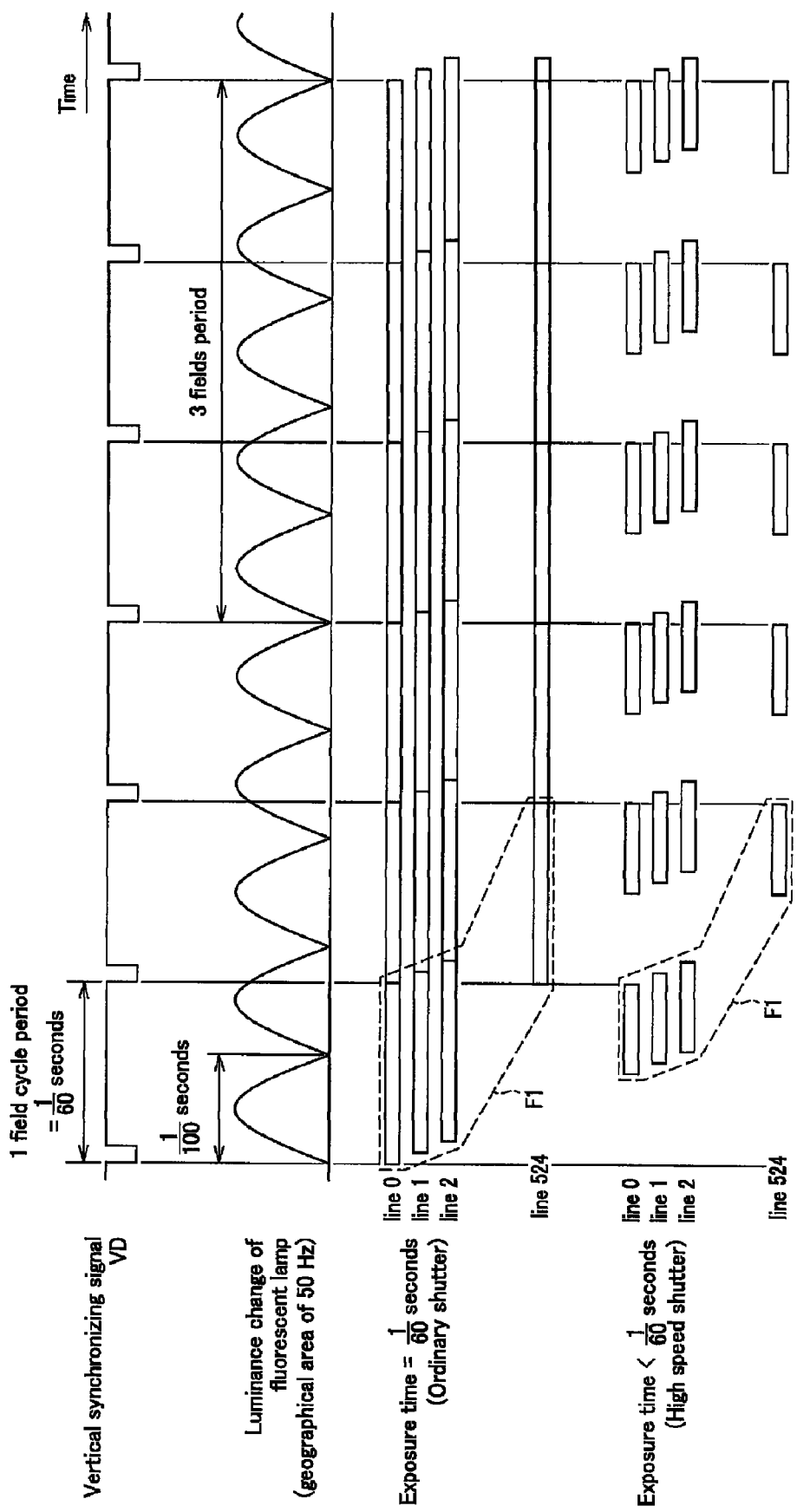
FIG. 2 is a schematic illustration of the flicker of a fluorescent lamp that can appear when an XY address scanning type imaging element is used to pick up an image.
Figure 3:
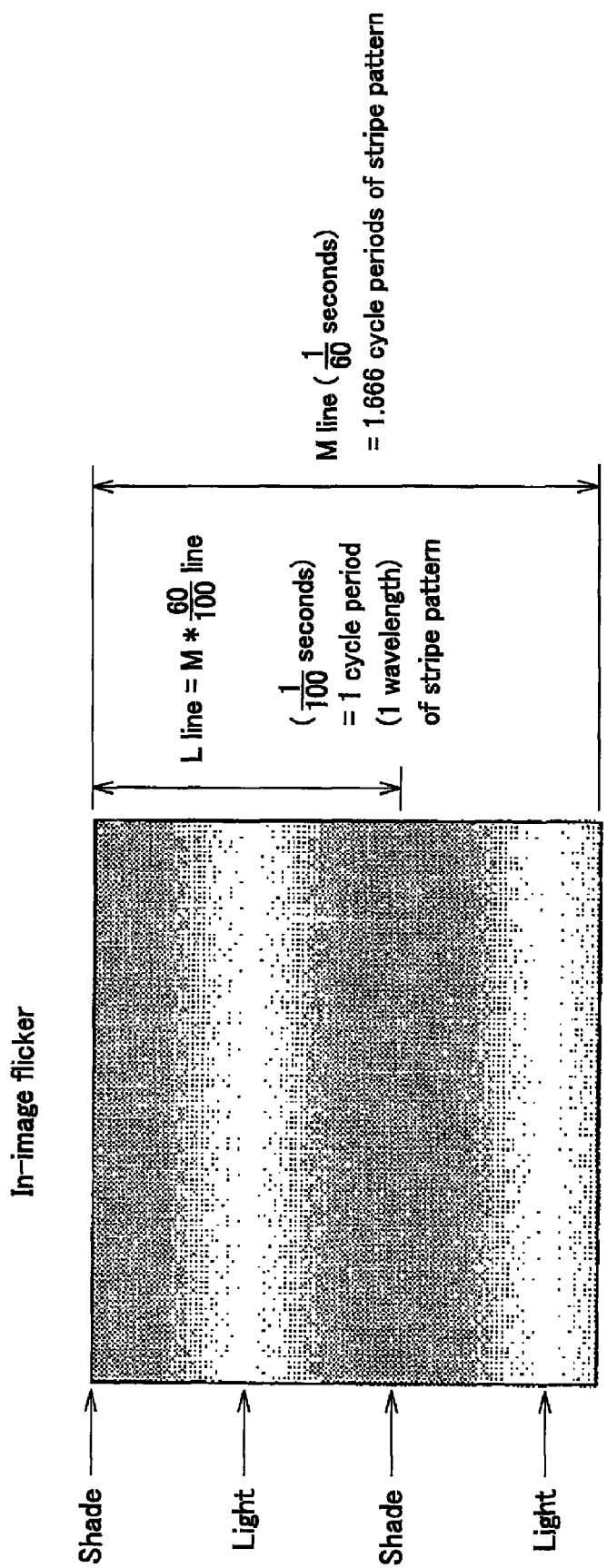
FIG. 3 is a schematic illustration of the pattern of stripes that can appears in an image picked up by an XY address scanning type imaging element.
Figure 4:
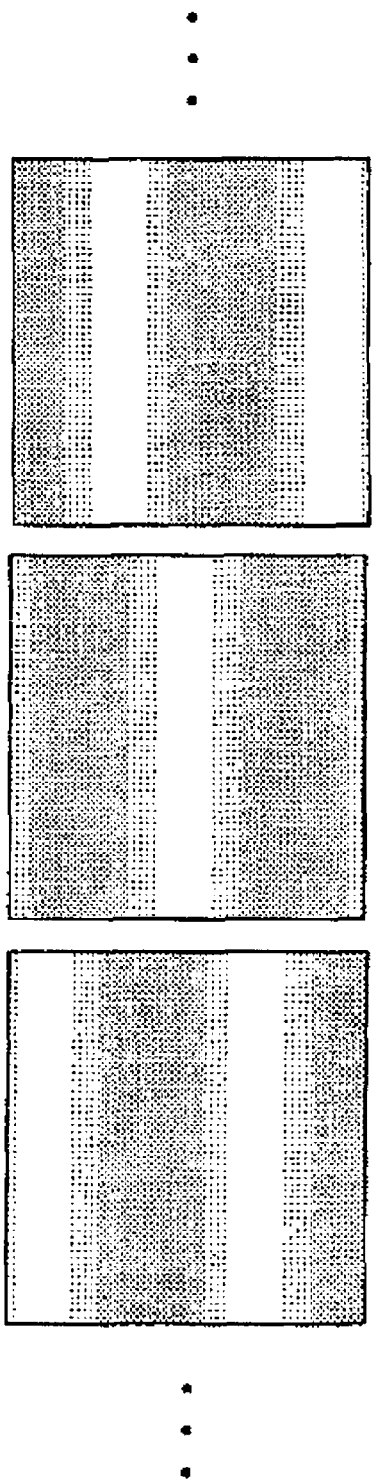
FIG. 4 is a schematic illustration of the pattern of stripes that can appear in three consecutive images picked up by an XY address scanning type imaging element.

In the following description, it is assumed that a subject is shot by a CMOS camera of the NTSC system (with a vertical synchronizing frequency of 60 Hz) under the lighting of a fluorescent lamp and hence, if the flicker of the fluorescent lamp is not reduced, a luminance change and a color change arise not only among fields but also in each field due to the flicker as shown in FIGS. 2 to 4 so that, in image plane, a pattern of stripes appear for five cycle periods (five times of the wavelength) in three fields (three times of the image planes).

Flickering occurs not only when the fluorescent lamp is of the non-inverter type but also when the fluorescent lamp is of the inverter type and the electric current is not rectified satisfactorily. Therefore, the flicker problem is not limited to fluorescent lamps of the non-inverter type.

Figure 10:
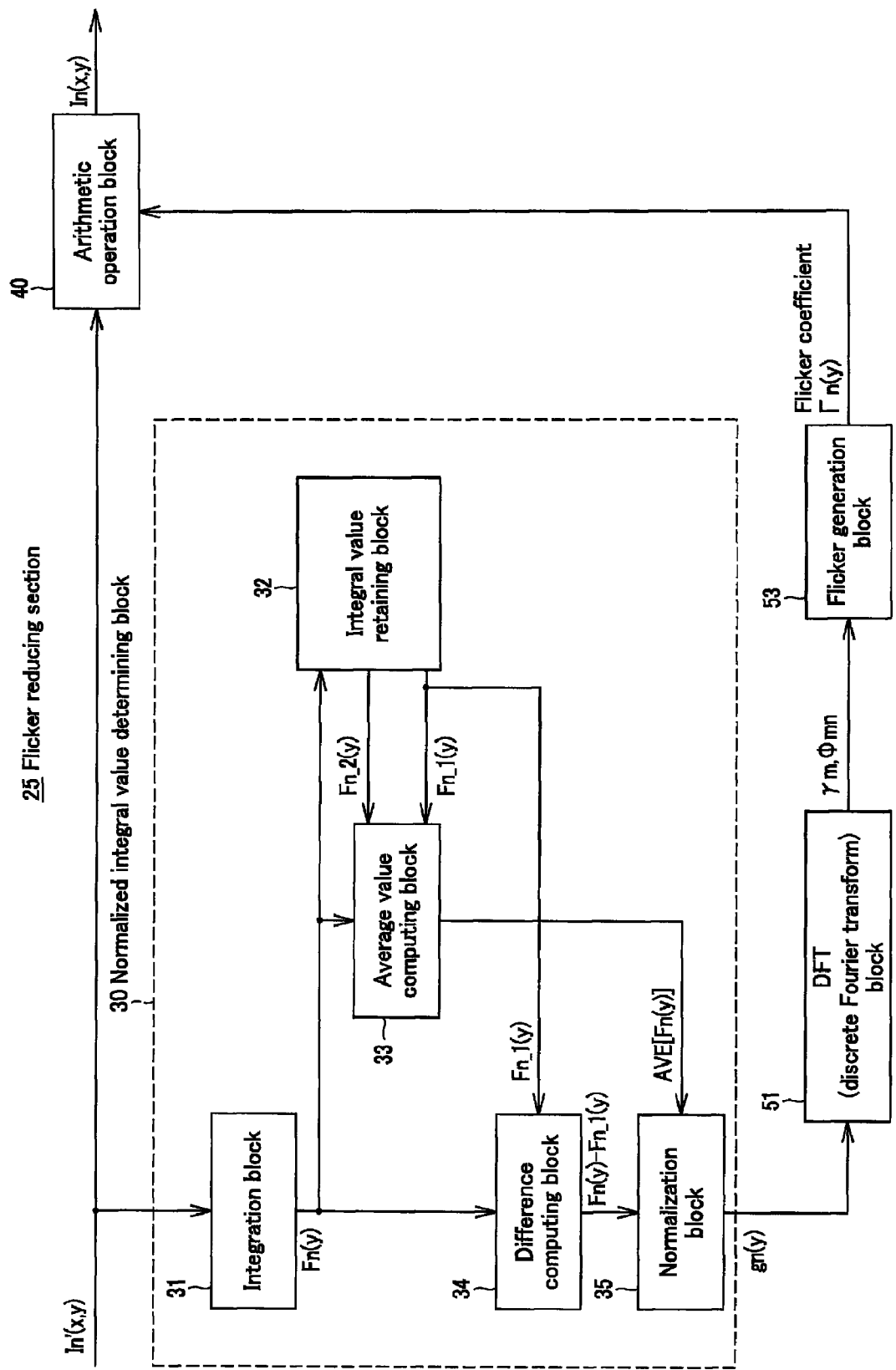
FIG. 10 is a schematic block diagram of a first exemplary flicker reducing section.

FIG. 10 is a schematic block diagram of a first exemplary flicker reducing section 25.

While FIGS. 3 and 4 illustrate the influence of flicker when the subject is a uniform one, the flicker component is generally proportional to the signal intensity of the subject.

Thus, if the input video signal (a luminance signal or an RGB primary color signal before being subjected to a flicker reducing process) of a subject at an arbitrarily selected pixel (x, y) in an arbitrarily selected field n is In' (x, y), In' (x, y) is the sum of the signal component that does not contain the flicker component and the flicker component that is proportional to the signal component as expressed by the formula (1) in FIG. 23.

In FIG. 23, In (x, y) is the signal component and $\Gamma n$ (y)*In (x, y) is the flicker component, where $\Gamma n$ (y) is the flicker coefficient. A horizontal period is so short relative to the light emitting period ($\frac{1}{100}$ seconds) of the fluorescent lamp that it is possible to assume that the flicker coefficient is constant for a same line in a same field. Therefore, the flicker coefficient is expressed by $\Gamma n$ (y).

To generalize $\Gamma n$ (y), it will be developed into a Fourier series as indicated by (2) in FIG. 23. Then, it is possible to express a flicker coefficient in a form of comprehensively including different light emission characteristics and afterglow characteristics that vary as a function of the type of fluorescent lamp.

Referring to the formula (2), $\lambda o$ is the wavelength of the in-image flicker as shown in FIG. 3. If the number of lines read out per field is M, it corresponds to L(=M*60/100) lines. In the formula (2), $\omega o$ is the standardized angular frequency that is normalized by $\lambda o$.

In the formula (2), $\gamma m$ is the amplitude of the flicker component of each degree (m=1, 2, 3, . . . ) and $\Phi mn$ indicates the initial phase of the flicker component of each degree that is determined as a function of the light emission period ($\frac{1}{100}$ seconds) of the fluorescent lamp and the exposure timing. Note, however, that $\Phi mn$ takes a same value in every three fields and hence the difference of $\Phi mn$ between a field and an immediately preceding field is expressed by formula (3) in FIG. 23.

In the instance of FIG. 10, firstly the input video signal In' (x, y) is integrated for a line in the horizontal direction in the image by integration block 31 as expressed by formula (4) in FIG. 23 to determine the integral value Fn (y) so that influences of picture patterns on flicker-detection are reduced. In the formula (4), $\alpha n$ (y) is the integral value of a line in the signal component In (x, y) as expressed by formula (5) in FIG. 23.

The computationally determined integral value Fn (y) is stored and retained in integral value retaining block 32 for the purpose of flicker detection in the subsequent fields. The integral value retaining block 32 is so designed as to be able to retain integral values of at least two fields.

If the subject is a uniform one, the integral value $\alpha n$ (y) of the signal component In (x, y) is a constant value and hence it is easy to extract the flicker component $\alpha n$ (y)*$\Gamma n$ (y) from the integral value Fn (y) of the input video signal In'(x, Y).

However, a subject generally contains m*$\omega o$ component in $\alpha n$ (y) and hence it is not possible to isolate the luminance component and the color component of the flicker component from the luminance component and the color component of the signal component of the subject itself. In short, it is not possible to purely extract only the flicker component. Additionally, since the flicker component of the second term is very small relative to the signal component of the first term in the formula (4), the flicker component is substantially buried in the signal component.

Figure 29:
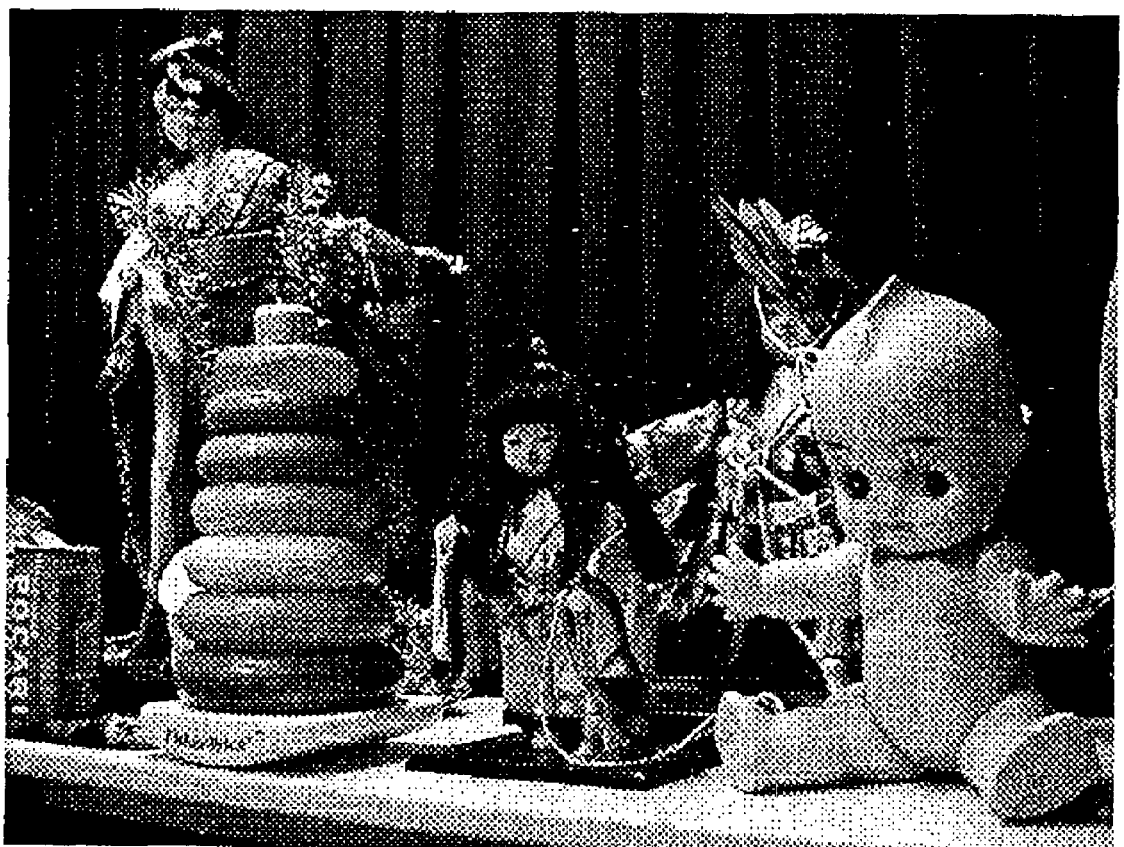
FIG. 29 is a schematic illustration of a subject used for a test.
Figure 30:
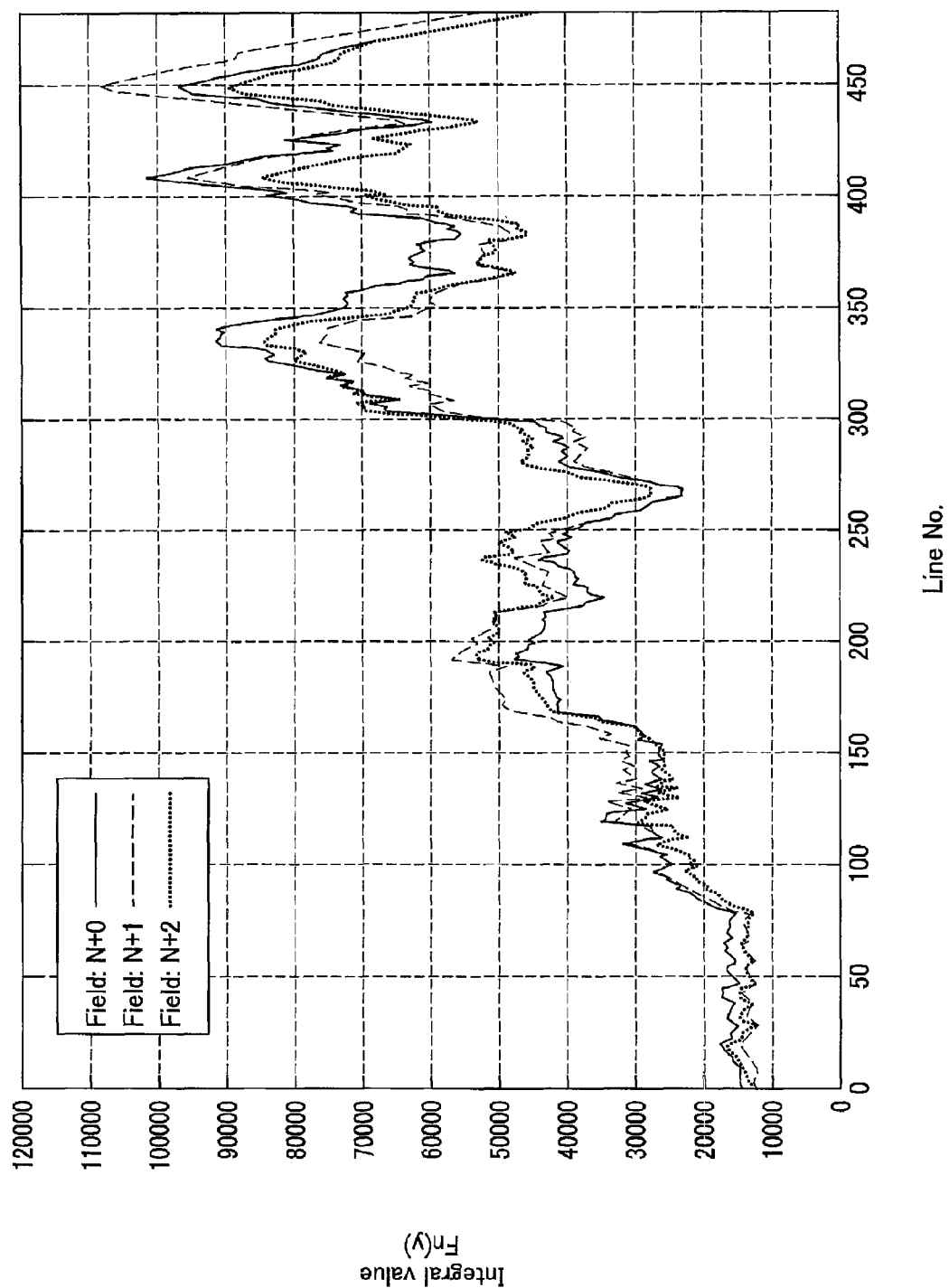
FIG. 30 is graph of the integral value for the subject of FIG. 29.

For reference, FIG. 30 shows the integral value Fn (y) of three consecutive fields of a subject (which is in fact a color image) as shown in FIG. 29. The integral value Fn (y) of FIG. 30 is for the red signal. In FIG. 30, Field: N+0 (solid line), Field: N+1 (broken line) and Field: N+2 (dotted line) respectively indicate the first, second, and third fields of three consecutive fields. As seen from FIG. 30, it is not possible to directly extract the flicker component from the integral value Fn (y).

Thus, in the instance of FIG. 10, the integral value of three consecutive fields is used to remove the influence of $\alpha n$ (y) from the integral value Fn (y).

More specifically, in the illustrated instance, when computationally determining the integral value Fn (y) of a line, the integral value Fn_1 (y) of the same line in the immediately preceding field and the integral value Fn_2 (y) of the same line in the field preceding it by two fields are read out from the integral value retaining block 32 and average value computing block 33 computes the average value AVE [Fn (y)] of the three integral values Fn (y), Fn_1 (y) and Fn_2 (y).

If the subject can be regarded substantially same in the period of the three consecutive fields, it is possible to regard the value of $\alpha n$ (y) same for the three consecutive fields. If the movement of the subject is sufficiently small in the three fields, the above assumption does not practically give rise to any problem. Additionally, when computing the average value of the integral values of three consecutive fields, the signals where the phase of the flicker component is sequentially shifted by $(-2\pi/3)$*m are added as seen from the formula (3) so that consequently the flicker components are cancelled. Therefore, the average value AVE [Fn (y)] is expressed by formula (6) in FIG. 24.

Note that the average value of the integral values of three consecutive fields is computationally determined in the above description on an assumption that the approximation of formula (7) in FIG. 24 holds true. However, the approximation of the formula (7) does not hold true when the movement of the subject is large.

Then, the flicker reducing section 25 that is provided for a situation where the movement of the subject is large retains the integral values of not less than three fields in the integral value regaining block 32 and computationally determines the average value of the integral values of four or more than four fields including the integral value Fn (y) of the current field. With this arrangement, it is possible to reduce the influence of the movement of the subject due to the effect of a temporal low pass filter.

However, since the same flicker repeatedly appears in every three fields, it is necessary to computationally determines the average value of the integral values of j (integer times of 3, where the integer is not smaller than 2, or 6, 9, . . . ) consecutive fields in order to cancel the flicker component. Thus, the integral value retaining block 32 has to be so designed as to retain the integral values of at least (j−1) fields.

The instance of FIG. 10 is based on the assumption that the approximation of the formula (7) in FIG. 24 holds true. In this instance, difference computing block 34 computationally determines the difference of the integral value Fn (y) of the current field obtained from the integration block 31 and the integral value Fn_1 (y) of the immediately preceding field obtained from the integral value retaining block 32, or the difference value of Fn (y)−Fn_1 (y) as expressed in formula (8) in FIG. 24. The formula (8) is also based on the assumption that the approximation of the formula (7) holds true.

Figure 31:
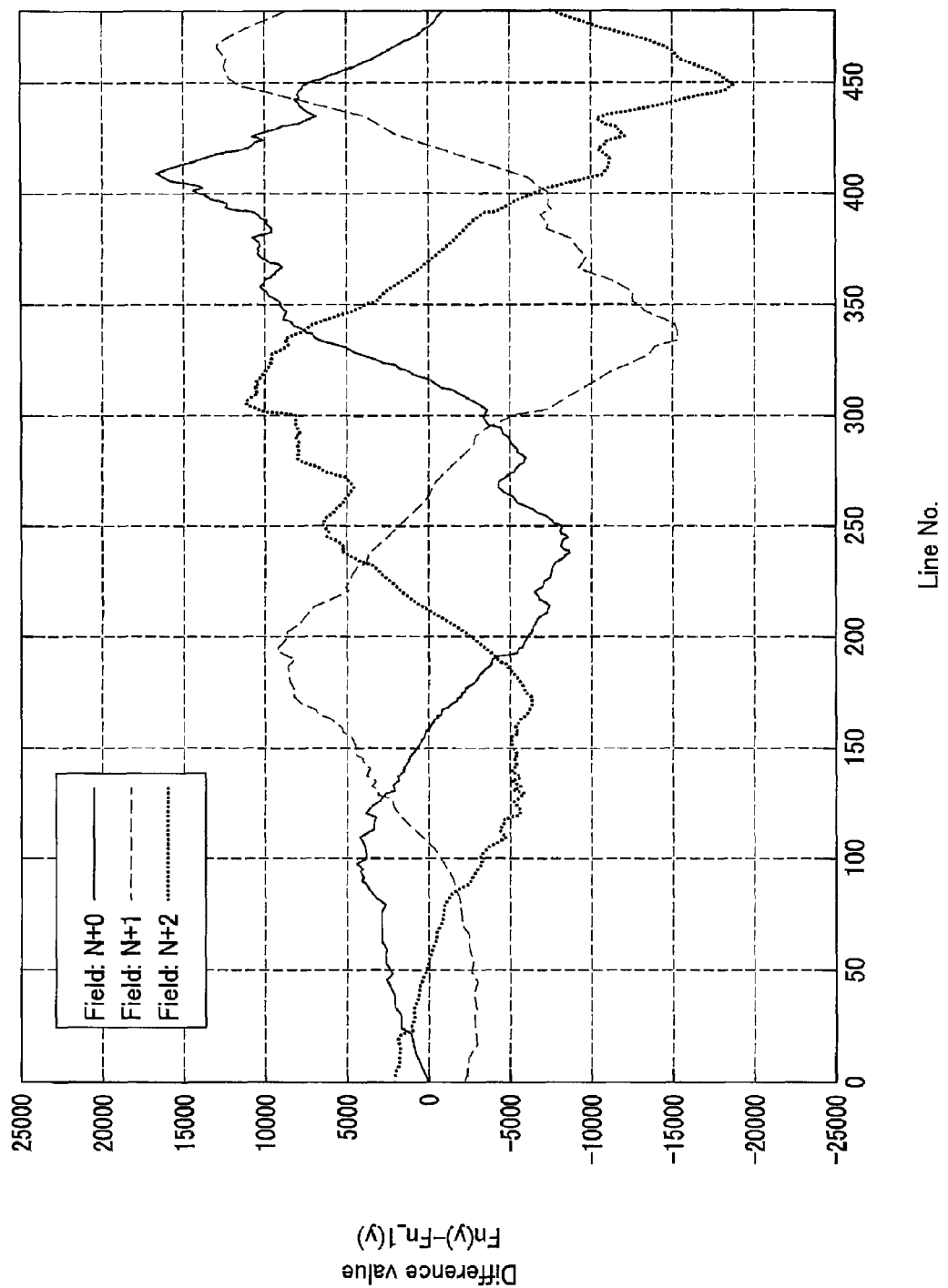
FIG. 31 is a graph of the difference value for the subject of FIG. 29.

FIG. 31 shows the difference value Fn (y)–Fn_1 (y) of three consecutive fields of the subject illustrated in FIG. 29. As seen from FIG. 31, since the influence of the subject is satisfactorily removed by means of the difference value Fn (y)–Fn_1 (y), the flicker component (flicker coefficient) becomes more clearly visible than in the integral value Fn (y) shown in FIG. 30.

In the instance of FIG. 10, normalization block 35 normalizes the difference value Fn (y)–Fn_1 (y) from the difference computing block 34 as it divides the difference value by the average value AVE [Fn (y)] from the average value computing block 33 to computationally determine the normalized difference value gn (y).

The normalized difference value gn (y) is developed into formula (9) shown in FIG. 25 by means of the formulas (6) and (8) of FIG. 24 and the addition/multiplication formula of trigonometric function so as to be expressed by formula (10) of FIG. 25 on the basis of the relationship of the formula (3) in FIG. 23. Note that |Am| and θm in the formula (10) are expressed respectively by formulas (11a) and (11b).

Since the influence of the signal intensity of the subject remains on the difference value Fn (y)–Fn_1 (y), the level of the luminance change and that of the color change due to flickering can vary depending on the region in the image. However, the level of the luminance change and that of the color change can be equalized over all the regions of the image as a result of the above-described normalization.

Figure 32:
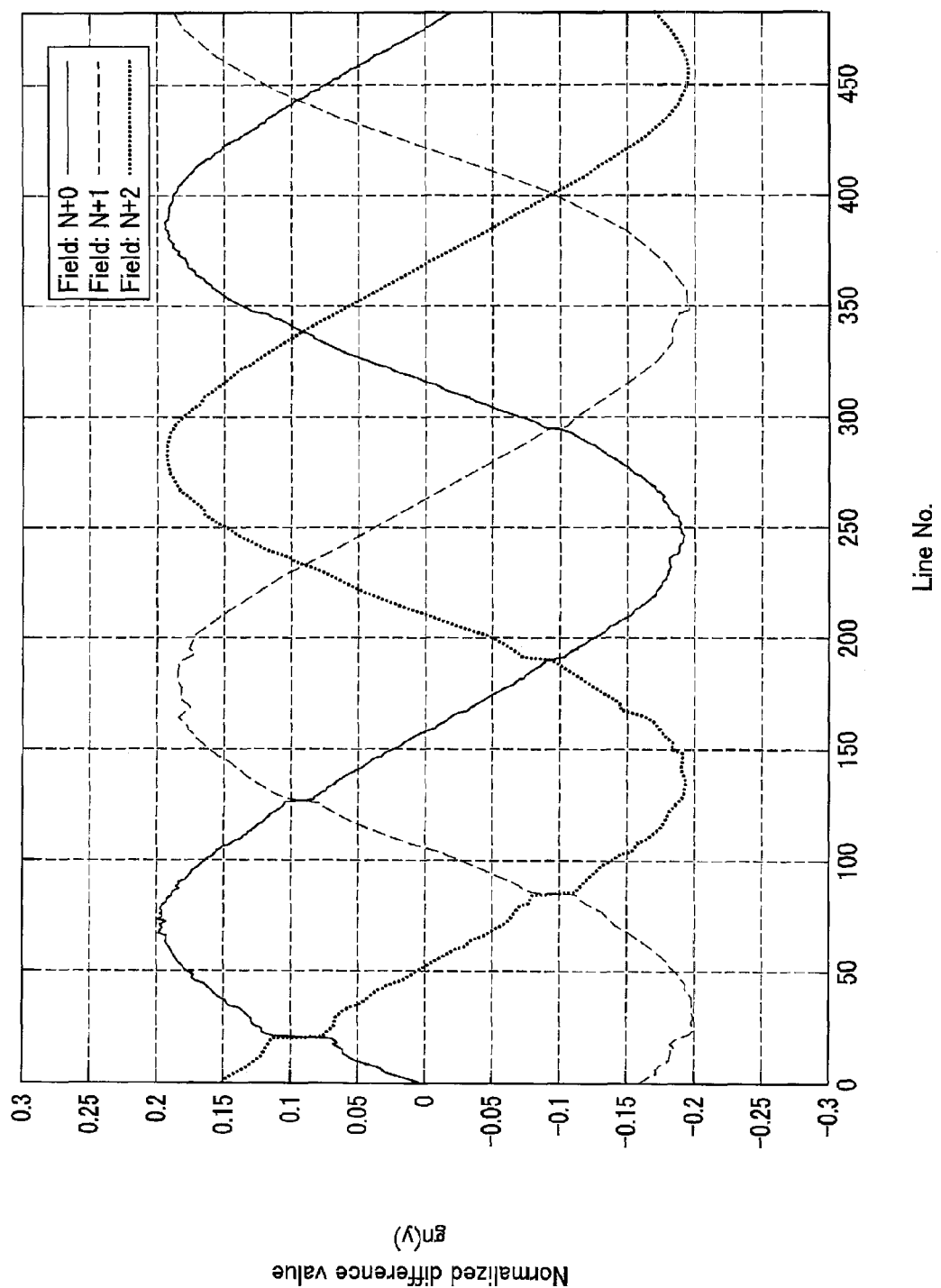
FIG. 32 is a graph of the difference value after normalization for the subject of FIG. 29.

FIG. 32 shows the normalized difference value gn (y) of three consecutive three fields of the subject shown in FIG. 29.

Note that |Am| and θm that are expressed respectively by the formulas (11a) and (11b) of FIG. 25 are the amplitude and the initial phase of the spectrum of each degree of the normalized difference value gn (y). Thus, it is possible to determine the amplitude γm and the initial phase Φmn of the flicker component of each degree shown in the formula (2) of FIG. 23 by means of the formulas (12a) and (12b) of FIG. 26 and by way of Fourier transform of the normalized difference value gn (y) and detection of the amplitude |Am| and the initial phase θm of the spectrum of each degree.

In the instance of FIG. 10, DFT block 51 performs a discrete Fourier transform of the data that corresponds to the wavelength (for L lines) of the flicker in the normalized difference value gn (y) obtained from the normalization block 35.

If the DFT operation is DFT [gn (y)] and the result of the DFT of degree m is Gn (m), the DFT operation is expressed by formula (13) in FIG. 26. W in the formula (13) is expressed by formula (14). By the definition of DFT, the relationship between the formulas (11a) and (11b) and the formula (13) is expressed by formulas (15a) and (15b) of FIG. 26.

Thus, from the formulas (12a), (12b), (15a) and (15b), it is possible to determine the amplitude γm and the initial phase Φmn of the flicker component of each degree by means of formulas (16a) and (16b) of FIG. 26.

The data length of the DFT operation is made equal to the wavelength (for L lines) of the flicker because, by doing so, it is made possible to directly obtain a group of discrete spectra of integer times of coo.

Generally, FFT (fast Fourier transform) is used for a Fourier transform when processing a digital signal. Nevertheless, however, DFT is used in this embodiment of the present invention. The reason for this is that DFT is more convenient than FFT because the data length of the Fourier transform is not equal to a power of 2. However, it is also possible to use FFT by processing the input/output data.

Since, under the lighting of a fluorescent lamp, it is actually possible to satisfactorily approximate the flicker component even if the range of the degree m is less than the tenth, it is not necessary to output all the data of the DFT operation. The use of DFT is not disadvantageous for the purpose of the present invention if compared with the use of FFT in terms of efficiency of operation, therefore.

The DFT block 51 firstly extracts spectra by a DFT operation defined by the formula (13) and subsequently the amplitude γm and the initial phase Φmn of the flicker component of each degree are estimated by means of operations using formulas (16a) and (16b).

In the instance of FIG. 10, flicker generation block 53 computationally determines the flicker coefficient Γn (y) expressed by the formula (2) in FIG. 23 from the estimates of γm and Φmn obtained from the DFT block 51.

However, as pointed out above, it is actually possible to satisfactorily approximate the flicker component if the range of the degree m is less than the tenth. Therefore, when computationally determining the flicker coefficient Γn (y) by means of the formula (2), it is possible to limit the degree of summation to a predetermined ordinal number, for example to the second order so as not to make it infinite.

Figure 33:
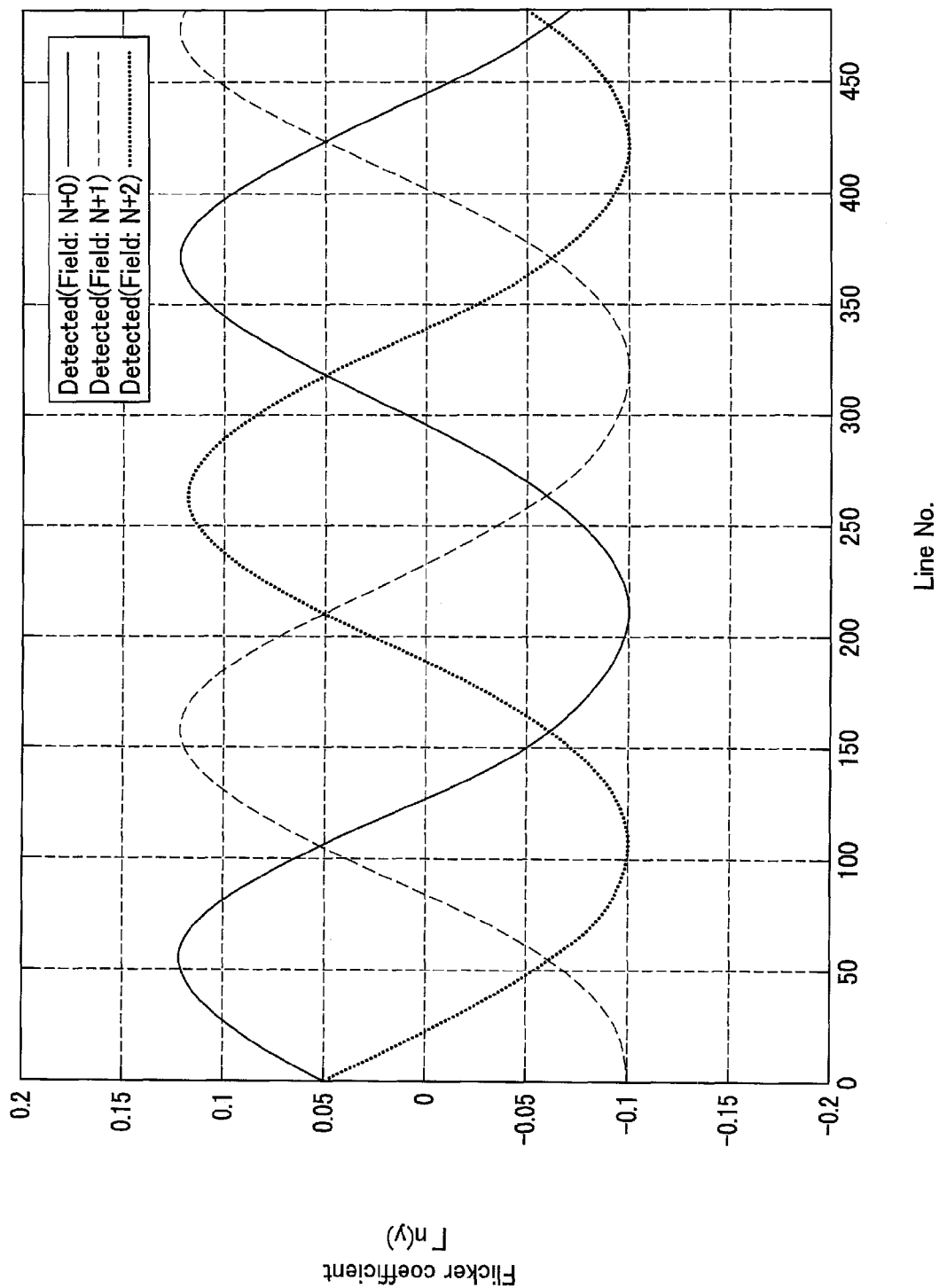
FIG. 33 is a graph of the estimated flicker coefficient for the subject of FIG. 29.

FIG. 33 is a graph of the estimated flicker coefficient Γn (y) of three consecutive fields for the subject of FIG. 29.

With the above-described technique, it is possible to accurately detect the flicker component by computationally determining the difference value Fn (y)–Fn_1 (y) and normalizing it with the average value AVE [Fn (y)] even in regions such as black background regions and low illuminance regions where the flicker component is minute and it is completely buried in the signal component when the integral value of Fn (y) is simply used.

Estimation of the flicker component from the spectra of no more than the degree of an appropriate ordinal number is approximation of the flicker component without completely reproducing the normalized difference value gn (y). However, even if the normalized difference value gn (y) produces a discontinued part due to the condition of the subject, it is possible to accurately estimate the flicker component for the part by means of such estimation.

From the formula (1) of FIG. 23, the signal component In (x, y) that does not contain any flicker component is expressed by formula (17) of FIG. 26.

In the instance of FIG. 10, arithmetic operation block 40 adds one to the flicker component Γn (y) obtained from the flicker generation block 53 and divides the input video signal In' (x, y) by the sum [1+Γn (y)].

Then, as a result, the flicker component that is contained in the input video signal In' (x, y) is substantially completely eliminated and a signal component In (x, y) that practically does not contain any flicker component is obtained as output video signal (RGB primary color signal or luminance signal with a reduced flicker) from the arithmetic operation block 40.

If all the above-described processing operation is not completed within the time period of a field due to the limited operation capacity of the system, the arithmetic operation block 40 may be provided with a function of retaining the flicker coefficients Γn (y) of three fields so that the retained flicker coefficients Γn (y) may be subjected to arithmetic operations for the input video signal In' (x, y) after the three fields by utilizing the characteristic that the flicker repeatedly appears in every three fields.

In the instance of FIG. 10, if the level of the input video signal In' (x, y) is in a saturation zone and the arithmetic operation block 40 performs the arithmetic operation of the formula (17), the signal component (color component or luminance component) can be changed. Therefore, it is desirable that the arithmetic operation block 40 has a configuration as illustrated in FIG. 11.

Figure 11:
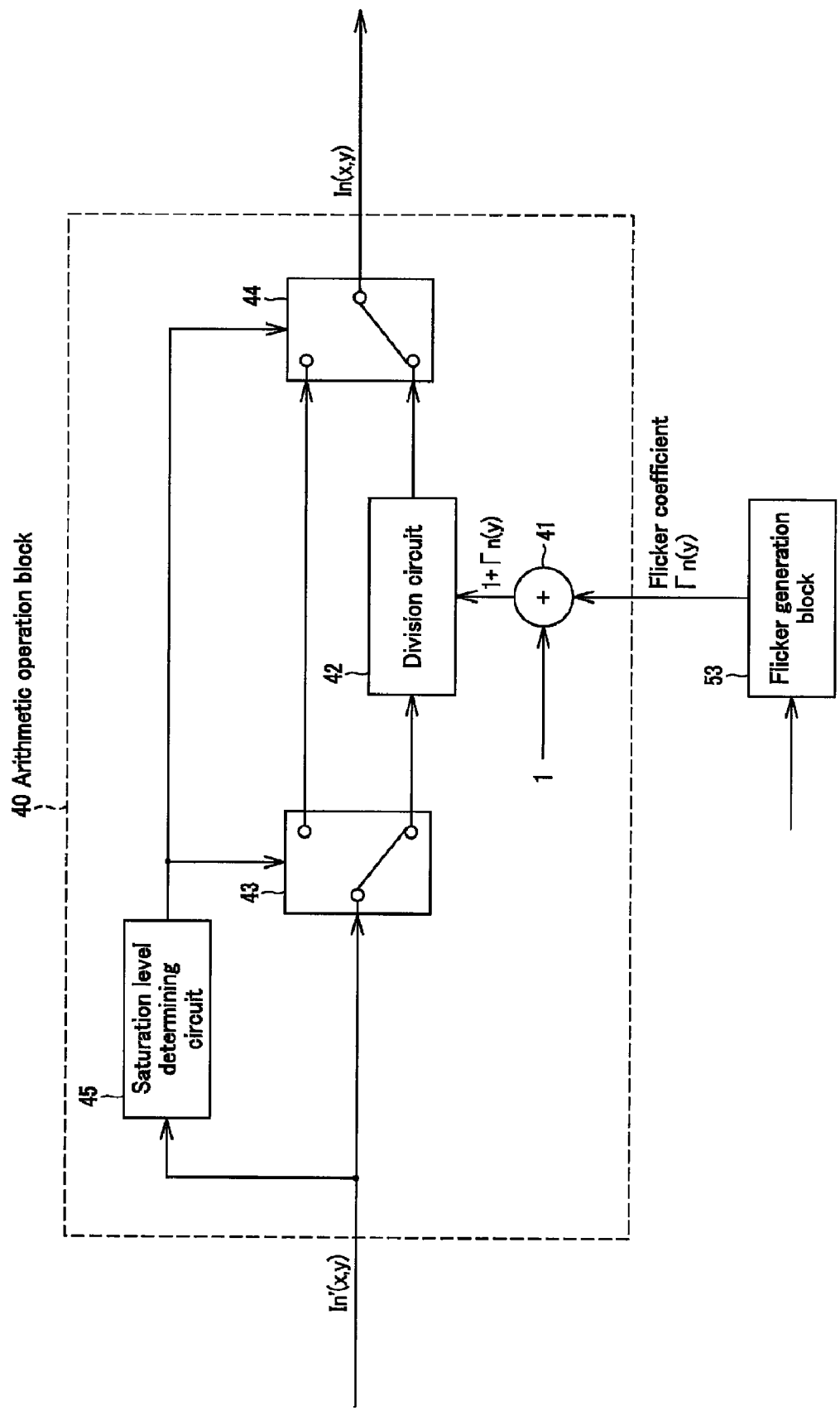
FIG. 11 is a schematic block diagram of an exemplary arithmetic block when a saturated region is taken into consideration.

The arithmetic operation block 40 having a configuration as illustrated in FIG. 11 includes an addition circuit 41 for adding one to the flicker coefficient Γn (y) from the flicker generation block 53, a division circuit 42 for dividing the input video signal In' (x, y) by the sum [1+Γn (y)], an input side switch 43, an output side switch 44 and a saturation level determining circuit 45, which saturation level determining circuit 45 determines if the level of the input video signal In' (x, y) is above the threshold level of the saturation zone or not for each pixel.

If the level of the input video signal In' (x, y) does not reach the threshold level of the saturation zone for a pixel, the switches 43 and 44 are turned to the side of the division circuit 42 by the saturation level determining circuit 45 and the result of the arithmetic operation of the formula (17) is output from the arithmetic operation block 40 as output video signal as described above for the pixel.

If, on the other hand, the level of the input video signal In' (x, y) is not lower than the threshold level of the saturation zone for a pixel, the switches 43 and 44 are turned to the opposite side by the saturation level determining circuit 45 and the input video signal In' (x, y) is output straight from the arithmetic operation block 40 as output video signal.

Therefore, the signal component (color component or luminance component) is not changed when the level of the input video signal In' (x, y) is in the saturation zone to make it possible to obtain a high image quality output video signal.

Thus, it is possible to effectively secure the accuracy of finite computations by normalizing the difference value Fn (y)–Fn_1 (y) by means of the average value AVE [Fn (y)] as in the instance of FIG. 10. However, the integral value Fn (y) may be normalized directly by means of the average value AVE [Fn (y)] when the necessary accuracy of computations is achieved.

Figure 12:
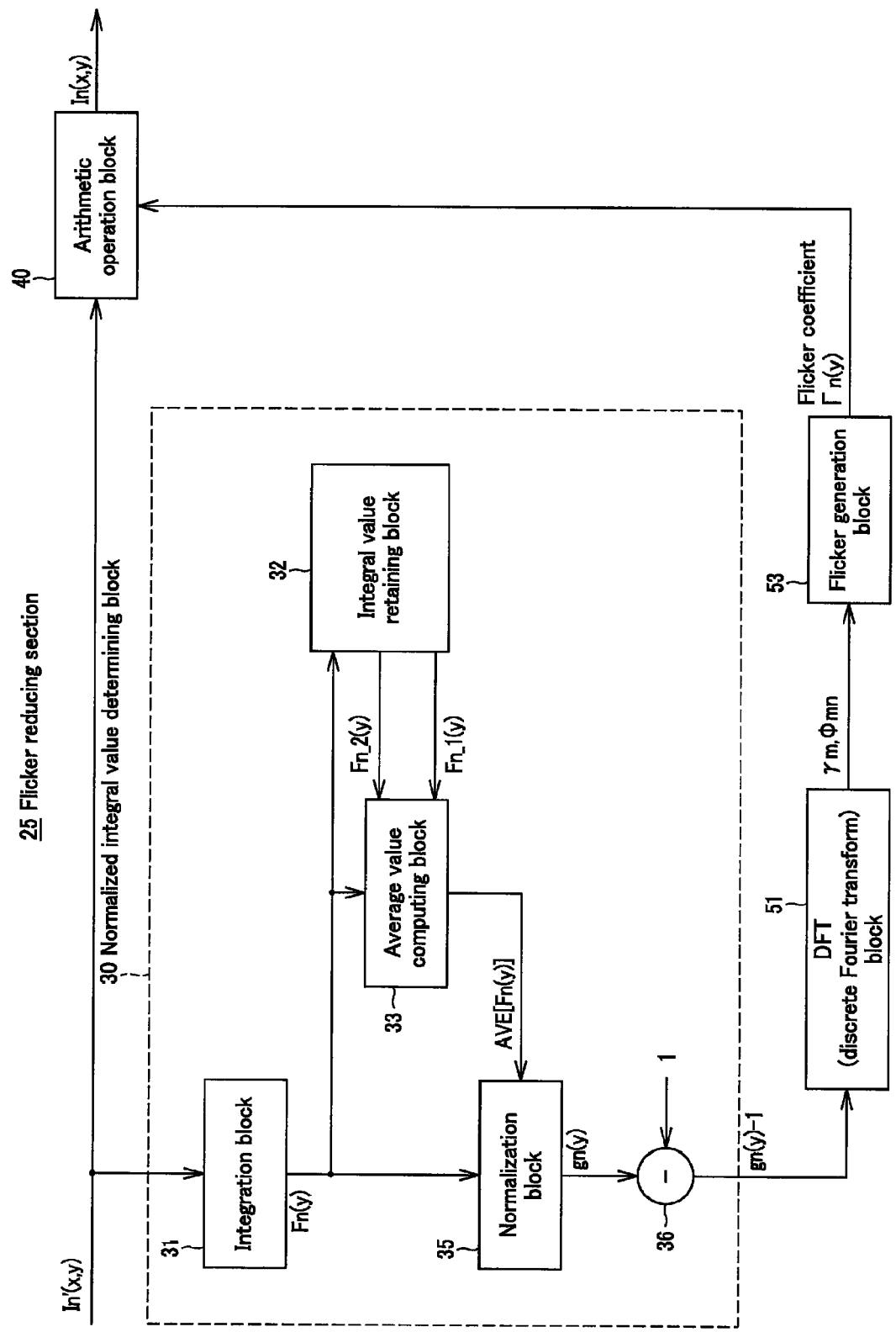
FIG. 12 is a schematic block diagram of a second exemplary flicker reducing section.

FIG. 12 illustrates such an instance. Referring to FIG. 12, the normalization block 35 normalizes the integral value Fn (y) from the integration block 31 by dividing it by the average value AVE [Fn (y)] from the average value computing block 33 to computationally determine the normalized difference value gn (y).

However, then, the normalized difference value gn (y) after the normalization is expressed by formula (18) of FIG. 27. Therefore, a subtraction circuit 36 subtracts one from the normalized difference value gn (y), which is expressed by the formula (18), as shown by formula (19) of FIG. 27 and the result is transmitted to the DFT block 51 in order to make the downstream processing operations same as those of the instance of FIG. 10.

Then, since |Am|=γm and θm=Φmn, it is possible to determine γm and Φmn respectively by means of formulas (20a) and (20b) of FIG. 27 on the basis of the formulas (15a) and (15b) of FIG. 26.

Thus, while the DFT block 51 extracts spectra by means of a DFT operation as defined by the formula (13) and subsequently estimates the amplitude γm and the initial phase Φmn of the flicker component of each degree by way of the arithmetic operations of the formulas (16a) and (16b) in the instance of FIG. 10, it extracts spectra by means of a DFT operation as defined by the formula (13) and subsequently estimates the amplitude γm and the initial phase Φmn of the flicker component of each degree by way of the arithmetic operations of the formulas (20a) and (20b) in the instance of FIG. 12. The subsequent processing operations of the instance of FIG. 12 are same as those of the instance of FIG. 10.

In the instance of FIG. 12, the difference computing block 34 is not necessary and the flicker reducing section 25 can be simplified so much.

In this instance again, it is desirable that the arithmetic operation block 40 has a configuration as illustrated in FIG. 11.

Since the average value AVE [Fn (y)] that is used for the purpose of normalization in the instance of FIG. 10 is equal to αn (y) as seen from the formula (6) when the approximation of the formula (7) of FIG. 24 holds true and the second term [αn y*Γn (y)] of the formula (4) in FIG. 23 is satisfactorily smaller than αn (y) of the first term, the influence of the second term on the normalization is very small.

Therefore, practically no problem arises if the integral value Fn (y) is used for the purpose of normalization in place of the average value AVE [Fn (y)] and it is possible to effectively detect the flicker component by using the integral vale Fn (y) as in the case of using the average value AVE [Fn (y)].

Figure 13:
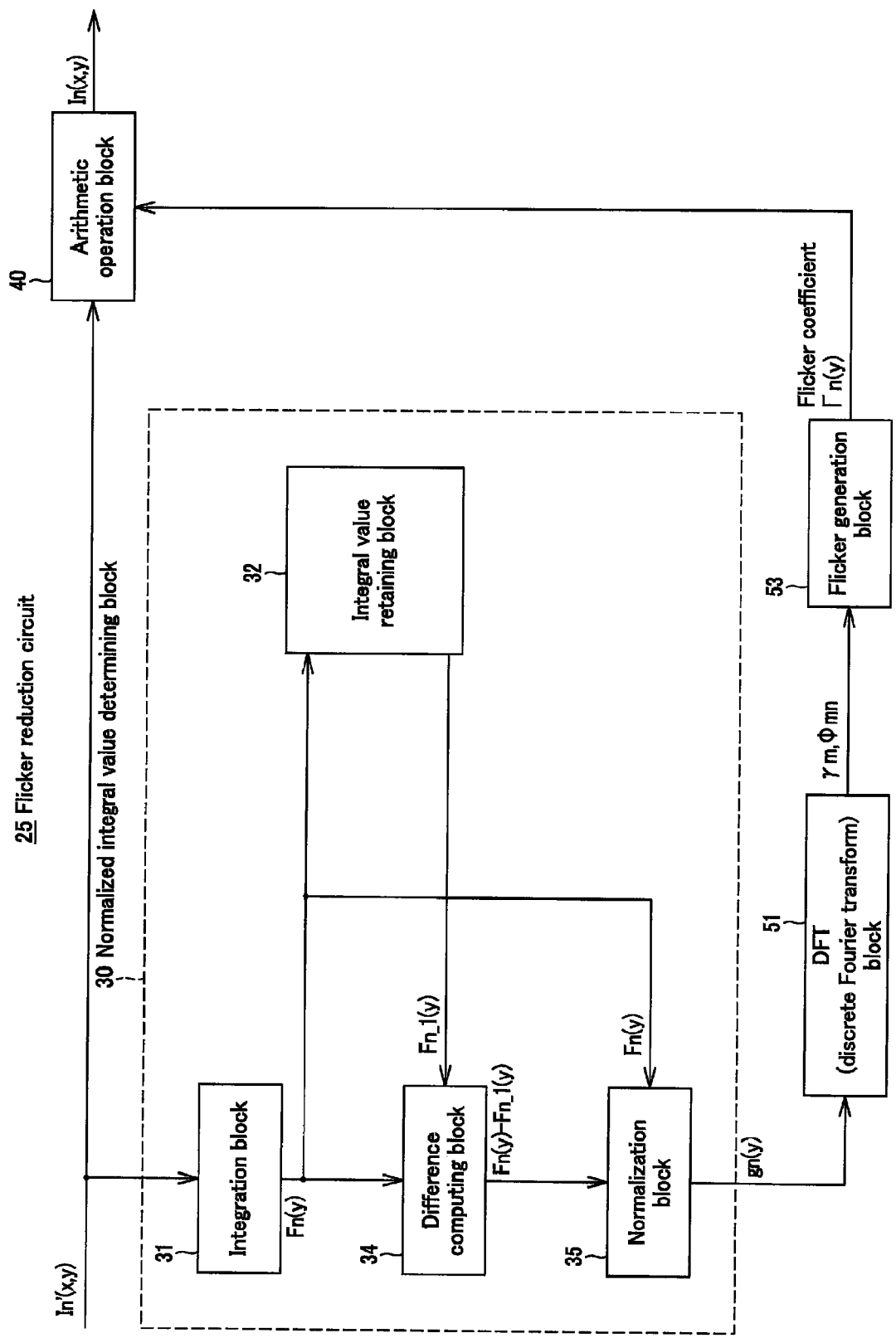
FIG. 13 is a schematic block diagram of a third exemplary flicker reducing section.

Thus, in the instance of FIG. 13, the normalization block 35 normalizes the difference value Fn (y)–Fn_1 (y) from the difference computing block 34 as it divides the difference value by the integral value Fn (y) from the integration block 31. All the subsequent processing operations are same as those in the instance of FIG. 10.

Since, in the instance of FIG. 13, it is sufficient for the integral value retaining block 32 to retain only the integral value of a field and the average value computing block 33 is not necessary, the configuration of the flicker reducing section 25 can be simplified.

In this instance again, it is desirable that the arithmetic operation block 40 has a configuration as illustrated in FIG. 11.

When an image is picked up under the lighting of a non-fluorescent lamp (in a lighting environment where a fluorescent lamp is not used), no particular problem arises if the above-described flicker reducing process is executed. Then, however, the image quality may be adversely influenced by the unnecessarily executed process, even if the flicker component is small enough.

In other words, it is desirable to configure the flicker reducing section 25 in such a way that no flicker reducing process is executed and the input video signal In' (x, y) is output straight from the flicker reducing section 25 as output video signal when an image is picked up under the lighting of a non-fluorescent lamp.

Figure 14:
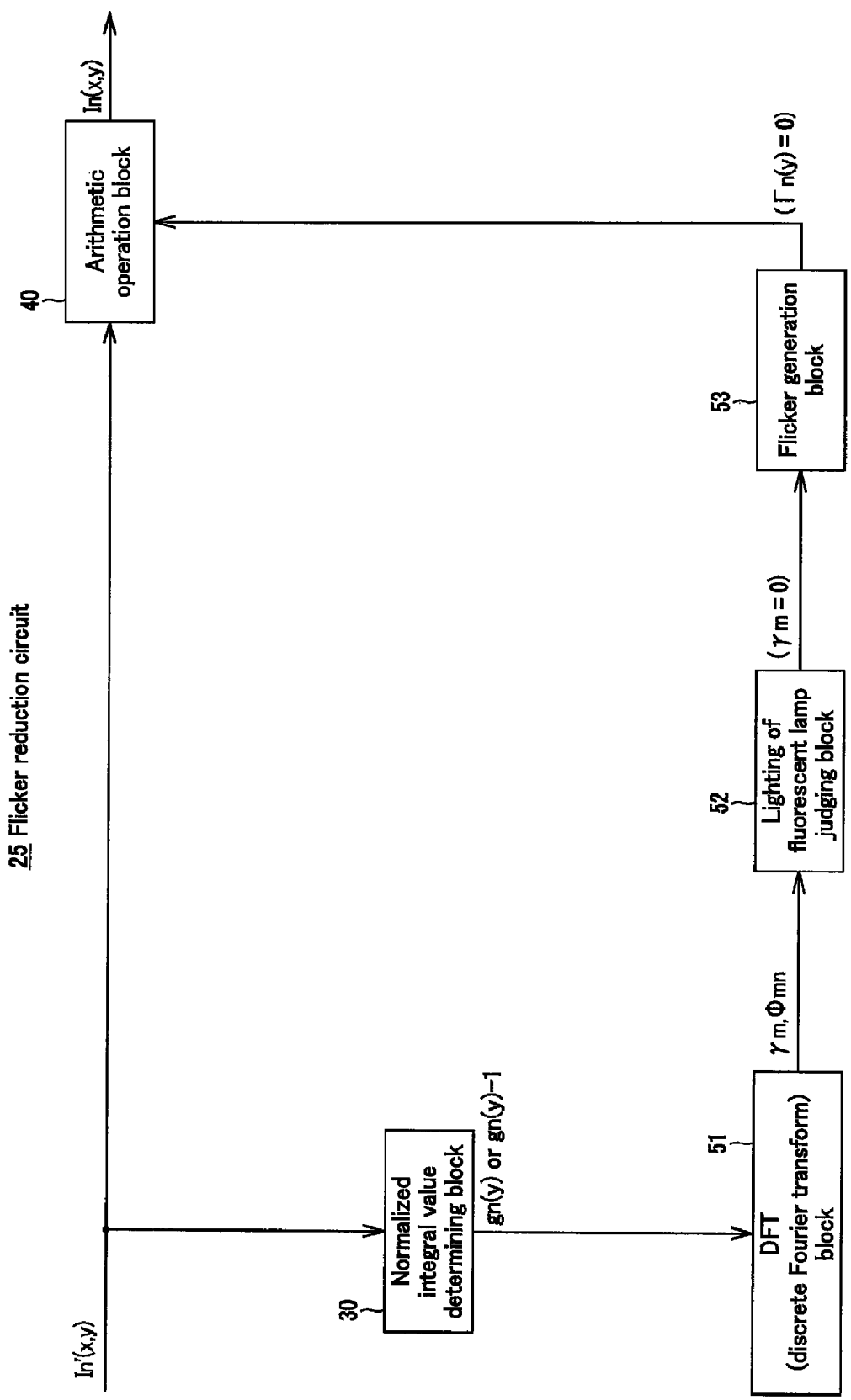
FIG. 14 is a schematic block diagram of an exemplary flicker reducing section when lighting by a non-fluorescent lamp is taken into consideration.

FIG. 14 is a schematic block diagram of an exemplary flicker reducing section 25 that can be used when lighting by a non-fluorescent lamp is taken into consideration. Referring to FIG. 14, a normalized integral value determining block 30 has a configuration of the instance of FIG. 10, 12 or 13. While not the integral value Fn (y) but the difference value Fn (y)–Fn_1 (y) is normalized in the instances of FIGS. 10 and 13, the block 30 responsible for it is also referred to as normalized integral value determining block for the purpose of convenience.

In the instance of FIG. 14, a lighting of fluorescent lamp judging block 52 is arranged between the DFT block 51 and the flicker generation block 53.

Figure 28A:
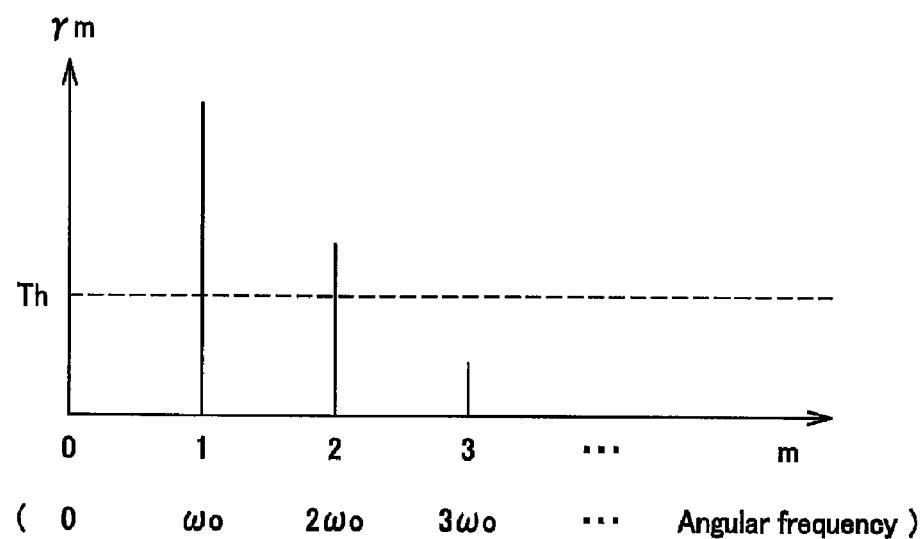
FIG. 28 is a chart to be used for explaining the examples of FIGS. 14 and 15.
Figure 28B:
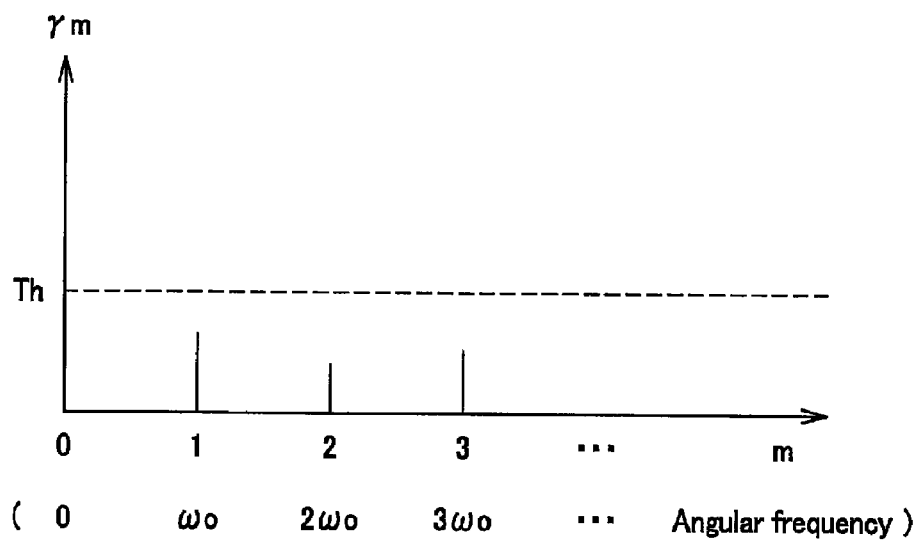

The level (amplitude) γm of the component of each degree as estimated and computationally determined by the DFT block 51 is found sufficiently above a threshold value Th for m=1 but rapidly falls as the value of m increases under the lighting of a fluorescent lamp as shown in FIG. 28A. On the other hand, the level of the component of any degree is found under the threshold value Th under the lighting of a non-fluorescent lamp as shown in FIG. 28B.

Under the lighting of a non-fluorescent lamp, it is ideal that the spectrum is equal to nil. In reality, however, it is inevitable that the normalized difference value gn (y) or the integral value gn (y)−1 that is produced from the signals of a plurality of consecutive fields includes a frequency component to a small extent because the subject moves.

Therefore, the lighting of fluorescent lamp judging block 52 determines, for example, if the level of the component for m=1 exceeds the threshold value Th or not and, if it exceeds the threshold value Th, the block 52 so judges that the lighting is that of a fluorescent lamp and outputs the estimated values of γm and Φmn obtained from the DFT block 51 straight to the flicker generation block 53. Therefore, in this case, the above-described flicker reducing process is executed.

If, on the other hand, the level of the component for m=1 is found not higher than the threshold value Th, the lighting of fluorescent lamp judging block 52 so judges that the lighting is that of a non-fluorescent lamp and reduces the estimated value of γm to zero for all the degrees m. Therefore, in this case, the flicker coefficient Γn (y) also becomes equal to zero and the input video signal In' (x, y) is output straight from the arithmetic operation block 40 as output video signal.

Figure 15:
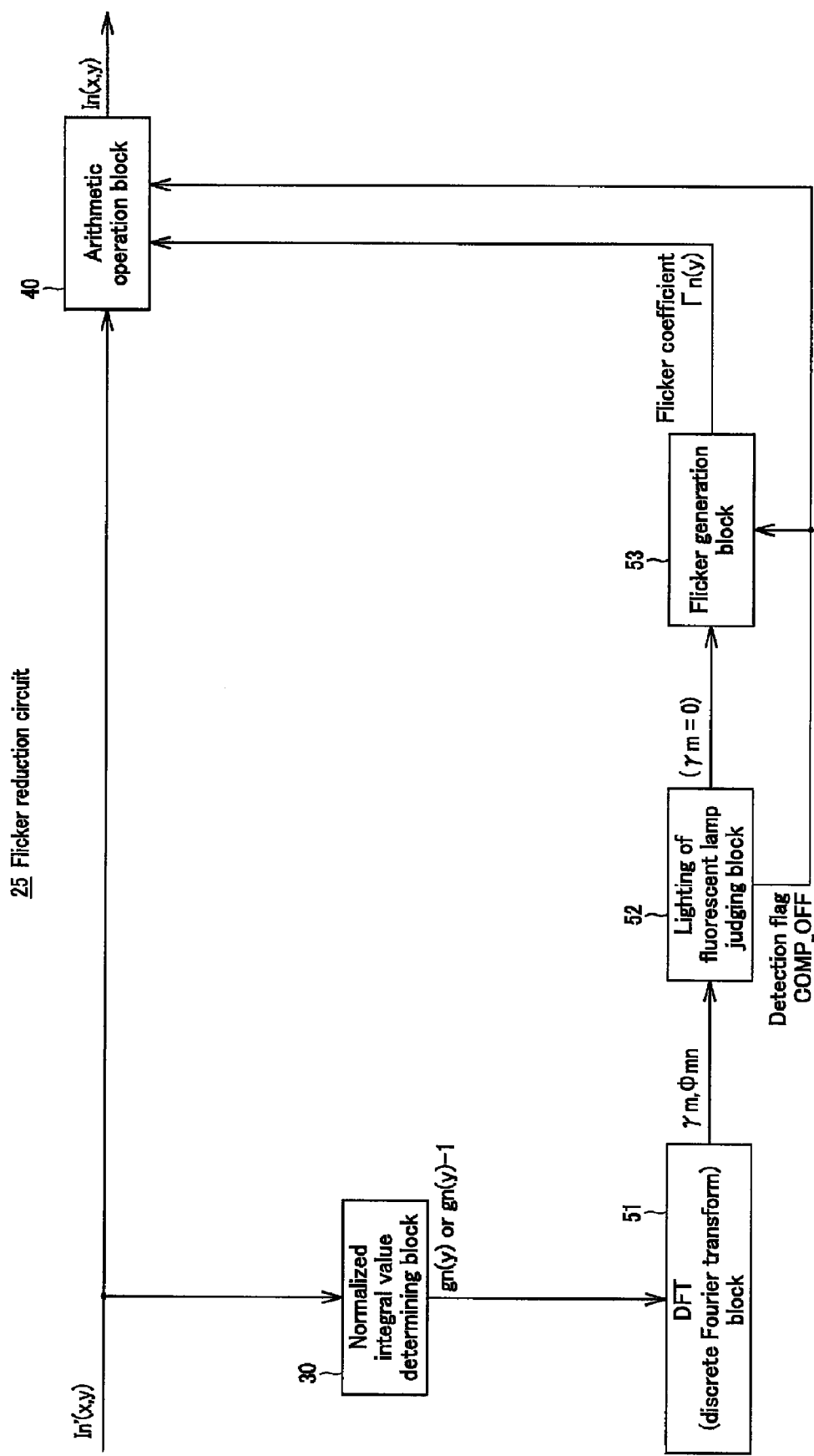
FIG. 15 is a schematic block diagram of another exemplary flicker reducing section when lighting by a non-fluorescent lamp is taken into consideration.

FIG. 15 is a schematic block diagram of another exemplary flicker reducing section that can be used when lighting by a non-fluorescent lamp is taken into consideration. In this example, the lighting of fluorescent lamp judging block 52 judges if the lighting is that of a fluorescent lamp or not as in the example of FIG. 14. However, if it so judges that the lighting is that of a non-fluorescent lamp, it sets detection flag COMP_OFF in position and stops the processes at the flicker generation block 53 and the arithmetic operation block 40 in order to output the input video signal In' (x, y) straight from the arithmetic operation block 40 as output video signal. If the lighting of fluorescent lamp judging block 52 so judges that the lighting is that of a fluorescent lamp, it resets the detection flag COMP_OFF so that the flicker reducing process is executed in a manner as described above.

In the instance of FIG. 15, when an image is picked up under the lighting of a non-fluorescent lamp, it is possible to not only eliminate the adverse effect on the image quality but also reduce the power consumption.

The subject can often change to a large extent within a short period of time as the person shooting the subject operates the camera for zooming, panning and/or tilting or as a result of camera shake, namely, a movement of the hand that is operating the camera. Then, the assumption of the formula (7) of FIG. 24 does not hold true and consequently the flicker detection accuracy will be degraded.

Figure 16:
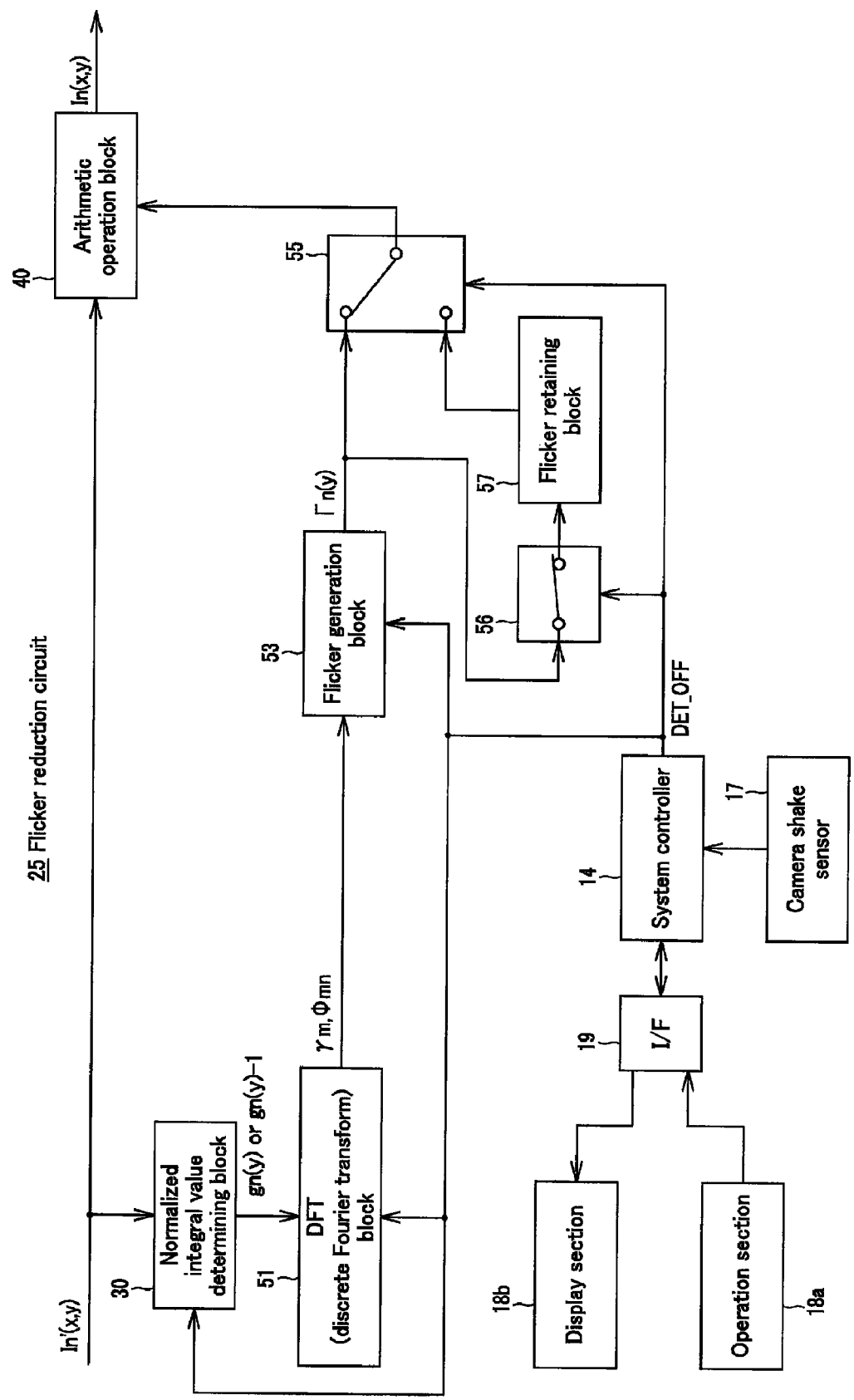
FIG. 16 is a schematic block diagram of an exemplary image pickup apparatus that can be realized when a situation where the subject is changed to a large extent by an operation or an action of the person shooting the subject by means of the apparatus.

The image pickup apparatus is made to have a configuration as illustrated in FIG. 16 by taking a situation where the subject changes to a large extent within a short period of time due to the operation or the action of the person shooting the subject into consideration.

In the instance of FIG. 16, switches 55, 56 and a flicker retaining block 57 are arranged between the flicker generation block 53 and the arithmetic operation block 40 of any of the arrangements for the flicker reducing section 25 as illustrated in FIGS. 10, 12 and 13 and a detection flag DET_OFF, which will be described in greater detail hereinafter, output from the system controller 14 is supplied to the switches 55 and 56 as switching signal.

The flicker retaining block 57 is adapted to hold the flicker coefficients Γn (y) of three fields and store the flicker coefficient Γn (y) of a field for the next field each time an operation of processing the field is over. At the same time, the flicker retaining block 57 is so adapted as to switch the read out output repetitively in every three fields.

A situation where the subject changes to a large extent within a short period of time due to the operation or the action of the person shooting the subject is detected by the system controller 14.

For example, as the person shooting the subject depresses the zoom key of the operation section 18a, the key depressing action is detected by the system controller 14 by way of the interface 19. Then, the system controller 14 controls the operation of driving the lens for a close-up view, a wide angle view or some other effect in response to the zooming operation of the person. On the other hand, a hand movement of the person is detected by the camera shake sensor 17 and camera shake information is transmitted to the system controller 14. Then, the system controller 14 controls the operation of correcting the camera shake according to the camera shake information. Similarly, a panning operation and/or a tilting operation is also detected by the system controller 14 so that it typically reduces the effect of correcting the camera shake during a panning operation. These detection/control operations are not particularly different from those of ordinary cameras.

Additionally, in the instance of FIG. 16, when the system controller 14 detects an operation or an action on the part of the person shooting the subject that changes the subject to a large extent within a short period of time, it set the detection flag DET_OFF in position. When the system controller 14 does not detect such an operation or an action, it resets the detection flat DET_OFF.

In an ordinary situation where the subject does not change to a large extent within a short period of time, the detection flag DET_OFF is reset and the switch 55 of the flicker reducing section 25 is turned to the side of the flicker generation block 53 so that the flicker coefficient Γn (y) at that time is supplied to the arithmetic operation block 40 and a flicker reducing process is executed, while the switch 56 is turned on to store the flicker coefficient Γn (y) at that time in the flicker retaining block 57.

On the other hand, in a situation where the subject changes to a large extent within a short period of time, the detection flag DET_OFF is set in position and the switch 55 of the flicker reducing section 25 is turned to the side of the flicker retaining block 57. Therefore, on behalf of the flicker coefficient Γn (y) supplied from the flicker generation block 53, which shows poor detection accuracy, the flicker coefficient Γn (y) that is read out from the flicker retaining block 57 and shows good detection accuracy is supplied to the arithmetic operation block 40. This is because the accurate flicker coefficient Γn (y) is obtained immediately before an operation or an action on the part of the person shooting the subject occurs and the subject changes to a large extent within a short period of time. Then, the flicker reducing process is executed, while the switch 56 is turned off to prevent the flicker coefficient Γn (y) that shows a poor detection accuracy from being stored in the flicker retaining block 57.

Thus, in this instance, the flicker detection accuracy is held to a high level, and therefore, the flicker is reliably and satisfactorily reduced even in a situation where the subject changes to a large extent within a short period of time due to the operation or the action of the person shooting the subject.

Additionally, in this instance, the detection flag DET_OFF is also transmitted to the normalized integral value determining block 30, the DFT block 51 and the flicker generation block 53. When the subject changes to a large extent within a short period of time due to the operation or the action of the person shooting the subject, the detection flag DET_OFF is set in position and the processing operations in the normalized integral value determining block 30, the DFT block 51, and the flicker generation block 53 are suspended. This, this instance can also reduce the power consumption.

While the above-described instance is adapted to switch the current flicker coefficient Γn (y) to that of the immediately preceding signal, it may alternatively be so arranged that an upstream signal, e.g., the integral value Fn (y), be switched to the immediately preceding signal.

As will be described hereinafter, the flicker reducing process may be unnecessary depending on the situation of shooting the subject. In such a situation, it is desirable that the flicker reducing process is not executed as in the case where the subject is shot under the lighting of a non-fluorescent lamp, taking the adverse effect on the image quality into consideration.

Shooting situations where the flicker reducing process is unnecessary include firstly those where a still image is obtained by means of a video camera or a digital still camera that can pick up both moving images and still images.

In such situations, the exposure timings (timings for starting an exposure and those for ending an exposure) of all the pixels of an image can be made to be simultaneous when a camera has an XY address scanning type imaging element such as a CMOS imaging element. It is possible to prevent the flicker of a fluorescent lamp from appearing on the image, therefore. The operation of reading data from the imaging element can be conducted slowly under a condition where the mechanical shutter is closed and incoming light is totally blocked because there is no restriction to the frame rate unlike a case where a moving image is picked up.

In case of the embodiment of FIG. 7, according to the camera operation at the operation section 18a, the system controller 14 can detect if the camera is in a situation where the exposure timings of all the pixels of an image are made to be simultaneous to obtain a still image or not.

Shooting situations where the flicker reducing process is unnecessary include secondly those where an image is to be picked up outdoor under sun light and those where the exposure time (electronic shutter operating time) can be made equal to integer times of the cycle time of the luminance change of a fluorescent lamp (1/100 seconds) typically by adjusting the exposure value.

A situation where an image is being picked up under the lighting of a fluorescent lamp can be detected from the level of the spectrum extracted by the DFT block 51 as described above by referring to the instances of FIGS. 14 and 15. While a situation where an image is picked up outdoor under sunlight may belong to the category of lighting of a non-fluorescent lamp, such a situation can be detected directly by the system controller 14 on the basis of the quantity of light being shed on the subject.

As pointed out above, no flickering of fluorescent lamp such as flickering in the image appears in situations where the exposure time can be made equal to integer times of the cycle time of the luminance change of a fluorescent lamp (1/100 seconds) even by a camera using an XY address scanning type imaging element. The system controller 14 can directly detect if the exposure time is made equal to integer times of the cycle time of the luminance change of a fluorescent lamp by adjusting the exposure value or not.

Thus, the system is so configured that the flicker reducing process is not executed and the input video signal In' (x, y) is output straight from the flicker reducing section 25 as output video signal when the system controller 14 judges that no flicker reducing process is necessary for the shooting situation.

Figure 17:
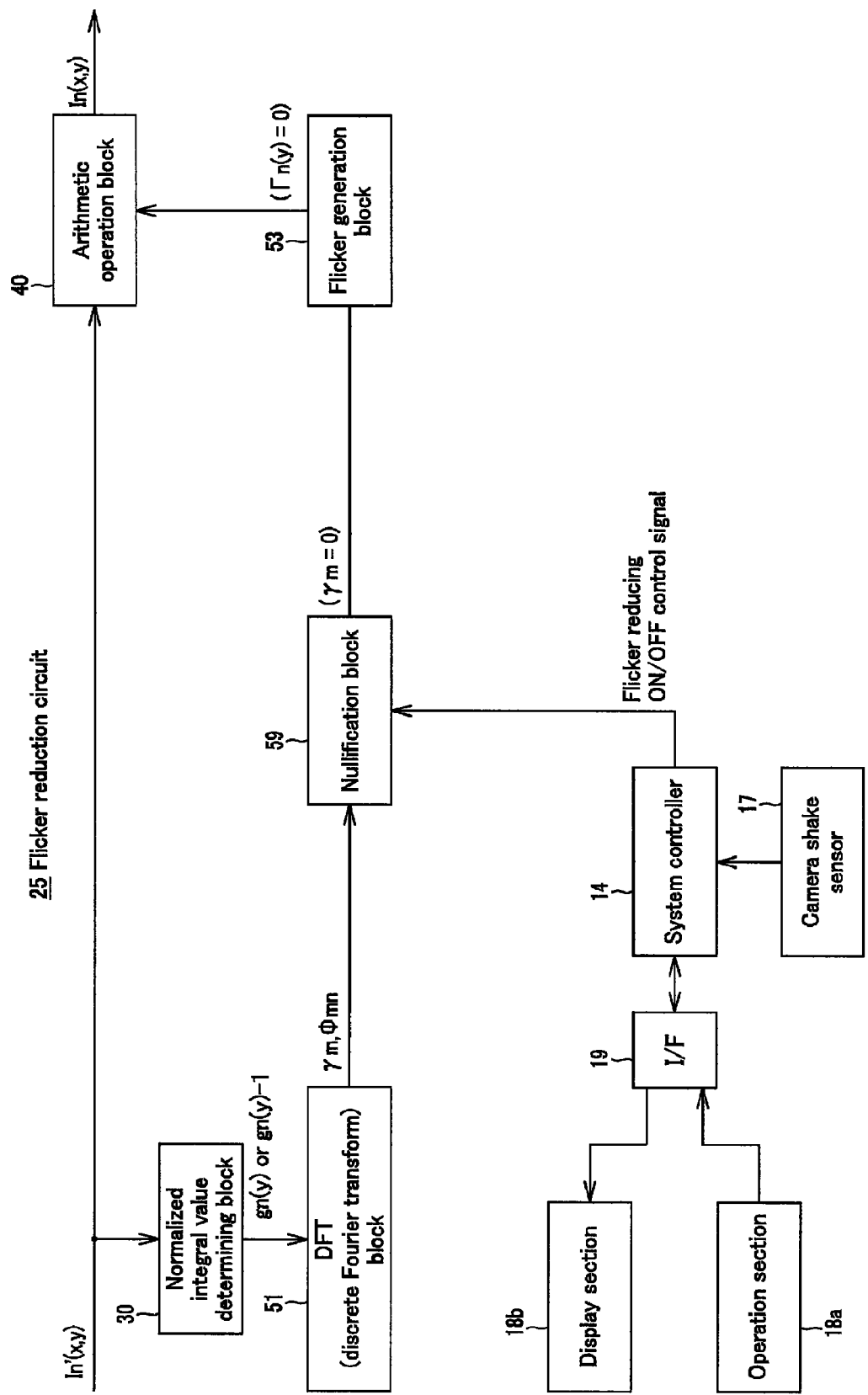
FIG. 17 is a schematic block diagram of an exemplary image pickup apparatus that can be realized when an occasion where a flicker reducing process is not necessary due to the imaging situation is taken into consideration.

FIG. 17 is a schematic block diagram of an exemplary image pickup apparatus that can be realized when an occasion, where a flicker reducing process is not necessary due to the imaging situation, is taken into consideration. In the illustrated instance, a nullification block 59 is arranged between the DFT block 51 and the flicker generation block 53 in the flicker reducing section 25 and controlled by the flicker reducing ON/OFF control signal from the system controller 14, When it is judged by the system controller 14 that the flicker reducing process has to be executed, the flicker reducing ON/OFF control signal is put into an ON state and the nullification block 59 outputs the estimated values of γm and Φmn from the DFT block 51 straight to the flicker generation block 53. Then, in this case, the above-described flicker reducing process is executed.

When, on the other hand, it is judged by the system controller 14 that the flicker reducing process does not have to be executed, the flicker reducing ON/OFF control signal is put into an OFF state and the nullification block 59 reduces the estimated value of γm to zero for all the degrees of m. Therefore, in this case, the flicker coefficient Γn (y) is also reduced to zero and the input video signal In' (x, y) is output straight from the arithmetic operation block 40 as output video signal.

Figure 18:
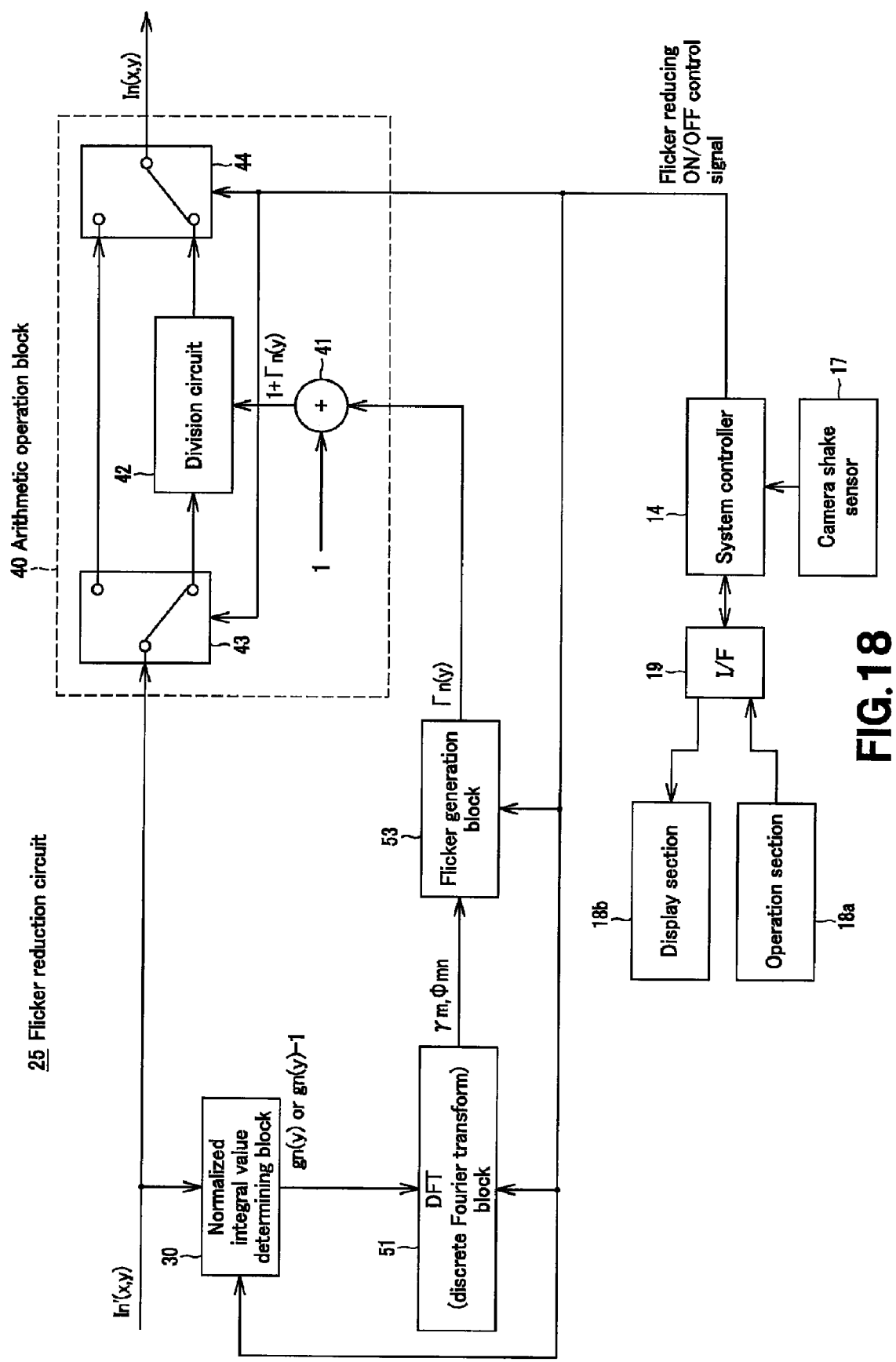
FIG. 18 is a schematic block diagram of another exemplary image pickup apparatus that can be realized when an occasion where a flicker reducing process is not necessary due to the imaging situation is taken into consideration.

FIG. 18 is a schematic block diagram of another exemplary image pickup apparatus that can be realized when an occasion where a flicker reducing process is not necessary due to the imaging situation is taken into consideration. In this instance, the arithmetic operation block 40 of the flicker reducing section 25 is formed so as to include an addition circuit 41, a division circuit 42 and switches 43, 44 as shown in FIG. 11 but not a saturation level determining circuit 45, and the switches 43 and 44 are switched according to the flicker reducing ON/OFF control signal from the system controller 14.

When the system controller 14 so judges that the flicker reducing process has to be executed, the switches 43 and 44 are turned to the side of the division circuit 42. Then, as pointed out earlier, the result of the arithmetic operation of the formula (17) is output from the arithmetic operation block 40 as output video signal.

When, on the other hand, the system controller 14 so judges that the flicker reducing process does not have to be executed, the switches 43 and 44 are turned to the opposite side and the input video signal In' (x, y) is output straight from the arithmetic operation block 40 as output video signal.

Additionally, in the instance of FIG. 18, the flicker reducing ON/OFF control signal is also transmitted to the normalized integral value determining block 30, the DFT block 51, and the flicker generation block 53 so that, when the system controller 14 so judges that the flicker reducing process does not have to be executed, the processing operations of the normalized integral value determining section 30, the DFT block 51, and the flicker generation block 53 are suspended. Thus, this instance can also reduce the power consumption.

With each of the above-described instances, it is possible to reliably and effectively reduce the flicker component from the input video signal in a state where flickering of fluorescent lamp is steadily and stably being produced.

However, since, with each of the above-described instances, the average or the difference of a plurality of fields is computationally determined to detect the flicker component, it is not possible to accurately detect the flicker component in a transiently unstable state that arises when the switch of a fluorescent lamp is turned on or off or when the subject enters into or comes out from a room that is held under the lighting of a fluorescent lamp. Therefore, when a flicker reducing process is executed on the basis of the flicker component obtained in any of such situations, the input video signal can be corrected in an undesirable way.

Additionally, with each of the above-described instances, although flickering can be reduced reliably and stably for a change in the horizontal angle of view that may be produced by a horizontal movement of the subject, a camera operation such as panning and/or zooming or a camera shake by the person shooting the subject, the flicker reducing performance is slightly degraded for a change in the vertical angle of view that may be produced by a vertical movement of the subject, a camera operation such as tilting and/or zooming or a camera shake by the person shooting the subject.

This problem can be dissolved by the method illustrated in FIG. 16. However, with this method, the flicker coefficient Γn (y) is switched between an ordinary stable state where the subject does not change to a large extent within a short period of time and a state where the subject changes to a large extent within a short period of time due to an operation or an action of the person shooting the subject, which gives the viewer a feeling of incompatibility.

Additionally, while it is not possible to suppress external turbulences in an ordinary stable state, the method illustrated in FIG. 16 provides a quick follow-up capability and hence it directly reacts to external turbulences to give rise to an error in the flicker reduction.

To reduce the influence of external turbulences, a filtering operation may be conducted by means of an LPF (low pass filter) in the process of estimating the flicker component, using a long time constant, so as to retard the follow-up capability for estimating the flicker component.

However, when the follow-up capability is retarded in this way, it is also retarded in a transitional state. Then, there may arise a problem that, while a flicker reducing process has to be executed when a fluorescent lamp is turned on or the subject enters a room under the lighting of a fluorescent lamp, the process is not executed quickly or a problem that, while a flicker reducing process does no longer have to be executed when a fluorescent lamp is turned off or the subject goes out of a room under the lighting of a fluorescent lamp, the execution of the process continues.

Besides, it is possible to perform a flicker reducing operation more flexibly and appropriately in various situations by adjusting the amplitude and the phase of the detected flicker component if necessary and performing arithmetic operations on the adjusted flicker component with the input video signal instead of simply performing arithmetic operations on the detected flicker component with the input video signal.

In the instance that is described below, the amplitude and the phase of the estimated flicker component, which are parameters relating to flicker reduction, are adjusted.

Figure 19:
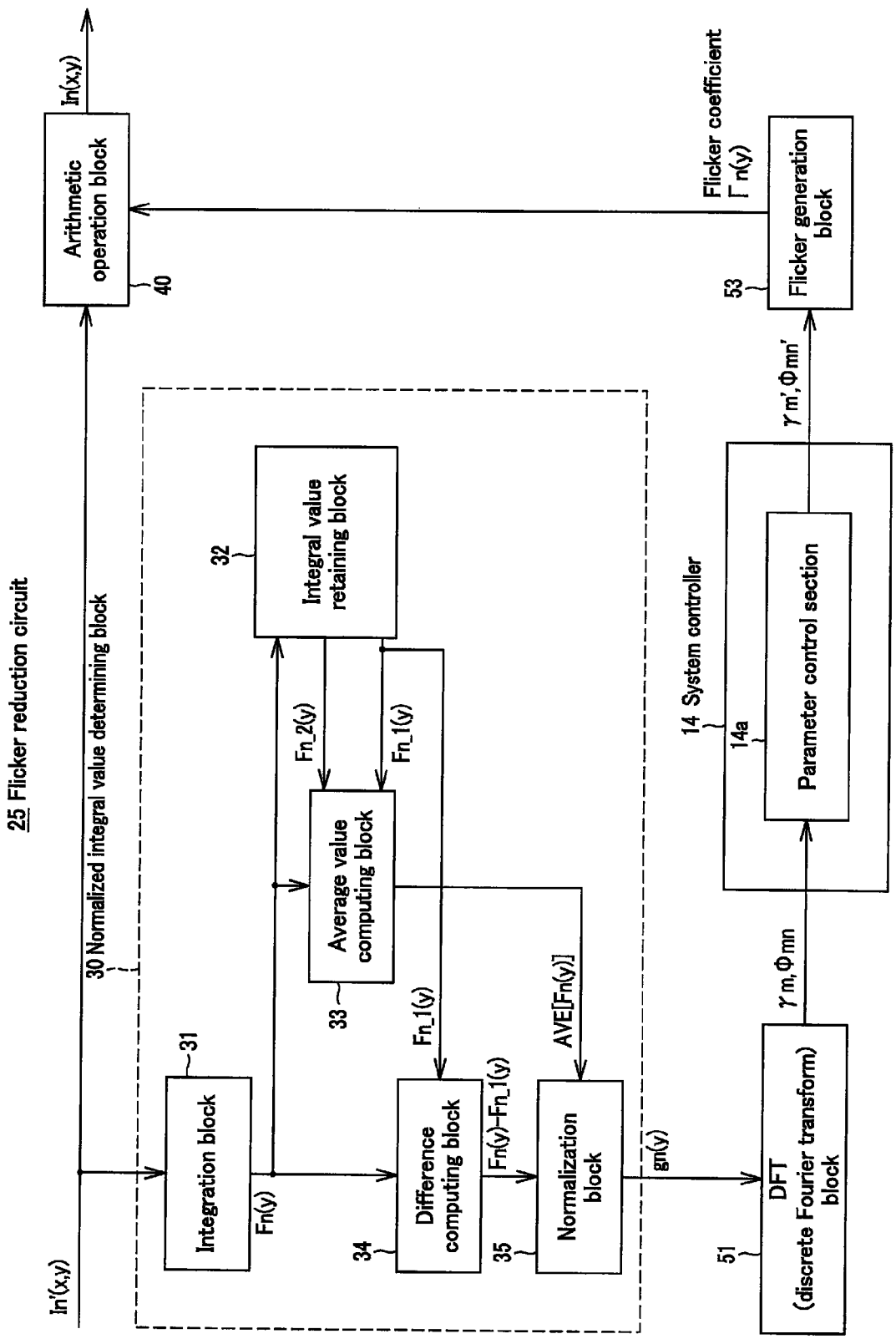
FIG. 19 is a schematic block diagram of an exemplary flicker reducing section when adjusting the estimated flicker component, illustrating the basic configuration thereof.

FIG. 19 illustrates the basic configuration of the flicker reducing section of the instance. In this instance, the data on the amplitude γm and the initial phase Φmn of the estimated flicker component that are obtained from the above-described DFT block 51 of the flicker reducing section 25 are taken into the system controller 14 and adjusted by the parameter control section 14a in the system controller 14 in a manner as described below and the data on the amplitude γm' and the initial phase Φmn' that are obtained as a result of adjustment are input to the flicker generation block 53 of the flicker reducing section 25.

The flicker generation block 53 computationally determines the flicker coefficient Γn (y) expressed by the formula (2) of FIG. 23 from the amplitude γm' and the initial phase Φmn' obtained as a result of adjustment in stead of determining it from the amplitude γm and the initial phase Φmn obtained from the DFT block 51. In other words, in this instance, γm and Φmn in the formula (2) of FIG. 23 are replaced by γm' and Φmn'.

While the normalized integral value determining block 30 of the flicker reducing section 25 in FIG. 19 has a configuration as illustrated in FIG. 10, the normalized integral value determining block 30 may alternatively have a configuration as shown in FIG. 12 or in FIG. 13.

Figure 20:
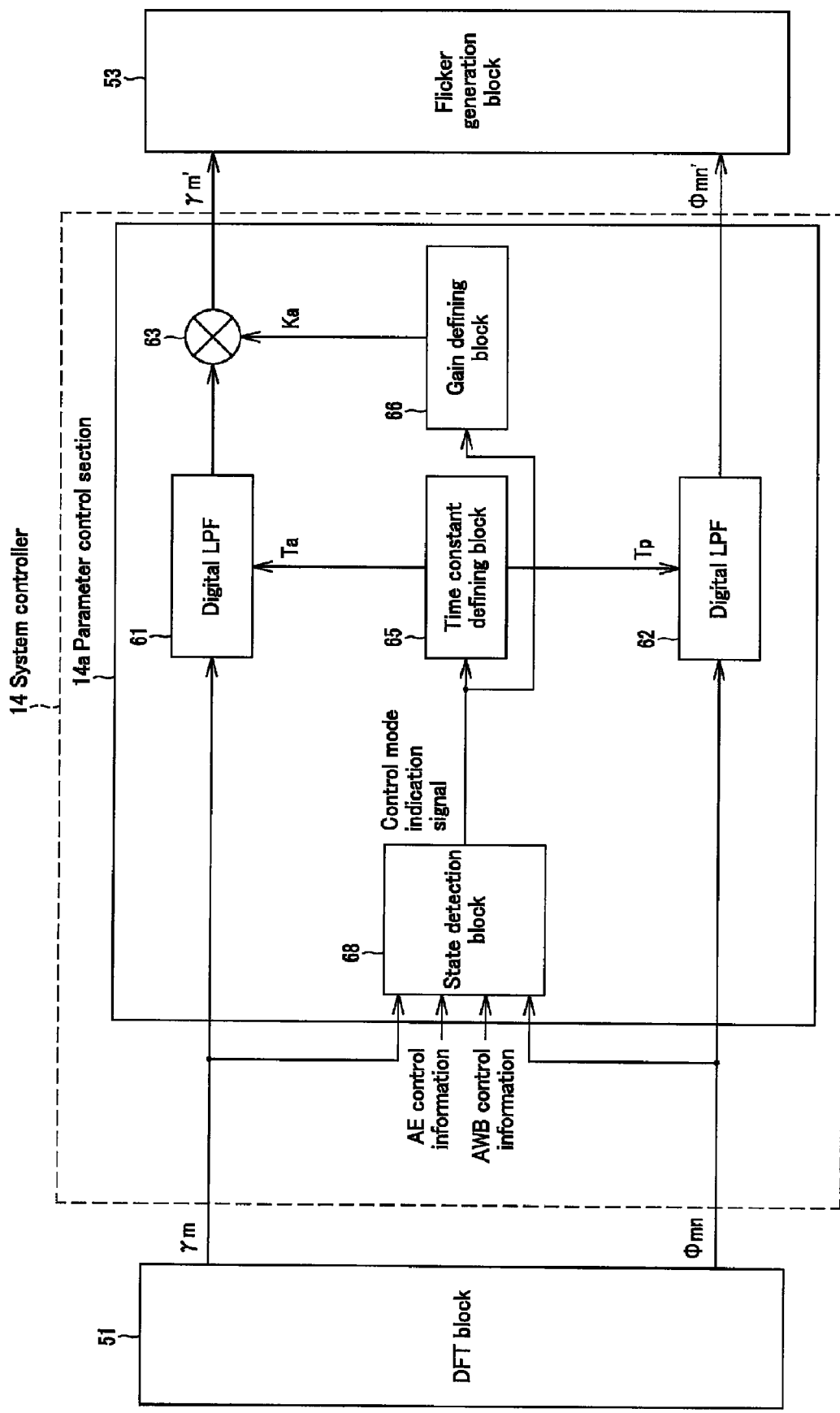
FIG. 20 is a schematic block diagram of a first exemplary system controller when adjusting the estimated flicker component.

FIG. 20 illustrates a first specific example of such an arrangement.

While the data on the amplitude γm and the initial phase Φmn that are used as input signals to the parameter control section 14a include a total of m sets per field, they are summarily shown as a set. So are the data on the amplitude γm' and the initial phase Φmn' that are to be used as output signals of the parameter control section 14a.

In this instance, the data on the amplitude γm and those on the initial phase Φmn from the DFT block 51 are supplied respectively to the digital LPFs (low pass filters) 61 and 62. Then, the output data of the digital LPF 61 are supplied to the gain adjusting circuit (multiplication circuit) 63 and the output data of the gain adjusting circuit 63 are supplied to the flicker generation block 53 as data on the adjusted amplitude γm' whereas the output data of the digital LPF 62 are supplied to the flicker generation block 53 as data on the adjusted initial phase Φmn'.

The time constant Ta of the digital LPF 61 and the time constant Tp of the digital LPF 62 are defined by time constant defining block 65 and the gain (multiplication coefficient) Ka of the gain adjusting circuit 63 is defined by gain defining block 66.

It is desirable that the time constants can be arbitrarily and continuously changed within a predetermined range for the digital LPFs 61 and 62. However, if it is not possible to define the time constant to a desired value, it is sufficient to define it to a value close to the desired one. If it is not possible for a single LPF to change the time constant continuously, it is possible to prepare a plurality of LPFs having separate time constants Ta, Tp in the inside and provide them with control codes so that one of the plurality of LPFs may be selected.

The initial phase Φmn at the time when flickering takes place fluctuates periodically. For example, when the frequency of the commercially supplied AC is 50 Hz and the vertical synchronizing frequency of the camera is 60 Hz, the initial phase Φmn takes a same value in every three fields and the difference as expressed by the formula (3) in FIG. 23 arises between a field and the immediately preceding field.

For this reason, as for the digital LPF 62, an LPF has to be provided for data of the same phase, taking the fluctuations of the initial phase Φmn into consideration. If the cycle period of fluctuations of the initial phase Φmn is three fields as in the above-described instance, three LPFs has to be provided as the digital LPF 62 and the data on the initial phase Φmn have to be allocated to the three FPFs.

Additionally, data on the amplitude γm and the initial phase Φmn and AE (automatic exposure) control information and AWB (automatic white balance) control information that are obtained in the system controller 14 are input to state detection block 68. AE control information is information on the lightness of the image and AWB control information is information that indicates the color temperature and if the lighting is that of a fluorescent lamp or not.

Then, from the input information, the state detection block 68 detects the circumstances, where the image pickup operation is conducted, that influence occurrence of flickering of fluorescent lamp. These circumstances include the state where the current imaging environment is under the lighting of a fluorescent lamp and the state where a transition from under the lighting of a non-fluorescent lamp to under the lighting of a fluorescent lamp is taking place or vice versa, e.g., the state where the switch of the fluorescent lamp is turned on or off, and a control mode is selected according to the result of the detection.

Then, the selected control mode is indicated to the time constant defining block 65 and the gain defining block 66 by a control mode indication signal. Upon receiving the indication, the time constant defining block 65 defines the time constants Ta and Tb of the digital LPFs 61 and 62 and the gain defining block 66 defines the gain Ka at the gain adjusting circuit 63.

FIG. 22 is a chart illustrating the criteria for judging the detection of the state as detected by the state detection block 68. Firstly, when flickering is being produced steadily and stably under the lighting of fluorescent lamp, the amplitude γm of the estimated flicker component takes substantially a constant value and the initial phase Φmn of the estimated flicker component takes a same value in every predetermined cycle period (3 fields when the frequency of the commercially supplied AC is 50 Hz and the vertical synchronizing frequency of the camera is 60 Hz).

Therefore, from these pieces of information, it is satisfactorily possible to determine that flickering is being produced steadily and stably under the lighting of fluorescent lamp.

Additionally, since the lightness of the image fluctuates with a substantially constant cycle period under the lighting of a fluorescent lamp, it is satisfactorily possible to determine that the current situation is under the lighting of a fluorescent lamp from the lightness information for AE control when the information tells so.

Still additionally, with AWB control, the light source is normally estimated from the detected color information and it is judged if the light source is a fluorescent lamp or not. Therefore, it is also satisfactorily possible to determine that the current situation is under the lighting of a fluorescent lamp from the light source estimating information for AWB control.

In this instance, the accuracy of detection is enhanced by comprehensively judging the information over a plurality of fields in the past.

Then, if the state detection block 68 so judges that flickering is steadily and stably taking place under the lighting of a fluorescent lamp, it selects mode A for the control mode as will be described in greater detail hereinafter.

If, on the other hand, the state detection block 68 so judges that flickering is not steadily taking place under the lighting of a non-fluorescent lamp, it means that the amplitude γm of the estimated flicker component is only a noise component that fluctuates randomly near zero and the initial phase Φmn also fluctuates randomly due to the noise.

Thus, from these pieces of information, it is satisfactorily possible to determine that the flicker reducing process is not necessary to be executed under the lighting of a non-fluorescent lamp.

Additionally, since, under the lighting of a non-fluorescent lamp, the lightness of the image does not fluctuate periodically, it is satisfactorily possible to determine that the current situation is under the lighting of a non-fluorescent lamp from the lightness information for AE control when the information tells so. It is also possible to determine that the current situation is under the lighting of a non-fluorescent lamp from the above-described light source estimating information for AWB control.

In this instance, the accuracy of detection is enhanced by comprehensively judging the information over a plurality of fields in the past.

Then, if the state detection block 68 so judges that flickering is not steadily taking place under the lighting of a non-fluorescent lamp (and hence the flicker reducing process does not have to be executed), it selects mode B for the control mode as will be described in greater detail hereinafter.

The time constant defining block 65 and the gain defining block 66 select values for the time constants Ta, Tp of the digital LPFs 61, 62 and the gain Ka of the gain adjusting circuit 63 in response to the control mode selected by the state detection block 68 in a manner as described below, which depends on the system configuration and the demands to be met by the system.

Firstly, as for the time constant Ta of the digital LPF 61, the amplitude γm of the estimated flicker component shows a substantially constant value both in mode A (in a state where flickering is taking place steadily and stably under the lighting of a fluorescent lamp) and in mode B (in a state where flickering is not taking place steadily under the lighting of a non-fluorescent lamp), although it may vary in terms of near zero or not. If it does not show a constant value, there are external turbulences.

Therefore, to make the system tough and robust against external turbulences, it is desirable to define a long time constant Ta for the digital LPF 61. However, from the viewpoint of dealing with transition of control mode from mode A to mode B or vice versa, a quick follow-up capability is desirable and hence it is preferable to define a relatively short time constant Ta for the digital LPF 61.

In short, as for the amplitude γm, the two tradeoff demands have to be met. However, as shown in FIG. 10, 12 or 13, a method according to the embodiment of the present invention is basically based on an algorithm that is tough against external turbulences.

Therefore, in reality, a relatively short time constant Ta is defined to put stress on the follow-up capability. It is most preferable that the time constant Ta can be dynamically controlled so that it may be made relatively long in a steady state such as in mode A or in mode B and relatively short in a transitional state from mode A to mode B or vice versa.

On the other hand, as for the time constant Tp of the digital LPF 62, the initial phase Φmn periodically takes a same value due to the principle of generation of flickering in mode A (in a state where flickering is taking place steadily and stably under the lighting of a fluorescent lamp). Therefore, it is preferable to set a sufficiently long time constant for Tp so as to make the system tough against external turbulences.

To the contrary, since the initial phase Φmn keeps on taking randomly changing values in mode B (in a state where flickering is not taking place steadily under the lighting of a non-fluorescent lamp), such a time constant Tp does not particularly provide any specific advantage if a long time constant Tp is defined. Specifically, it is possible to arbitrarily select a value for the time constant Tp in mode B because of the gain adjustment effect, which will be described in greater detail hereinafter.

Thus, it may be so arranged that the time constant Ta or Tp can be switched between mode A and mode B.

As for the gain Ka at the gain adjusting circuit 63, it may well be defined basically to be equal to 1 because the amplitude γm is substantially held to a constant value as shown in FIG. 22 in mode A (in a state where flickering is taking place steadily and stably under the lighting of a fluorescent lamp).

It is desirable to be noted, however, that the gain Ka determines the correction factor of the amplitude γm (so that the input is output by 100% to make the correction factor equal to zero when Ka=1 is selected) and the correction factor of the amplitude γm can be controlled directly by changing the gain Ka.

In an actual imaging environment, there may be occasions where it is desirable to intentionally raise or lower the amplitude. Therefore, the system may be so arranged that the gain Ka is not limited to 1 and a value greater than or smaller than 1 can be selected.

On the other hand, the amplitude γm randomly takes a value close to zero due to noises in mode B (in a state where flickering is not taking place steadily under the lighting of a non-fluorescent lamp). Because intrinsically it is not necessary to execute the flicker reducing process in mode B, the gain Ka is held to zero so that any unnecessary process may not be executed in mode B.

The above description applies to stable states of mode A and mode B (a state where flickering is taking place steadily under the lighting of a fluorescent lamp and a state where flickering is not taking place steadily under the lighting of a non-fluorescent lamp). It is highly possible that the imaging environment is switched from under the lighting of a fluorescent lamp to under the lighting of a non-fluorescent lamp when the mode detected by the state detection block 68 is switched form mode A to mode B, whereas it is highly possible that the imaging environment is switched from under the lighting of a non-fluorescent lamp to under the lighting of a fluorescent lamp when the mode detected by the state detection block 68 is switched form mode B to mode A.

With a basic method according to the embodiment of the present invention as illustrated in FIG. 10, 12 or 13, the flicker component is extracted by an arithmetic operation of determining the average or the difference of a plurality of fields. Therefore, in a transitional state as describe above, part of the strings of signals that are used for the arithmetic operation for determining the average or the difference contains a flicker component while some other part does not contain any flicker component.

Then, as a result, an error arises to the flicker component that is obtained by an arithmetic operation of determining the average or the difference to give rise to an error in the amplitude γm and the initial phase Φmn that are detected. As the flicker coefficient Γn (y) is computationally determined from the amplitude γm and the initial phase Φmn that contain an error, the output video signal is adversely affected by the errors as a matter of course.

To alleviate this problem, the gain defining block 66 detects the transitional state, if any, of the control mode and controls the value of the gain Ka according to the detected transitional state.

More specifically, when the control mode is moved from mode A into mode B, the reliability of the amplitude γm and the initial phase Φmn is degraded already at the time of the start of the transition. Therefore, the gain Ka is switched from 1 to 0 immediately after the transition to stop the flicker reducing process at the flicker generation block 53 and the arithmetic operation block 40 or, alternatively, the gain Ka is gradually reduced to smoothly stop the flicker reducing process at the flicker generation block 53 and the arithmetic operation block 40.

When, to the contrary, the control mode is moved from mode B into mode A, the reliability of the amplitude γm and the initial phase Φmn is still low at the time of the start of the transition. Therefore, the system waits until the reliability of the amplitude γm and the initial phase Φmn becomes sufficiently high and then the gain Ka is switched from 0 to 1 to execute the flicker reducing process at the flicker generation block 53 and the arithmetic operation block 40 or, alternatively, the gain Ka is gradually increased to smoothly execute the flicker reducing process at the flicker generation block 53 and the arithmetic operation block 40.

Figure 21:
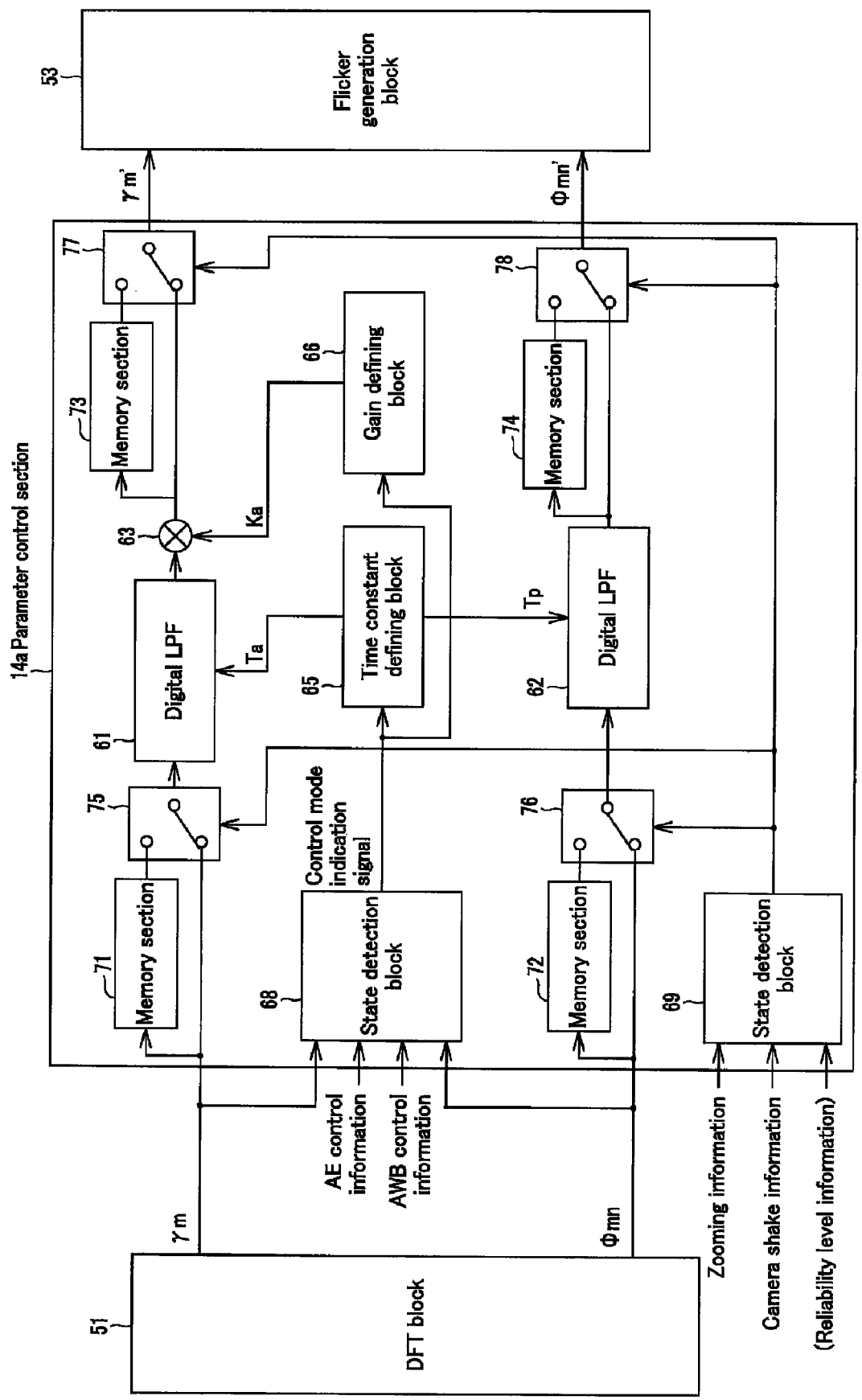
FIG. 21 is a schematic block diagram of a second exemplary system controller when adjusting the estimated flicker component.

FIG. 21 illustrates a second specific example.

In this instance, memory sections 71 through 74, switches 75 through 78 and a state detection block 69 are added to the arrangement of FIG. 20.

The memory section 71 stores data on the amplitude γm and the memory section 72 stores data on the initial phase Φmn, while the memory section 73 stores the output data of the gain adjusting circuit 63 and the memory section 74 stores the output data of the digital LPF 62. The switches 75 through 78 respectively select either the input data or the output data of the memory sections 71 through 74 according to the result of detection of the state detection block 69. The output data of the switch 75 is supplied to the digital LPF 61 and the output data of the switch 76 is supplied to the digital LPF 62, while the output data of the switch 77 is input to the flicker generation block 53 as data on the amplitude γm' and the output data of the switch 78 is input to the flicker generation block 53 as data on the initial phase Φmn'.

The state detection block 69 receives zooming information and camera shake information as input. The state detection block 69 judges if a large change has been produced in the angle of view by zooming or not from the zooming information and by panning, tilting and/or a camera shake of a large amplitude or not from the camera shake information.

Then, the state detection block 69 so judges that there has not been produced any large change in the angle of view, it turns the switches 75 through 78 respectively to the sides opposite to the memory sections 71 through 74. Then, the flicker reducing process is executed normally as in the instance of FIG. 20.

If, on the other hand, the state detection block 69 so judges that there has been produced a large change in the angle of view, it turns the switches 75 through 78 respectively to the sides of the memory sections 71 through 74.

More specifically, since, in a state where there has been produced a large change in the angle of view, the reliability of the amplitude γm and the initial phase Φmn has been degraded, the amplitude data and the initial phase data obtained in the past and stored respectively in the memory sections 73 and 74 are input to the flicker generation block 53 as amplitude γm' and initial phase Φmn'.

As seen from FIG. 22, since the amplitude γm and the initial phase Φmn are stable in mode A (in a state where flickering is taking place steadily under the lighting of a fluorescent lamp), there arises no problem if the past values are used. Rather, it is preferable to utilize the past values positively.

However, if lowly reliable data are continuously input to the digital LPFs 61 and 62 while the angle of view is being changed, the amplitude γm' and the initial phase Φmn' will contain an error immediately after the time when the switches 77 and 78 are turned respectively to the sides opposite to the memory sections 73 and 74. To prevent such a problem from taking place, when a large change is taking place in the angle of view, the state detection block 69 turns not only the switches 77 and 78 respectively to the sides of the memory sections 73 and 74 but also the switches 75 and 76 respectively to the sides of the memory sections 71 and 72 to prevent the lowly reliable data from being input to the digital LPFs 61 and 62 so that the highly reliable data obtained before the large change of the angle of view may be input to the digital LPFs 61 and 62 under control.

It may alternatively be so arranged that the reliability of the amplitude γm and the initial phase Φmn is judged without relying on the zooming information and the camera shake information and the reliability of the judgment is used as input information to the state detection block 69. Then, if the reliability level information indicates that the reliability of the amplitude γm and the initial phase Φmn is low, highly reliable data obtained in the past are used as the switches 75 through 78 are turned respectively to the sides of the memory sections 71 through 74 in a manner as described above.

With any of the above-described instances, it is possible to realize a process that is hardly influenced by external turbulences in a steady state of being under the lighting of a fluorescent lamp or a non-fluorescent lamp and shows an excellent responsiveness and a good follow-up capability in a transitional period. Then, it is also possible to smoothly and appropriately execute the process without giving any feeling of incompatibility when the imaging condition is transitional, when the angle of view changes or when the reliability of the flicker detection parameters is low.

Thus, it is possible to effectively reduce the flickering of a fluorescent lamp that shows "inter-field cyclicity" by separating the image component and the flicker component with utilizing the cyclicity of flicker stripes that arise among fields, extracting the flicker component from the frequency spectrum thereof, and correcting the gain by means of the extracted flicker component.

In the video camera 100 of this embodiment, the system controller 14 is provided with a functional feature of determining the presence or absence of flickering and selecting the shutter speed. Thus, it can effectively avoid the problem of flickering by computationally determining the phase of the flicker, judging the presence or absence of flickering from the determined phase, and selecting an appropriate shutter speed so that the combination of the broadcasting system and the geographical area in terms of the frequency of supplied AC power is handled comprehensively without limiting the shutter.

Figure 34:
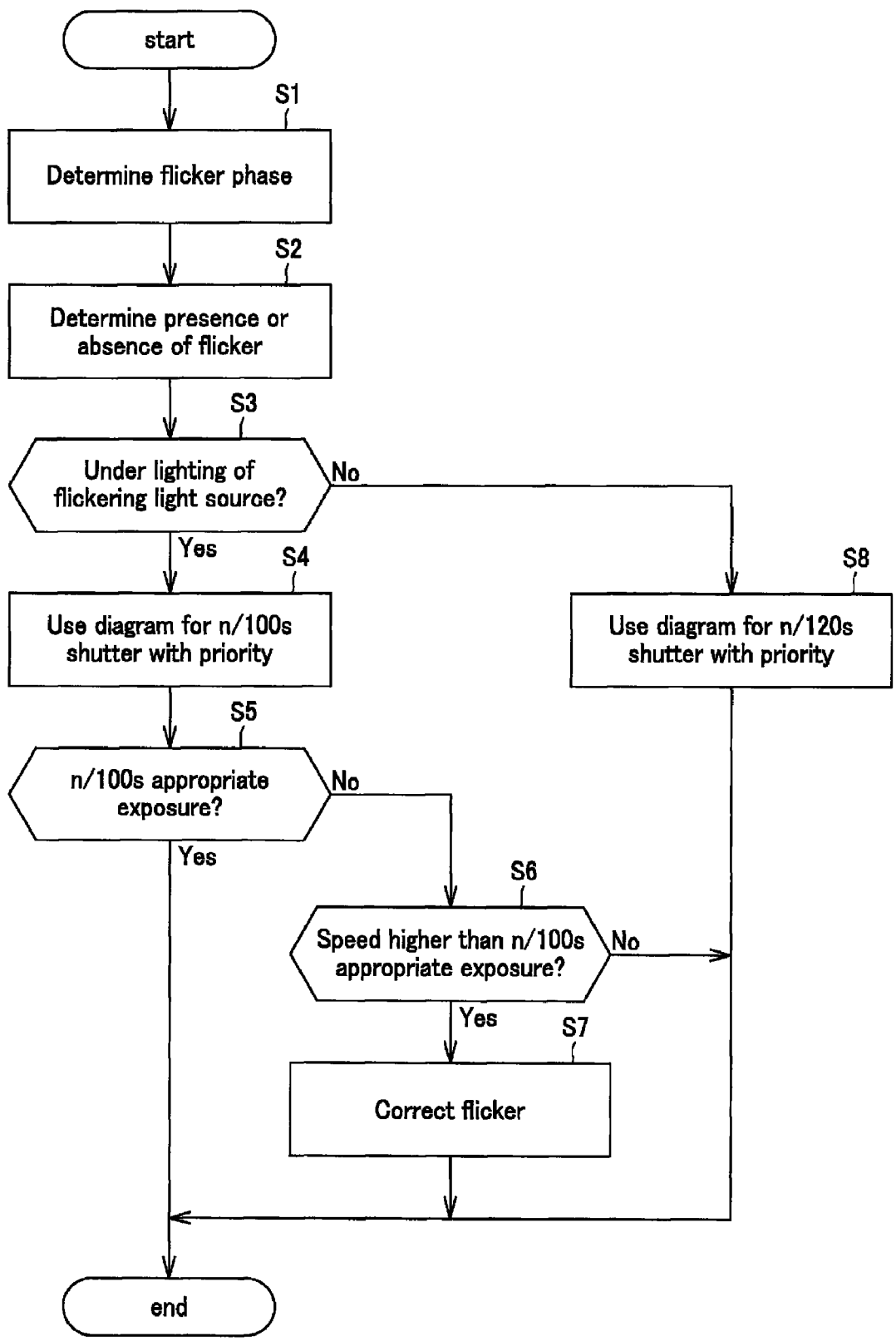
FIG. 34 is a flowchart of the control process to be executed by the system controller.

More specifically, the system controller 14 of the video camera 100 performs its control operation according to the sequence of the flowchart illustrated in FIG. 34.

For the initial state, a program diagram having priority in the shutter for detecting the flicker that flows among images as shown in FIGS. 5A and 5B is selected. The program diagram to be used with priority is selected in such a way that the shutter speed is n/120 seconds for 60 and 30 fps and n/100 seconds for 50 fps (n is an integer).

In Step S1, the controller 14 computationally determines the phase of the flicker in the initial state by means of the above-described method to extract the flicker component.

If there is detected flickering that shows cyclicity (as shown in FIGS. 5A and 5B), it is possible to computationally determine the phase of the flicker in the part for which a detecting operation is being conducted. Then, phase information is extracted on an arbitrarily selected line in the image and the controller 14 proceeds to the next step, or Step S2.

Figure 35:
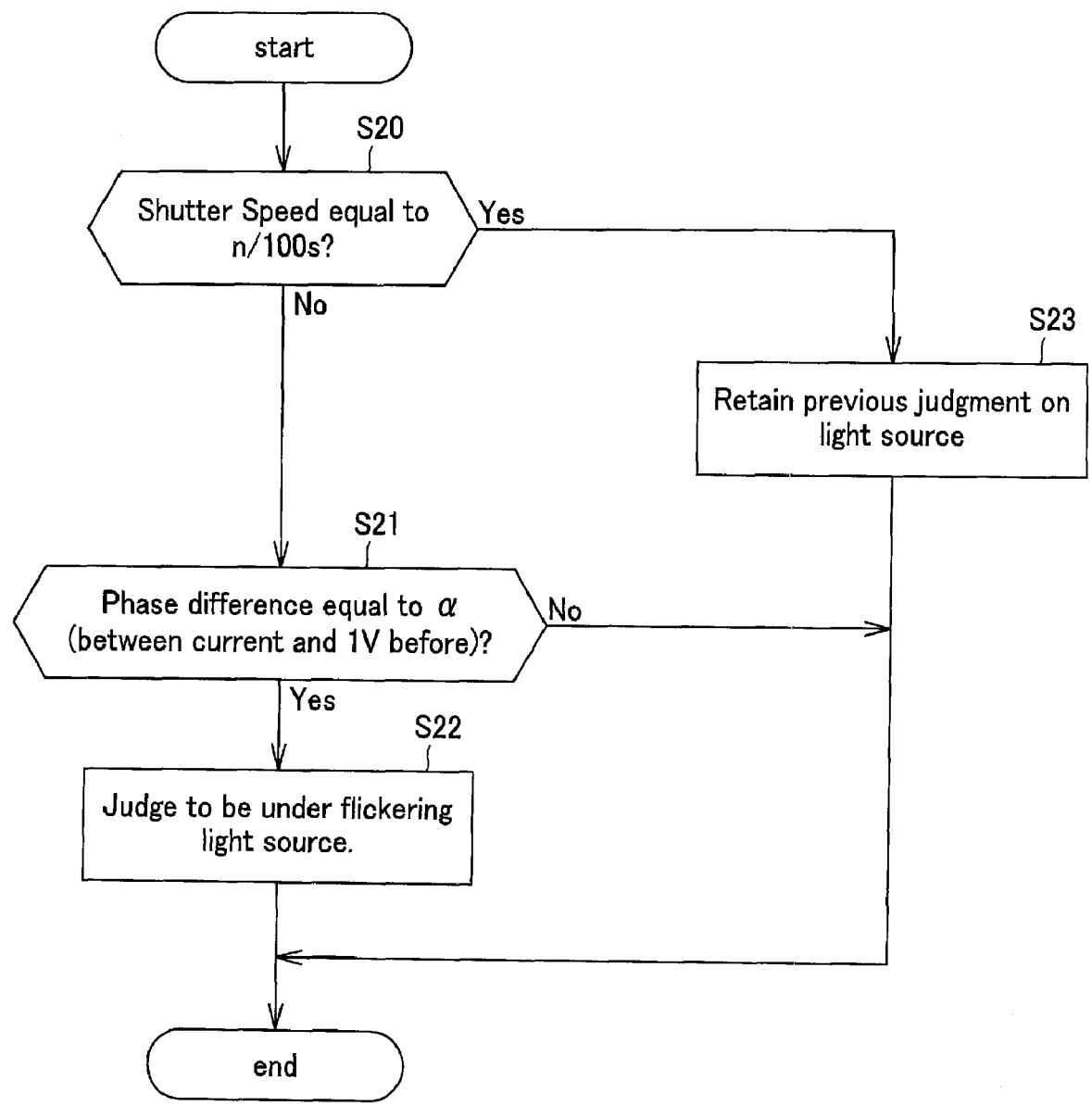
FIG. 35 is a flowchart of the process of determining the presence or absence of a flicker component to be executed by the system controller.

In Step S2, the controller 14 determines the presence or absence of flicker, following the sequence of operation illustrated in the flowchart of FIG. 35. In the operation of determining the presence or absence of flicker, the controller 14 firstly determines if the shutter speed is equal to n/100 seconds or not (Step S20). Note that the shutter speed is 1/100 seconds for 60 fps and 30 fps and n/120 seconds for 50 fps.

If the answer to the question in Step S20 is NO and hence the shutter speed is not equal to n/100 seconds, the controller 14 computes the difference of the phase obtained in Step S1 and the phase of the flicker in the image preceding by an image period and determines if the phase difference is equal to a or not (Step S21).

If the answer to the question in Step S21 is YES and hence the phase difference is equal to α, the controller 14 so judges that there is flickering and holds the result of judgment on the light source of being under the lighting of a flickering light source (Step S22) before it ends the presence/absence of flicker judging process.

If the answer to the question in Step S20 is YES and hence the shutter speed is equal to n/100 seconds, the controller 14 holds the result of the previous judgment on the light source (Step S23) before it ends the presence/absence of flicker judging process.

Additionally, if the answer to the question in Step S21 is NO and hence the computed phase different is not equal to α, the controller 14 simply ends the presence/absence of flicker judging process.

Figure 36A:
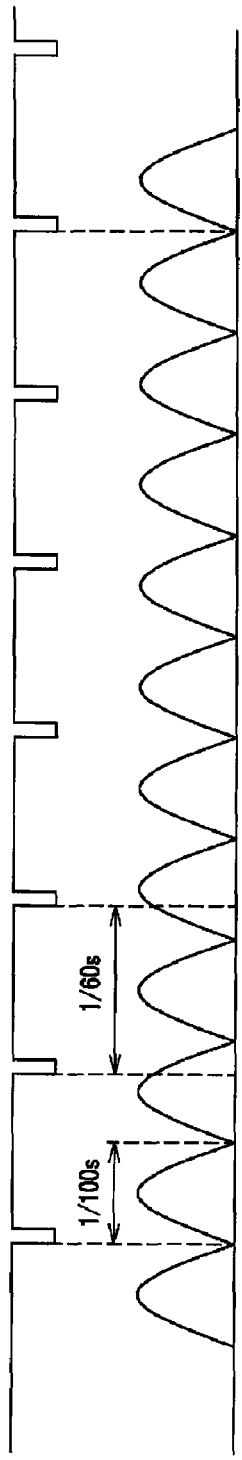
FIG. 36 is a schematic illustration of the difference of flicker phase among frames for different shutter speeds.
Figure 36B:
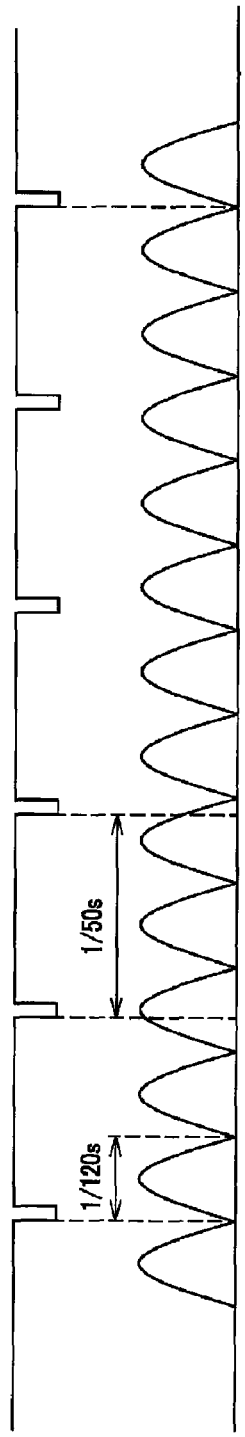
Figure 36C:
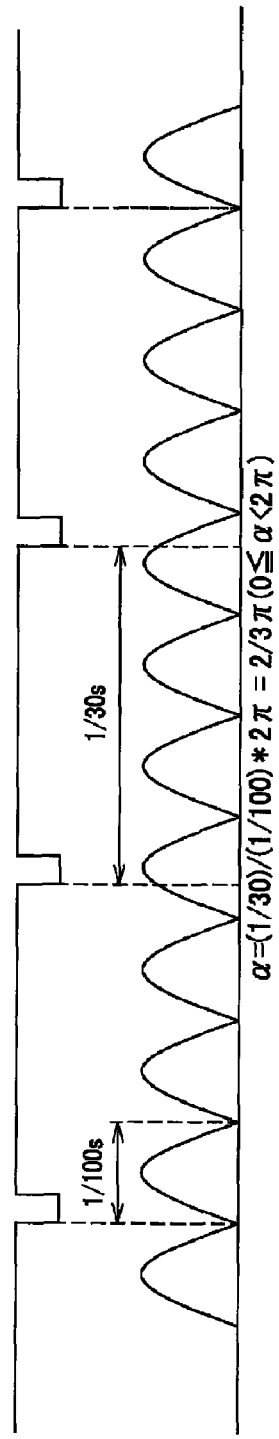

Note that the phase difference a can be determined by using the formula of power supply frequency/image period*2π (0≦α<2π). FIG. 36 shows examples (a), (b) and (c), which can be summarized as listed below.

(a) 60 fps (NTSC system): power supply frequency 50 Hz→4/3π

(b) 50 fps (PAL system): power supply frequency 60 Hz→12/5π

(c) 30 fps (DSC etc.); power supply frequency 50 Hz→2/3π

Some phase error is allowed because of change in the angle of view or the like.

Then, in the next step, or Step S3, the controller 14 judges if the current environment is under the lighting of a flickering light source or not on the basis of the result of the presence/absence of flicker judging process in Step S2.

If the answer to the question in Step S3 is YES and hence the current environment is under the lighting of a flickering light source, the controller 14 proceeds to the next step, or Step S4, where it selects the program diagram for using the shutter speed that does not give rise to any flicker that flows among images, or the shutter speed of n/100 seconds, with priority. Thus, the diagram uses n/100 seconds for 60 fps and 30 fps and n/120 seconds for 50 fps.

Figure 37A:
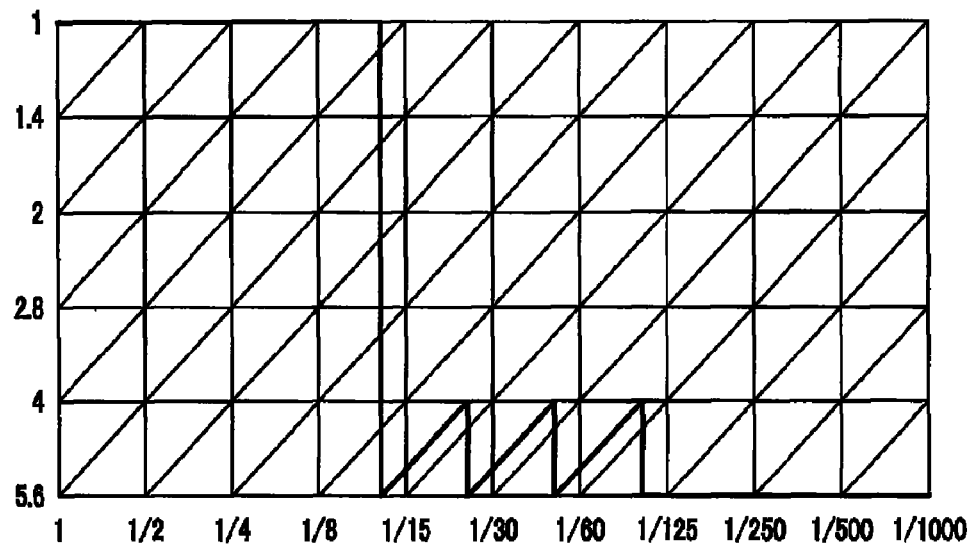
FIGS. 37A and 37B are a program diagram for using n/100 seconds with priority and a program diagram for using n/120 seconds with priority.
Figure 37B:
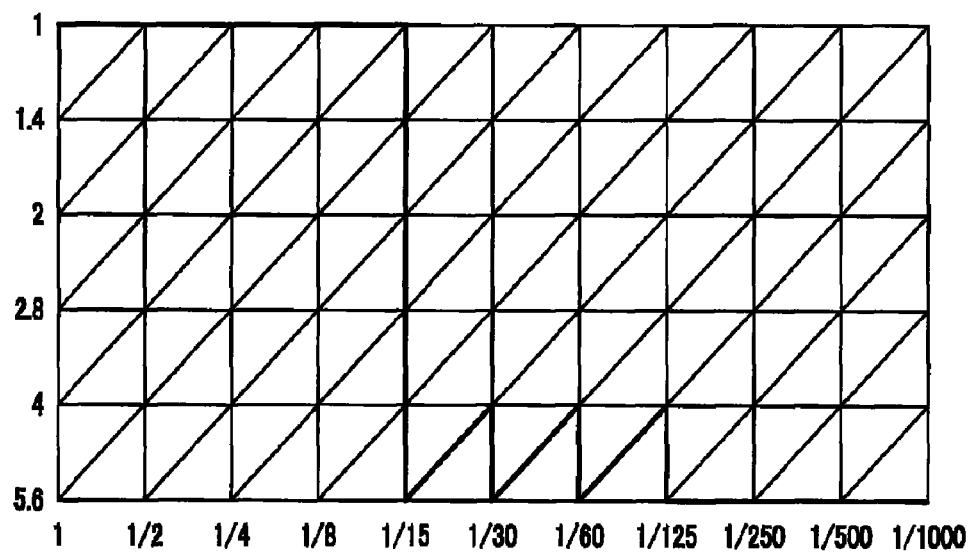

FIGS. 37A and 37B respectively illustrate program diagrams that respectively use the shutter speed of n/100 seconds and the shutter speed of n/120 seconds with priority.

In the next step, or Step S5, the controller 14 determines if an appropriate exposure is obtained by the shutter speed of n/100 seconds or not.

If the answer to the question in Step S5 is YES and hence it is possible to achieve an appropriate exposure that does not give rise to any flickering by that shutter speed, the process simply ends there because no flicker occurs. Any value may be selected for n of the shutter speed because the influence of flicker may be negligible.

If, on the other hand, the answer to the question in Step S5 is NO and hence it is not possible to achieve an appropriate exposure that does not give rise to any flickering with any value of n by that shutter speed, the controller 14 proceeds to the next step, or Step S6.

In Step S6, the controller 14 determines if it is possible to achieve an appropriate exposure with a high shutter speed that is higher than the marginal shutter speed for eliminating flickering or not.

If the answer to the question in Step S6 is YES and hence it is possible to achieve an appropriate exposure with a high shutter speed, the flicker is corrected by the above-described technique to reduce the flicker.

If the answer to the question in Step S3 is NO and hence the current environment is not under the lighting of a flickering light source, the controller 14 proceeds to the next step, or Step S8.

In Step S8, the controller 14 selects the diagram that uses with priority the shutter speed (n/120 seconds) that produces a flicker flowing among images so that the flicker may be detected with ease and ends the process.

If the answer to the question in Step S6 is NO and hence it is not possible to achieve an appropriate exposure with high shutter speed, the controller 14 simply ends the process.

With the above-described control operation, a diagram that uses n/120 seconds for 60 fps and 30 fps with priority or n/100 seconds for 50 fps with priority is selected.

With the above-described control operation, the degree of freedom is raised for achieving an appropriate exposure without limiting the shutter so that the load of appropriately removing/alleviating the flicker by means of the technique of Patent Document 5 (Jpn. Pat. Appln. Laid-Open Publication No. 2004-222228) is reduced, while keeping the characteristic features of the technique of the document on the combinations of cyclic flickers, and it is possible to remove horizontal stripes due to flickering within the shutter follow-up capability for non-cyclic flickers.

Thus, as described above, according to the embodiment of the present invention, there is provided an exposure control method of using a video signal obtained by shooting a subject by means of an XY address scanning type imaging element as input video signal, integrating the input video signal over not less than a horizontal period, normalizing an integral value obtained in the integrating step or the difference value between integral values of adjacent fields or frames, extracting flicker spectrum from the normalized integral value or the normalized difference value, determining, based on the extracted flicker spectrum, the presence or absence of a flicker component contained in the video signal obtained by the imaging element and controlling an exposure value, using a program diagram for preferentially employing a shutter speed less liable to produce flickering with priority when it is determined that the video signal contains a flicker component.

It is possible to determine the presence or absence of flickering for any combinations of the broadcasting systems and the power supply frequencies that produces a vertically flowing flicker.

It is also possible to prevent a flicker from being produced by using n/100 seconds or n/120 seconds as shutter speed with priority, so long as an appropriate exposure can be realized according to the information on the presence or absence of flickering.

Even if the shutter speed is changed from n/100 seconds or n/120 seconds in order to realize an appropriate exposure regardless of a vertically flowing flicker, it is possible to reduce the flicker by estimating the flicker component from the extracted flicker spectrum and conducting an arithmetic operation on the estimated flicker component and the input video signal so as to cancel the estimated flicker component.

If it is not possible to realize an appropriate exposure with a shutter speed of n/100 seconds or n/120 seconds, it is possible to detect the flicker once again without turning off the power supply by initializing the program diagram regardless of any change in the angle of view.

While a flicker is detected and corrected by means of the technique described in Patent Document 5 (Jpn. Pat. Appln. Laid-Open Publication No. 2004-222228), the correction can be an erroneous correction if the flicker does not show any cyclicity after detecting the flicker. However, the possibility of erroneous correction can be suppressed by suppressing the correction coefficient.

If it is found to be unnecessary to computing the flicker correction coefficient by judging if a vertically flowing flicker appears or not, the computation can be omitted.

The embodiment of the present invention is applicable to any image pickup apparatus including an XY address scanning type imaging element other than a CMOS imaging element.

It is desirable to be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An exposure control method of an image pickup apparatus having an XY address scanning type imaging element, the method comprising:
   (a) obtaining a video signal by shooting a subject by means of the imaging element;
   (b) determining a phase of a flicker showing cyclicity in the video signal using a power supply frequency;
   (c) integrating the video signal as input video signal over not less than a horizontal period;
   (d) normalizing an integral value obtained in the integrating step or the difference value between integral values of adjacent fields or frames;
   (e) extracting a flicker spectrum from the normalized integral value or the normalized difference value;
   f) determining, based on the extracted flicker spectrum, the presence or absence of a flicker component contained in the video signal obtained by the imaging element;
   (g) determining whether a current environment includes lighting of a flickering light source; and
   (h) in response to a determination that the current environment includes lighting of the flickering light source, controlling an exposure value by setting a program diagram adapted to use a shutter speed of n/100 seconds for 60 fps, n/120 seconds for 50 fps and n/100 seconds for 30 fps, wherein the program diagram is maintained so long as an appropriate exposure can be realized.

2. The method according to claim 1, wherein the phase of the flicker of an arbitrarily selected line in an image plane of the video signal is computed from a flicker spectrum obtained one frame before and a flicker spectrum currently obtained and the presence of flickering is determined if the flicker component is produced with a phase difference due to a relation between field or frame frequency of a broadcasting system and a power supply frequency.

3. The method according to claim 1, wherein a program diagram adapted to preferentially use a shutter speed of n/120 seconds for 60 fps, n/100 seconds for 50 fps and n/120 seconds for 30 fps, where n is a positive integer, is initially set according to the frame rate of the image pickup apparatus so long as an appropriate exposure can be realized.

4. An exposure control apparatus of an image pickup apparatus having an XY address scanning type imaging element, the apparatus comprising:

a video signal obtaining unit configured to obtain a video signal by shooting a subject by means of the imaging element;
flicker determining means for:
(a) determining a phase of a flicker showing cyclicity in the video signal using a power supply frequency;
(b) integrating a video signal obtained by shooting a subject by means of the imaging element as input video signal over not less than a horizontal period;
(c) normalizing an integral value obtained by integrating the video or the difference value between integral values of adjacent fields or frames;
(d) extracting flicker spectrum from the normalized integral value or the normalized difference value, and determining, based on the extracted flicker spectrum, the presence or absence of a flicker component contained in the video signal obtained by the imaging element; and
exposure value controlling means for, in response to a determination that a current environment includes lighting of a flickering light source, controlling an exposure value by setting a program diagram adapted to use a shutter speed of n/100 seconds for 60 fps, n/120 seconds for 50 fps and n/100 seconds for 30 fps, wherein the program diagram is maintained so long as an appropriate exposure can be realized.

5. The apparatus according to claim 4, wherein the flicker determining means computes the phase of the flicker of an arbitrarily selected line in an image plane of the video signal from a flicker spectrum obtained one frame before and a flicker spectrum currently obtained and determines the presence of flickering if the flicker component is produced with a phase difference due to a relation between field or frame frequency of a broadcasting system and a power supply frequency.

6. The apparatus according to claim 4, wherein the exposure value controlling means initially sets a program diagram adapted to preferentially use a shutter speed of n/120 seconds for 60 fps, n/100 seconds for 50 fps and n/120 seconds for 30 fps, where n is a positive integer, according to the frame rate of the image pickup apparatus so long as an appropriate exposure can be realized.

7. An image pickup apparatus comprising:
an XY address scanning type imaging element;
a video signal obtaining unit configured to obtain a video signal by shooting a subject by means of the imaging element;
flicker determining means for:
(a) determining a phase of a flicker showing cyclicity in the video signal using a power supply frequency;
(b) integrating a video signal obtained by shooting a subject by means of the imaging element as input video signal over not less than a horizontal period;
(c) normalizing an integral value obtained by integrating the video or the difference value between integral values of adjacent fields or frames;
(d) extracting flicker spectrum from the normalized integral value or the normalized difference value; and
(e) determining, based on the extracted flicker spectrum, the presence or absence of a flicker component contained in the video signal obtained by the imaging element from the extracted flicker spectrum; and
exposure value controlling means for, in response to a determination that a current environment includes lighting of a flickering light source, controlling an exposure value by setting a program diagram adapted to use a shutter speed of n/100 seconds for 60 fps, n/120 seconds for 50 fps and n/100 seconds for 30 fps, wherein the program diagram is maintained so long as an appropriate exposure can be realized.

8. The apparatus according to claim 7, wherein the flicker determining means computes the phase of the flicker of an arbitrarily selected line in an image plane of the video signal from a flicker spectrum obtained one frame before and a flicker spectrum currently obtained and determines the presence of flickering if the flicker component is produced with a phase difference due to a relation between field or frame frequency of a broadcasting system and a power supply frequency.

9. The apparatus according to claim 7, wherein the exposure value controlling means initially sets a program diagram adapted to preferentially use a shutter speed of n/120 seconds for 60 fps, n/100 seconds for 50 fps and n/120 seconds for 30 fps, where n is a positive integer, according to the frame rate of the video signal to be transmitted so long as an appropriate exposure can be realized.

10. The apparatus according to claim 7, further comprising:
arithmetic operation means for estimating the flicker component from the flicker spectrum extracted by the flicker determining means and performing an arithmetic operation on the estimated flicker component and the input video signal so as to cancel the estimated flicker component when the flicker determining means determines that the video signal contains any flicker component and the exposure value controlling means is not able to set the shutter speed so as to produce a flicker-free state for the purpose of realizing an appropriate exposure.

11. An exposure control apparatus of an image pickup apparatus having an XY address scanning type imaging element, the apparatus comprising:
a video signal obtaining unit configured to obtain a video signal by shooting a subject by means of the imaging element;
a flicker determining unit configured to:
(a) determine a phase of a flicker showing cyclicity in the video signal using a power supply frequency;
(b) integrate a video signal obtained by shooting a subject by means of the imaging element as input video signal over not less than a horizontal period;
(c) normalize an integral value obtained by integrating the video or the difference value between integral values of adjacent fields or frames;
(d) extract flicker spectrum from the normalized integral value or the normalized difference value; and
(e) determine, based on the extracted flicker spectrum, the presence or absence of a flicker component contained in the video signal obtained by the imaging element from the extracted flicker spectrum; and
an exposure value controlling unit configure to, in response to a determination that a current environment includes lighting of a flickering light source, control an exposure value by setting a program diagram adapted to use a shutter speed of n/100 seconds for 60 fps, n/120 seconds for 50 fps and n/100 seconds for 30 fps, wherein the program diagram is maintained so long as an appropriate exposure can be realized.

12. An image pickup apparatus comprising:
an XY address scanning type imaging element;
a video signal obtaining unit configured to obtain a video signal by shooting a subject by means of the imaging element;

a flicker determining unit that:
- (a) determines a phase of a flicker showing cyclicity in the video signal using a power supply frequency;
- (b) integrates a video signal obtained by shooting a subject by means of the imaging element as input video signal over not less than a horizontal period;
- (c) normalizes an integral value obtained by integrating the video or the difference value between integral values of the adjacent fields or frames;
- (d) extracts flicker spectrum from the normalized integral value or the normalized difference value; and
- (e) determines, based on the extracted flicker spectrum, the presence or absence of a flicker component contained in the video signal obtained by the imaging element from the extracted flicker spectrum; and an exposure value controlling unit configure to, in response to a determination that a current environment includes lighting of a flickering light source, control an exposure value by setting a program diagram adapted to use a shutter speed of n/100 seconds for 60 fps, n/120 seconds for 50 fps and n/100 seconds for 30 fps, wherein the program diagram is maintained so long as an appropriate exposure can be realized.

* * * * *